US012083658B2

(12) United States Patent
Tanaka

(10) Patent No.: US 12,083,658 B2
(45) Date of Patent: Sep. 10, 2024

(54) PNEUMATIC TOOL

(71) Applicant: MAX CO., LTD., Tokyo (JP)

(72) Inventor: Hiroshi Tanaka, Tokyo (JP)

(73) Assignee: Max Co., Ltd., Tokyo (JP)

( * ) Notice: Subject to any disclaimer, the term of this patent is extended or adjusted under 35 U.S.C. 154(b) by 283 days.

(21) Appl. No.: 17/606,753

(22) PCT Filed: Apr. 24, 2020

(86) PCT No.: PCT/JP2020/017787
§ 371 (c)(1),
(2) Date: Oct. 26, 2021

(87) PCT Pub. No.: WO2020/218548
PCT Pub. Date: Oct. 29, 2020

(65) Prior Publication Data

US 2022/0212326 A1 Jul. 7, 2022

(30) Foreign Application Priority Data

Apr. 26, 2019 (JP) ................................ 2019-086669
Apr. 26, 2019 (JP) ................................ 2019-086670

(51) Int. Cl.
*B25C 1/04* (2006.01)

(52) U.S. Cl.
CPC .................................. *B25C 1/047* (2013.01)

(58) Field of Classification Search
CPC ............. B25C 1/047; B25C 1/04; B25C 1/06; B25C 1/008; B25C 1/043; B25C 1/042; B25C 1/041
See application file for complete search history.

(56) References Cited

U.S. PATENT DOCUMENTS

2016/0151900 A1* 6/2016 Wu ......................... B25C 1/047 227/130
2019/0022842 A1* 1/2019 Oouchi .................. B25C 1/046
2019/0344415 A1 11/2019 Furumi et al.

FOREIGN PATENT DOCUMENTS

JP 06-032308 Y 8/1994
TW 201821229 A 6/2018
WO 2017-115593 A1 7/2017

OTHER PUBLICATIONS

The International Search Report dated Jul. 7, 2020 (2 pages, with English translation).

* cited by examiner

*Primary Examiner* — Veronica Martin
(74) *Attorney, Agent, or Firm* — Banner & Witcoff, Ltd.

(57) ABSTRACT

A pneumatic tool includes a drive mechanism configured to drive by an air pressure of compressed air, a head valve configured to control supply of the compressed air to the drive mechanism, a trigger valve configured to actuate the head valve, a control valve configured to disable actuation of the trigger valve or the head valve, and a timer valve configured to be actuated based on an operation on a trigger and to disable actuation of the trigger valve or the head valve by actuating the control valve at a predetermined timing. The timer valve has a valve body configured to act on the control valve and is provided with a throttle portion configured to regulate a flow rate of a fluid generated in conjunction with movement of the valve body.

15 Claims, 31 Drawing Sheets

PNEUMATIC TOOL

CROSS REFERENCE TO RELATED APPLICATION

This application is a 35 U.S.C. 371 National Phase Entry Application from PCT/JP2020/017787, filed Apr. 24, 2020, which claims priority to Japanese Patent Application No. JP 2019-086669 and JP 2019-086670 filed Apr. 26, 2019, the disclosures of which are incorporated herein in their entirety by reference, and priority is claimed to each of the foregoing.

TECHNICAL FIELD

The present disclosure relates to a pneumatic tool.

BACKGROUND ART

In the related art, widely used is a nailing machine that includes a main body having a cylinder, a piston provided to be slidable in the cylinder, and a driver connected to the piston, and is configured to drive the piston by compressed air to strike a nail into a to-be-struck member.

The nailing machine using the compressed air includes a head valve configured to control actuation of the piston, a trigger valve configured to actuate the head valve, a trigger mechanism configured to actuate the trigger valve, and a contact arm protruding from a nose part provided on a tip end-side of the main body. The nailing machine is configured so that, when the contact arm is pressed against the to-be-struck member in a state where a trigger lever is pulled, a striking operation (hereinafter, referred to as 'contact striking') of striking out a nail to the to-be-struck member by a driver can be enabled.

In the contact striking, after striking a nail, nails can be continuously struck each time the contact arm is pressed against the to-be-struck member while the trigger is pulled, which is suitable for a quick operation. On the other hand, suggested is a technology where when a predetermined time elapses without the contact arm being pressed against the to-be-struck member after the trigger is pulled, the head valve is put into non-actuation, so as to regulate a careless operation (refer to PTL 1).

CITATION LIST

Patent Literature

PTL 1: Japanese examined utility model application publication No. H06-32308

SUMMARY OF INVENTION

Technical Problem

However, the nailing machine of the related art disclosed in PTL 1 has following problems. A general nailing machine is configured to allow any pressure of the compressed air to be selected between a low pressure and a high pressure, depending on an application where the nailing machine is used. In a timing valve of the related art, an actuation control is performed using the compressed air supplied to a main chamber. Therefore, when a pressure of the compressed air that is used varies, a variation also occurs in time measurement of the timing valve, so that an operation of the timing valve is not stable.

Therefore, in order to solve the above problems, the present disclosure provides a nailing machine capable of stabilizing an operation of a timer mechanism by making the timer mechanism less susceptible to an influence of compressed air that is used to drive a drive mechanism.

Solution to Problem

A pneumatic tool according to one aspect of the present disclosure includes a drive mechanism configured to drive by an air pressure of compressed air, a head valve configured to control supply of the compressed air to the drive mechanism, a trigger valve configured to actuate the head valve, a control valve configured to disable actuation of the trigger valve or the head valve, and a timer valve configured to be actuated based on an operation on a trigger and to disable actuation of the trigger valve or the head valve by actuating the control valve at a predetermined timing, wherein the timer valve has a valve body configured to act on the control valve and is provided with a throttle portion configured to regulate a flow rate of a fluid generated in conjunction with movement of the valve body.

A pneumatic tool according to one aspect of the present disclosure includes a drive mechanism configured to drive by an air pressure of compressed air, a head valve configured to control supply of the compressed air to the drive mechanism, a trigger valve configured to actuate the head valve by receiving an operation on a trigger, a control valve configured to disable a trigger operation, and a timer valve configured to be actuated based on the operation on the trigger and to disable actuation of the head valve by actuating the control valve at a predetermined timing, wherein the timer valve has a valve body configured to press the control valve and a damper mechanism configured to regulate a moving speed of the valve body, and wherein the valve body is configured to press the control valve after a predetermined time elapses from start of movement by an operation on the trigger.

Advantageous Effects of Invention

According to the pneumatic tool of one aspect of the present disclosure, a moving speed of the timer valve is controlled using the throttle portion. Therefore, it is possible to prevent a variation in time until the control valve is actuated, so that an operation of the timer valve can be stabilized.

In addition, according to the pneumatic tool of one aspect of the present disclosure, the moving speed of the valve body is controlled by the damper mechanism that is less susceptible to an influence of the compressed air that is used to drive the drive mechanism. Therefore, it is possible to prevent a variation in time until the control valve is actuated, so that an operation of the timer valve can be stabilized.

DESCRIPTION OF EMBODIMENTS

Hereinafter, favorable embodiments of the present disclosure will be described in detail with reference to the accompanying drawings. Note that, in the specification and drawings, the constitutional elements having substantially the same functional configurations are denoted with the same reference signs, and the overlapping descriptions are omitted.

First Embodiment

[Configuration Example of Nailing Machine 100]

Figure 1:
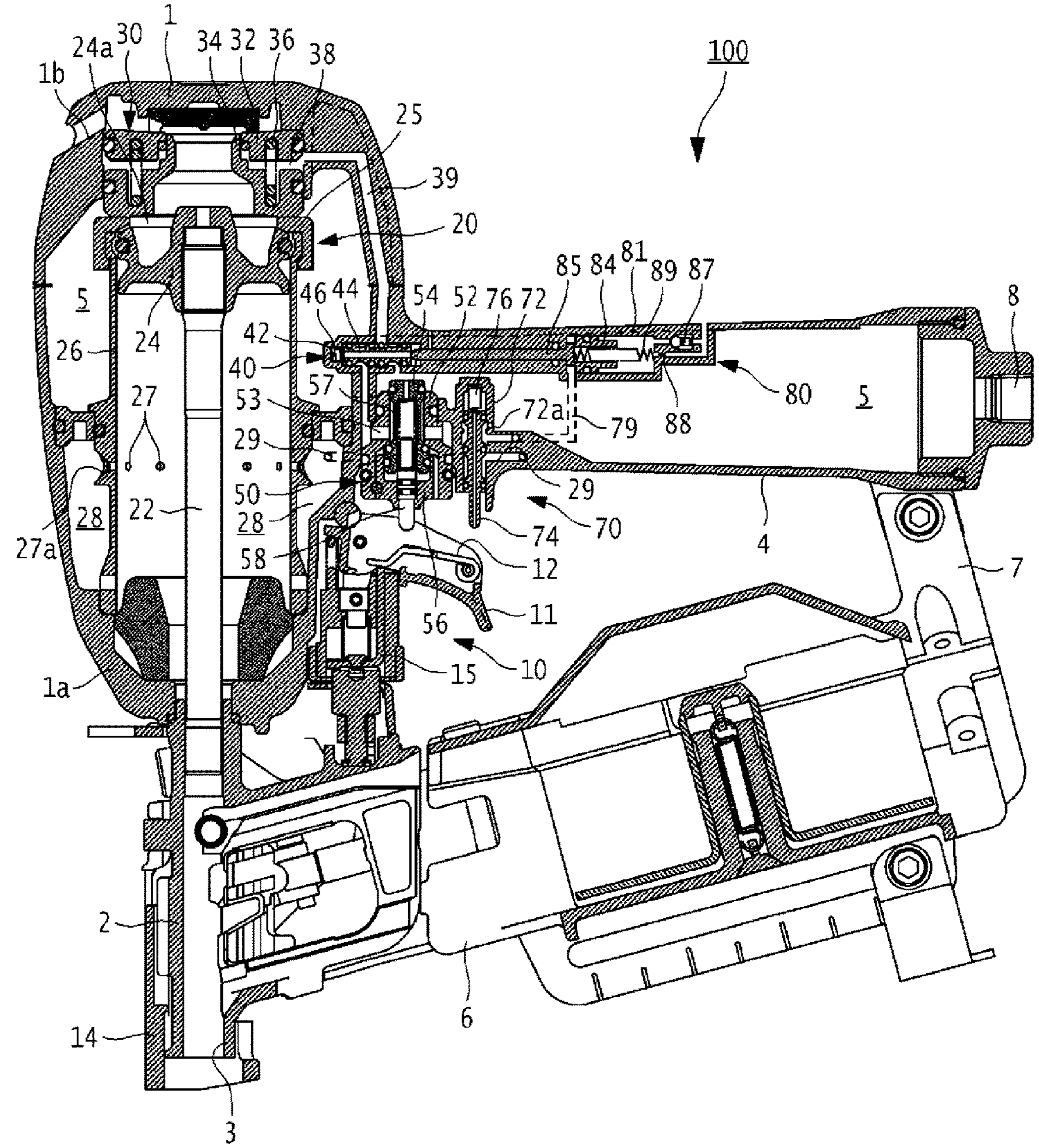
FIG. 1 is a side sectional view of a nailing machine according to a first embodiment.
Figure 2:
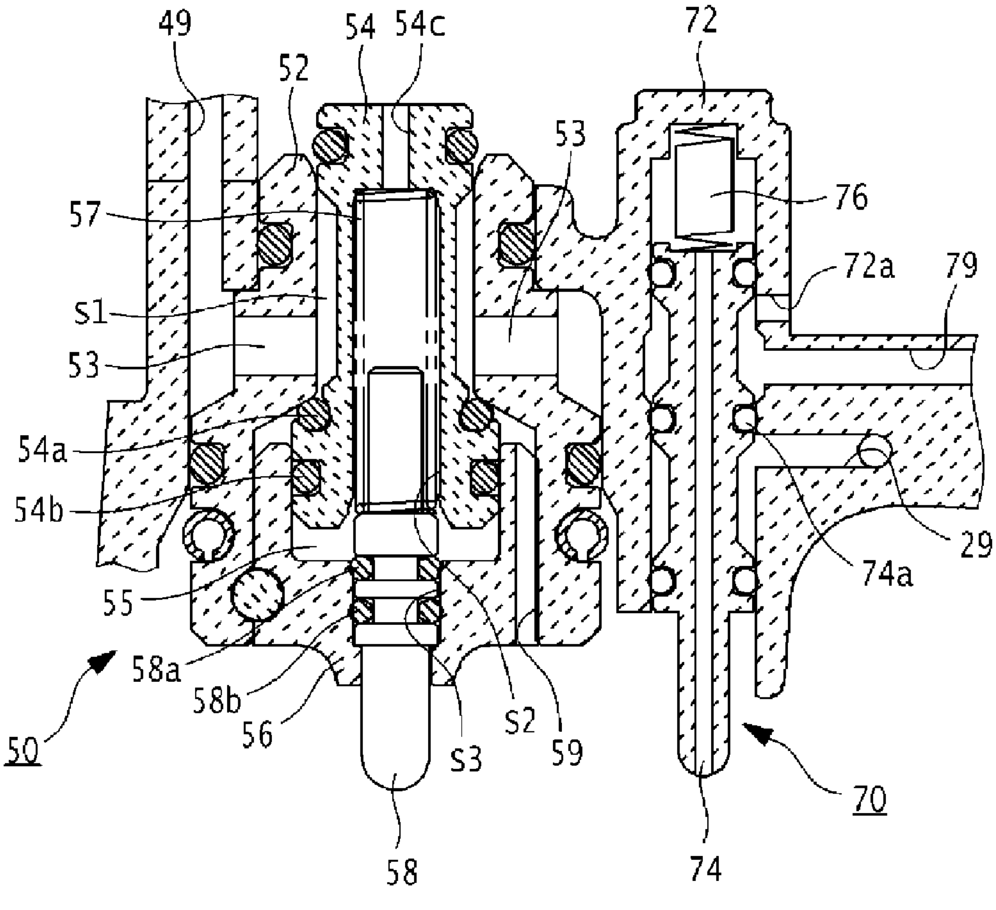
FIG. 2 is a side sectional view of a trigger valve and a switch valve according to the first embodiment.
Figure 3:
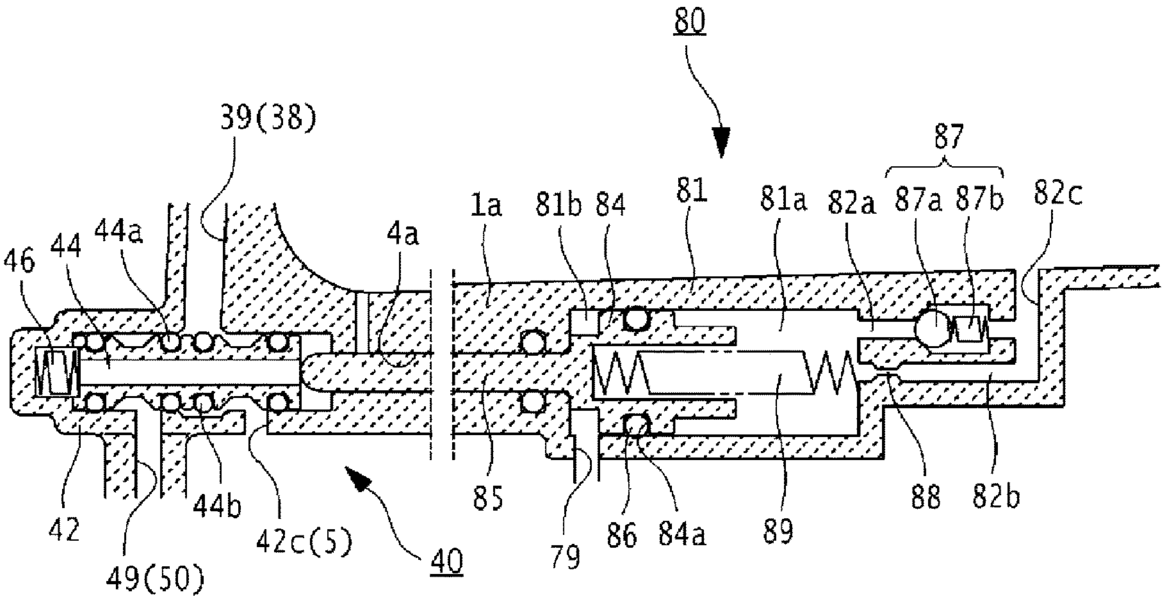
FIG. 3 is a side sectional view of a timer valve and a control valve according to the first embodiment.

FIG. 1 is a side sectional view of a nailing machine 100 according to a first embodiment. FIG. 2 is a side sectional view of a trigger valve 50 and a switch valve 70 according to the first embodiment. FIG. 3 is a side sectional view of a tinier valve 80 and a control valve 40 according to the first embodiment.

The nailing machine 100 is an example of the pneumatic tool, and includes a main body 1 having a nose part 2, a grip part 4 that is gripped by an operator, and a magazine part 6 in which nails to be struck into a to-be-struck member are loaded. Housings of the main body 1 and the grip part 4 are integrally formed by a housing 1*a*, for example. The nailing machine 100 also includes a head valve 30, a trigger mechanism 10, a trigger valve 50, a switch valve 70, a timer valve 80 and a control valve 40.

Note that, in the present embodiment, the nose part 2-side of the nailing machine 100 is referred to as a lower side of the nailing machine 100, and an opposite side thereto is referred to as an upper side of the nailing machine 100. Also, the main body 1-side of the nailing machine 100 is referred to as a front side of the nailing machine 100, and the grip part 4-side of the nailing machine 100 is referred to as a rear side of the nailing machine 100.

An inside of the main body 1 is hollow, and a striking mechanism (drive mechanism) configured to drive by an air pressure of compressed air is arranged in the main body 1. The striking mechanism 20 has a driver 22, a piston 24, and a cylinder 26. The driver 22 is configured to reciprocally move in an upper and lower direction (axial direction) in the cylinder 26, and to impact a head portion of a nail delivered from the magazine part 6, thereby striking the nail into a to-be-struck member. The piston 24 is connected to an upper end portion of the driver 22, and is configured to reciprocally move in the cylinder 26, in response to the compressed air flowing into a piston upper chamber 24*a* provided on an upper side of the cylinder 26. The cylinder 26 is a cylindrical body, is arranged in the housing 1*a* constituting the main body 1, and is configured to accommodate the driver 22 and the piston 24 to be reciprocally movable in the upper and lower direction. An annular locking part 25 configured to regulate upward movement of the piston 24 is provided between the piston 24 and the head valve 30.

A lower end portion of the main body 1 is provided with the nose part 2. The nose part 2 protrudes downward from the lower end portion of the main body 1 by a predetermined length. The nose part 2 is formed with an ejection port 3 for striking out the nail delivered by the driver 22 to an outside. The ejection port 3 is arranged coaxially with the driver 22 and the cylinder 26.

A main chamber 5 in which the compressed air is filled is provided between an inner wall on an upper side of the main body 1 and an outer peripheral part on an upper side of the cylinder 26 and in the grip part 4. A blow back chamber 28 for returning the piston 24 to a top dead center is provided between an inner wall on a lower side of the main body 1 and an outer peripheral part on a lower side of the cylinder 26. One end portion of a first connection passage 29 configured to communicate with the switch valve 70 is connected to the blow back chamber 28.

A plurality of small holes 27 is formed at predetermined intervals in a substantially intermediate position in the axial direction of the cylinder 26 and in a circumferential direction of the cylinder 26. The plurality of small holes 27 is formed to communicate with the blow back chamber 28 via a check valve 27*a* provided to the cylinder 26. Note that, when the piston 24 is located at a bottom dead center below the small holes 27, the compressed air of the cylinder 26 is caused to flow into the blow back chamber 28 via the small holes 27, and when the piston 24 is located at the top dead center, the compressed air in the blow back chamber 28 is discharged to the atmosphere, so that the inside of the blow back chamber 28 becomes an atmospheric pressure.

The head valve 30 is configured to perform supply and shut-off of the compressed air to the cylinder 26, and to drive the striking mechanism 20 by using the compressed air supplied from the main chamber 5. The head valve 30 has a base part 32 and a movable part 34. The base part 32 is arranged on an upper end-side in the main body 1, and the movable part 34 is arranged below the base part 32. The movable part 34 is urged toward the cylinder 26 at a predetermined interval from the base part 32 by an urging spring 36 interposed between the base part 32 and the movable part 34. A lower surface of the movable part 34 is in contact with an upper surface of the locking part 25 in an urging state (a state where the head valve 30 is off), so that the main chamber 5 and the piston upper chamber 24*a* are shut off therebetween.

The interval between the base part 32 and the movable part 34 is configured to function as a head valve chamber 38 to which the compressed air in the main chamber 5 is supplied. One end portion of a second connection passage 39 is configured to communicate with the head valve chamber 38, and the other end-side of the second connection passage 39 is configured to communicate with the control valve 40. The movable part 34 is configured to slide along an inner wall of the housing 1*a* constituting the main body 1 and to open/close between the piston upper chamber 24*a* and the main chamber 5, according to a state of the compressed air in the head valve chamber 38. The piston upper chamber 24*a* is configured to communicate with an outside via an opening portion 1*b* formed in the housing 1*a*.

The grip part 4 is attached to a side part on the rear side of the main body 1 in a direction substantially orthogonal to an extension direction of the main body 1 (a moving direction of the striking mechanism 20). A rear end portion of the grip part 4 is provided with an air plug 8. One end portion of an air hose (not shown) is connected to the air plug 8, and the other end portion of the air hose is connected to a compressor (not shown). The air compressor is configured to generate the compressed air for driving the striking mechanism 20 and to supply the generated compressed air into the main chamber 5 via the air hose and the air plug 8.

The trigger mechanism 10 has a trigger lever 11, a contact lever 12, a contact arm 14 and a pressing member 15. The trigger lever 11 is a lever for turning on (actuating) the switch valve 70, and is attached to a side surface on the rear side of the main body 1 and a lower side of the grip part 4 so as to be rotatable about a shaft part as a fulcrum. The contact lever 12 is arranged in the trigger lever 11 and is configured to rotate about a rear side as a fulcrum in conjunction with the trigger lever 11. A front end portion of the contact lever 12 is urged downward by, for example, a spring provided on a rear end-side, and is in contact with an upper end face of the pressing member 15. Note that, the contact lever 12 may not be urged by the spring.

The contact arm 14 is attached to an outer peripheral part of the nose part 2 in a state of protruding downward from a lower end portion of the nose part 2. The contact arm 14 is urged downward by a spring (not shown), and is configured to reciprocally move in the upper and lower direction relative to the nose part 2 in conjunction with a pressing operation against the to-be-struck member. The pressing member 15 is connected to the contact arm 14, and is configured to push up a front end-side of the contact lever 12 in conjunction with upward movement of the contact arm 14. When the trigger lever 11 is pulled, a trigger valve stem 58 of the trigger valve 50 is pushed up, so that the trigger valve 50 is actuated (turned on).

The magazine part 6 is configured so that a series of connected connecting nails can be loaded therein, and is provided on a lower side of the grip part 4. A front end-side of the magazine part 6 is connected to the nose part 2, and a rear end-side of the magazine part 6 is connected to the grip part 4 via an attaching arm part 7. The connecting nails loaded in the magazine part 6 are guided to the ejection port 3 of the nose part 2 by a feeding claw provided to be slidable with respect to the nose part 2, and is struck into the to-be-struck member by the descending driver 22.

The trigger valve 50 is configured to actuate the head valve 30, based on an operation on the trigger lever 11 and a pressing of the contact arm 14. As shown in FIGS. 1 and 2, the trigger valve 50 is arranged near the switch valve 70 on the front end-side of the grip part 4. The trigger valve 50 has a housing 52, a pilot valve 54, a cap 53 and a trigger valve stem 58.

The housing 52 has a passage 53 provided in a substantially intermediate portion in the upper and lower direction. The passage 53 is configured to communicate with one end portion of a third connection passage 49 configured to connect the head valve 30 and the trigger valve 50 each other. The passage 53 is also configured to be able to communicate with an air exhaust passage 59 upon turning-on of the trigger valve 50.

The pilot valve 54 is arranged at a gap S1 on an inner side of the housing 52. O-rings 54*a* and 54*b* are attached at a predetermined interval in the upper and lower direction to a peripheral edge portion on a lower side of the pilot valve 54. The O-ring 54*a* is configured to shut off a passage between the passage 53 and the air exhaust passage 59 to thus prevent the compressed air in the head valve chamber 38 from being leaked from the passage 53 to an outside, during turning-off of the trigger valve 50. In addition, the O-ring 54*a* is pressed against an inner wall of the housing 52 to regulate upward movement of the pilot valve 54. The O-ring 54*b* is configured to shut off between an empty chamber 55, which will be described later, and the air exhaust passage 59.

The cap 56 is attached on an inner side of the housing 52 with an empty chamber 55 being interposed between the cap and the pilot valve 54 on the upper side. The empty chamber 55 is configured to communicate with the main chamber 5 via a gap S2 between the pilot valve 54 and the trigger valve stem 58 and a passage 54*c* of the pilot valve 54 and to function as a chamber in which the compressed air is filled, during non-actuation of the trigger valve 50.

The trigger valve stem 58 is arranged on inner sides of the pilot valve 54 and the cap 56, and is provided to be movable in the upper and lower direction from the cap 56 as a point of origin. An upper end-side of the trigger valve stem 58 is urged toward the contact lever 12 (toward the lower side) by a compression spring 57. The compression spring 57 is interposed between the pilot valve 54 and the trigger valve stem 58, and is adapted to expand and contract, in response to pressing of the trigger valve stem 58. A lower end portion of the trigger valve stem 58 protrudes from a lower surface of the cap 56 by a predetermined length, and can come into contact with the contact lever 12 (refer to FIG. 1). O-rings 58*a* and 58*b* are attached at a predetermined interval in the upper and lower direction to a peripheral edge portion of a substantially intermediate position in the upper and lower direction of the trigger valve stem 58. The O-rings 58*a* and 58*b* are configured to prevent the compressed air in the empty chamber 55 from being leaked from a gap S3 between the trigger valve stem 58 and the cap 56 to an outside, during non-actuation of the trigger valve 50.

The air exhaust passage 59 is provided between the housing 52 and the cap 56. When the empty chamber 55 is closed due to push-up of the trigger valve stem 58 during actuation of the trigger valve 50, the air exhaust passage 59 communicates with the passage 53 to exhaust the compressed air in the head valve chamber 38 to the atmosphere.

As shown in FIGS. 1 and 2, the switch valve 70 is arranged in the vicinity of a rear side of the trigger valve 50, and is configured to actuate the timer valve 80 based on an operation on the trigger lever 11. The switch valve 70 has a cylinder 72 and a switch valve stem 74.

The cylinder 72 is a hollow cylindrical body extending in the upper and lower direction, and is configured to accommodate the switch valve stem 74 so as to be slidable in the upper and lower direction. An upper side of the cylinder 72 is formed with a passage 72*a*. The passage 72*a* is configured to communicate with the main chamber 5, and the compressed air in the main chamber 5 is caused to flow into the cylinder 72 via the passage 72*a*.

One end portion of a fourth connection passage 79 is configured to communicate in a substantially intermediate position of the cylinder 72, and the other end portion of the fourth connection passage 79 is configured to communicate with the timer valve 80. The fourth connection passage 79 is configured to connect the switch valve 70 and the timer valve 80 therebetween, and the compressed air can be supplied or exhausted with respect to the timer valve 80 via the fourth connection passage 79. One end portion of the first connection passage 29 is configured to communicate on a further lower side than the fourth connection passage 79 of the cylinder 72, and the other end portion of the first connection passage 29 is configured to communicate with the blow back chamber 28. The first connection passage 29 is configured to connect the switch valve 70 and the blow back chamber 28 therebetween, and the compressed air can be supplied to the switch valve 70 or the compressed air can be exhausted from the switch valve 70 via the first connection passage 29.

The switch valve stem 74 is accommodated in the cylinder 72, and is urged toward the trigger lever 11 (toward the lower side) by the compression spring 76. The compression spring 76 is interposed between an upper end face of the switch valve stem 74 and a top surface in the cylinder 72, and is adapted to expand and contract, in response to a pulling operation on the trigger lever 11. Mower end portion of the switch valve stem 74 protrudes downward from the lower surface of the cylinder 72, and comes into contact with the contact lever 12 at the time when the trigger lever 11 (refer to FIG. 1) is pulled.

An O-ring 74*a* for close contact with an inner wall of the cylinder 72 is mounted to a peripheral edge portion of a substantially intermediate position of the switch valve stem 74. Upon non-pulling operation of the trigger lever 11, the switch valve stem 74 is configured to close a path between the fourth connection passage 79 and the first connection passage 29 by the O-ring 74*a* and to communicate the passage 72*a* and the fourth connection passage 79 each other. On the other hand, upon pulling operation of the trigger lever 11, the switch valve stem 74 is configured to be pushed up against the elastic force of the compression spring 76 by the contact lever 12 and to close a path between the passage 72*a* and the fourth connection passage 79 by the O-ring 74*a* and to communicate the fourth connection passage 79 and the first connection passage 29 each other.

As shown in FIGS. 1 and 3, in a state where the trigger lever 11 is pulled, after a prescribed time elapses, and when the contact arm 14 is pressed against the to-be-struck member, the timer valve 80 actuates the control valve 40 to disable an operation of the head valve 30, thereby limiting the striking operation. The timer valve 80 has a cylinder 81, a timer piston 84, and a piston shaft part 85.

The cylinder 81 is a hollow cylindrical body extending in the front and rear direction, and is configured to accommodate the timer piston 84 so as to be slidable in the front and rear direction. In the present embodiment, a part of the cylinder 81 has a structure sharing a part of the housing 1*a*.

The timer piston 84 is a cylindrical body having substantially the same diameter as an inner diameter of the cylinder 81, and is arranged to be slidable along an inner wall of the cylinder 81. A peripheral edge portion of the timer piston 84 is formed with a concave portion 84*a* along a circumferential direction thereof. In the concave portion 84*a*, an O-ring 86 for close contact with the inner wall of the cylinder 81 is mounted. Thereby, an inside of the cylinder 81 is partitioned into a first space 81*a* on a rear side of the O-ring 86 and a second space 81*b* on a front side of the O-ring 86. The first space 81*a* and the second space 81*b* are isolated from each other by the O-ring 86. The timer piston 84 is urged toward the control valve 40 (toward the front side) by a compression spring 89. The compression spring 89 is interposed between a concave portion formed on a base end-side thereof and a rear wall in the cylinder 81. The compression spring 89 is compressed by the compressed air that is supplied to the second space 81*b* of the cylinder 81, and is expanded in response to the atmospheric air that is supplied to the first space 81*a* of the cylinder 81.

One end portion of the fourth connection passage 79 is configured to communicate with a lower surface-side and the second space 81*b* of the cylinder 81, so that the compressed air can be supplied to the timer valve 80 and the compressed air can be exhausted from the timer valve 80 via the fourth connection passage 79.

On the rear side of the cylinder 81, a first passage 82*a* and a second passage 82*b* extending in the front and rear direction are provided side by side in the upper and lower direction. One end portion of the first passage 82*a* is configured to communicate with the inside of the cylinder 81, and the other end portion of the first passage 82*a* is configured to communicate with a third passage 82*c*. One end portion of the second passage 82*b* is configured to communicate with the inside of the cylinder 81, and the other end portion of the second passage 82*b* is configured to communicate with the third passage 82*c*. The third passage 82*c* has an opening on the housing-side, and is configured to communicate with an outside of the housing 1*a* via the opening. In this way, since the timer piston 84 of the timer valve 80 is actuated using the atmospheric air that is supplied from the third passage 82*c*, not the compressed air, the timer valve 80 can be actuated in a stable pressure state all the time. Note that, in the present embodiment, the first passage 82*a* and the second passage 82*b* are configured to communicate with the common third passage 82*c*. However, separate passages may also be provided to the first passage 82*a* and the second passage 82*b*, respectively. In addition, the opening of the third passage 82*c* may be provided with a filter. Thereby, even when the atmospheric air contains trash, dust and the like, the air after trash, dust and the like are removed by the filter can be caused to flow into the cylinder 81, so that the stabilization of the moving speed of the timer piston 84 can be further improved.

A check valve 87 is provided in the middle of the path of the first passage 82*a*. The check valve 87 has a ball 87*a* for opening/closing the first passage 82*a*, for example, and a spring 87*b* provided on a rear side of the ball 87*a* for urging the ball 87*a* toward the timer piston 84. When the timer piston 84 is retreated in the cylinder 81, the ball 87*a* is urged against an elastic force of the spring 87*b* by the atmospheric air, so that the first passage 82*a* opens and the atmospheric air flows from the inside of the cylinder 81 to the outside. On the other hand, when the timer piston 84 is advanced in the cylinder 81, the ball 87*a* is urged forward by the atmospheric air from the outside and the spring 87*b*, so that the first passage 82*a* is closed by the ball 87*a* and back-flow of the atmospheric air from the outside into the cylinder 81 is prevented.

A throttle portion 88 is provided in the middle of the path of the second passage 82*b*. The throttle portion 88 is constituted by reducing a cross-sectional area (narrowing a width) of a path of a part of the second passage 82*b*, and is configured to restrict a flow rate per unit time of the atmospheric air, which is caused to flow into the cylinder 81 from the outside, to be constant. Thereby, it is possible to control the moving speed until the piston shaft part 85 presses a control valve stem 44 of the control valve 40. In the present embodiment, the example where the moving speed of the timer piston 84 is regulated by the air entering via the throttle portion 88 and the compression spring 89 has been described. However, a configuration where the moving speed of the timer piston 84 is regulated by the air flowing out via the throttle portion 88 and the compression spring 89

In addition, a prescribed time at the time when the timer piston 84 moves from an initial position in the cylinder 81 to an actuation position in which the control valve 40 is actuated is determined by a flow rate passing through the throttle portion 88 of the timer valve 80, a spring coefficient of the compression spring 89, and the like. In the present embodiment, the prescribed time is, for example, 3 seconds to 10 seconds. In the present embodiment, a time for which the control valve 40 moves from the actuation position to a position in which the passage between the head valve chamber 38 and the trigger valve 50 is shut off is set to a time considerably shorter than the prescribed time. For this reason, when the prescribed time elapses, the passage between the head valve 30 and the trigger valve 50 is immediately shut off by the control valve 40. In addition, in the present embodiment, the initial position is a position in which the timer piston 84 is most retreated in the cylinder 81 upon set or reset of the timer piston 84, and the actuation position is a position in which the timer piston 84 presses the control valve 40 on the front end-side in the cylinder 81 after the trigger lever 11 is pulled.

The piston shaft part 85 is a rod-shaped columnar body, and a rear end portion thereof is formed integrally with a front end portion of the tinier piston 84. The piston shaft part 85 is slidably arranged in a through-hole 4*a* formed between the cylinder 81 and the control valve 40, and can appear and disappear with respect to an inside of a cylinder 42 that constitutes the control valve 40. The piston shaft part 85 is configured to press against a rear end face of the control valve stem 44 to actuate the control valve 40 at the time when the prescribed time in the timer valve 80 elapses and the timer piston 84 reaches the actuation position.

As shown in FIGS. 1 and 3, the control valve 40 is configured to disable actuation of the head valve 30 that is actuated in conjunction with actuation of the trigger valve 50. Specifically, the control valve 40 is configured to switch the passage between the head valve chamber 38 and the trigger valve 50 from a communication state to a shut-off state by control of the timer valve 80, thereby disabling actuation of the head valve 30. The control valve 40 is arranged in a position near the timer valve 80 ahead of the timer valve 80, between the head valve chamber 38 and the trigger valve 50. The control valve 40 has a cylinder 42 and a control valve stem 44. Note that, a part of the cylinder 42 has a structure sharing a part of the housing 1*a*. In the present embodiment, an example where the control valve 40 disables actuation of the head valve is described. However, a configuration where actuation of the trigger valve 50 configured to be actuated in conjunction with an operation on the trigger is disabled may also be adopted.

The cylinder 42 is a hollow cylindrical body extending in the front and rear direction, and is configured to accommodate the control valve stem 44 so as to be slidable in the front and rear direction. An upper surface-side of the cylinder 42 is configured to communicate with one end portion of the second connection passage 39 configured to communicate with the head valve chamber 38. A lower surface-side of the cylinder 42 is configured to communicate with one end portion of the third connection passage 49 configured to communicate with the trigger valve 50, and is formed with a passage 42*c* configured to communicate with the main chamber 5.

The control valve stem 44 is a cylindrical body extending in the front and rear direction and is arranged in the cylinder 42. The control valve stem 44 is urged toward the timer valve 80 (toward the rear side) by a compression spring 46. The compression spring 46 is interposed between a front wall in the cylinder 42 and a front end face of the control valve stem 44, and is adapted to expand and contract, in response to pressing by the timer valve 80. O-rings 44*a* and 44*b* are attached at a predetermined interval in the front and rear direction to a peripheral edge portion of a substantially intermediate position in the front and rear direction of the control valve stem 44.

The control valve stem 44 is located on a rear end-side in the cylinder 42, and closes a path between the second connection passage 39 and the passage 42*c* by the O-ring 44*b* and opens a path between the second connection passage 39 and the third connection passage 49, upon non-pressing of the timer valve 80, i.e., before timeout. Thereby, the head valve chamber 38 and the trigger valve 50 are connected to each other. On the other hand, the control valve stem 44 is moved to a front end-side in the cylinder 42, and opens the path between the second connection passage 39 and the passage 42*c* and closes the path between the second connection passage 39 and the third connection passage 49 by the O-ring 44*a*, upon pressing of the timer valve 80, i.e., after timeout. Thereby, the head valve chamber 38 and the trigger valve 50 are shut off therebetween. Since a pressure of the main chamber 5 acts on the control valve 40, a sliding resistance of the control valve stem 44 varies due to variation in pressure in the main chamber. However, it is preferably to make movement of the timer valve 80 configured to press the control valve stem 44 less susceptible to an influence of variation in the sliding resistance of the control valve stem 44. For example, a setting of an area to receive a spring load and a pressure should be considered.

As shown in FIGS. 1 and 3, the timer valve 80 is arranged in the grip part 4 so that a moving direction of the timer piston 84 is different from, in the present embodiment, orthogonal to, an axial direction of the cylinder 26 (a moving direction of the driver 22). In addition, the timer valve 80 is arranged in the grip part 4 so that the moving direction of the timer piston 84 is along the extension direction of the grip part 4, i.e., is parallel to the extension direction of the grip part 4.

[Operation Example of Nailing Machine 100]

Subsequently, an example of a striking operation of the nailing machine 100 according to the first embodiment is described. FIGS. 4 to 10 show a striking operation in the nailing machine 100 according to the first embodiment.

Figure 4:
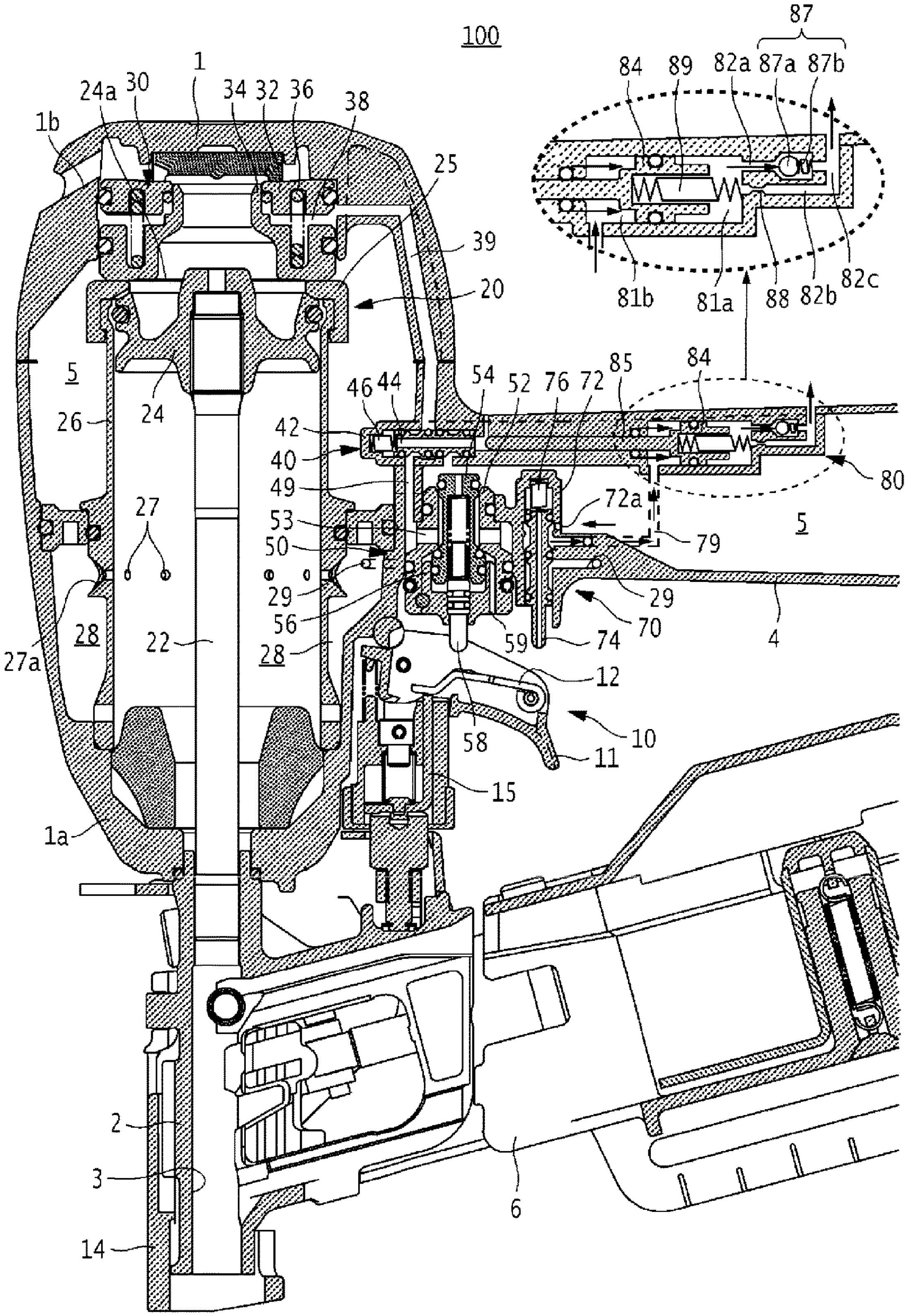
FIG. 4 is an operation view upon striking in the nailing machine according to the first embodiment.

In a case of performing a striking operation by using the nailing machine 100, when the air hose is connected to the air plug 8 shown in FIG. 1, the compressed air is supplied into the main chamber 5, as shown in FIG. 4. The compressed air supplied into the main chamber 5 is supplied to the second space 81*b* of the timer valve 80 via the inside of the switch valve 70 and the fourth connection passage 79.

Along with this, the front surface-side of the timer piston 84 is pushed backward by the compressed air, and the timer piston 84 and the piston shaft part 85 are retreated against the elastic force of the compression spring 89. At this time, the atmospheric air in the first space 81*a* is compressed and the compressed atmospheric air is caused to flow into the first passage 82*a*. The ball 87*a* of the check valve 87 is pushed against the elastic force of the spring 87*b* by the inflow atmospheric air, thereby opening the first passage 82*a*. Thereby, the atmospheric air flowing into the first passage 82*a* passes through the check valve 87 and the third passage 82*c* and is exhausted to the outside of the housing 1*a*. Note that, in the second passage 82*b*, since the flow resistance of the throttle portion 88 increases, the compressed air hardly passes, as compared to the first passage 82*a*.

Figure 5:
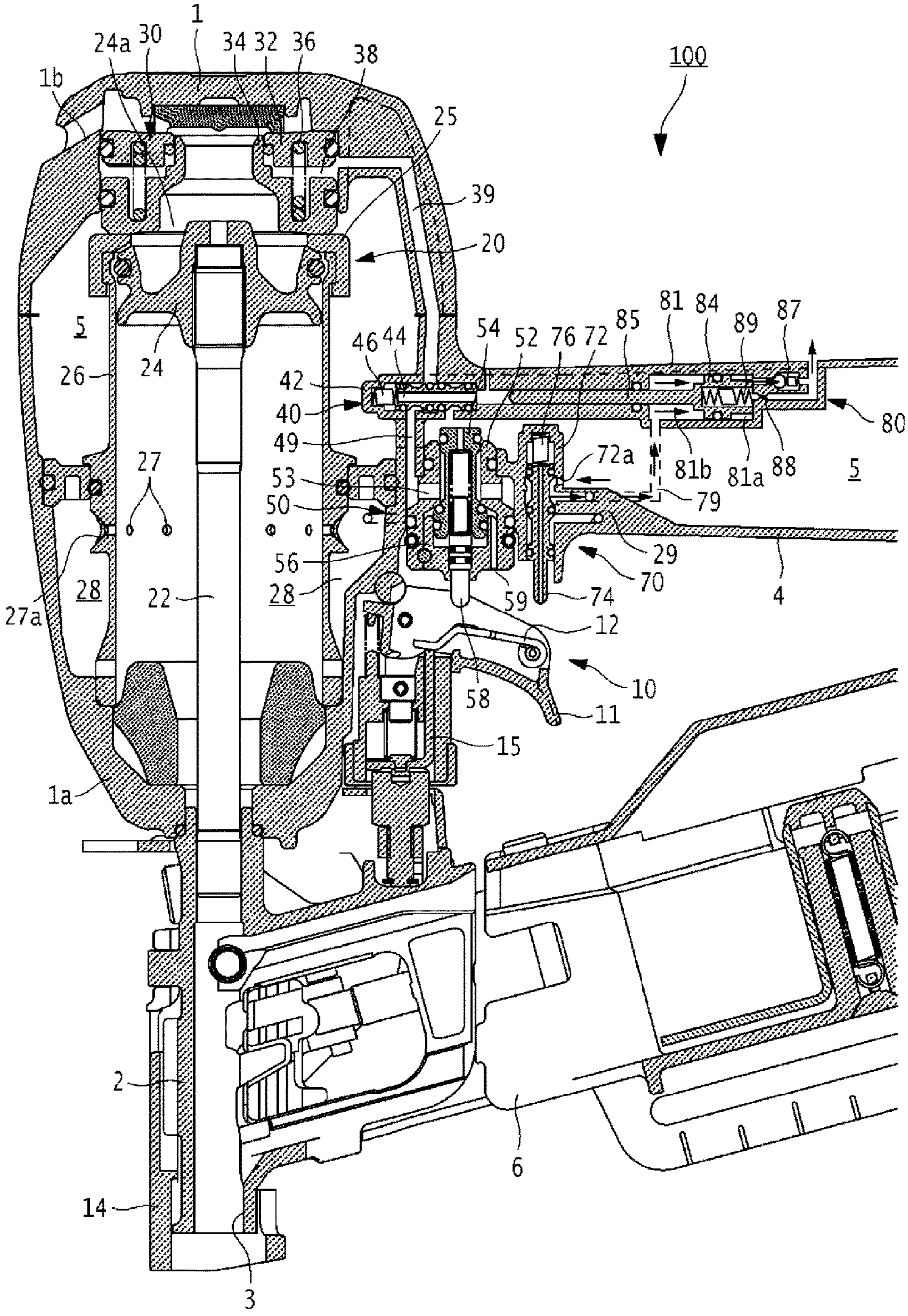
FIG. 5 is an operation view upon striking in the nailing machine according to the first embodiment.

As shown in FIG. 5, when the supply of the compressed air into the second space 81*b* of the timer valve 80 continues, the timer piston 84 reaches the initial position in the cylinder 81, specifically, the base end portion of the timer piston 84 reaches the rear end portion of the first space 81*a* by compression of the compression spring 89. Thereby, the timer valve 80 becomes in a standby state.

Figure 6:
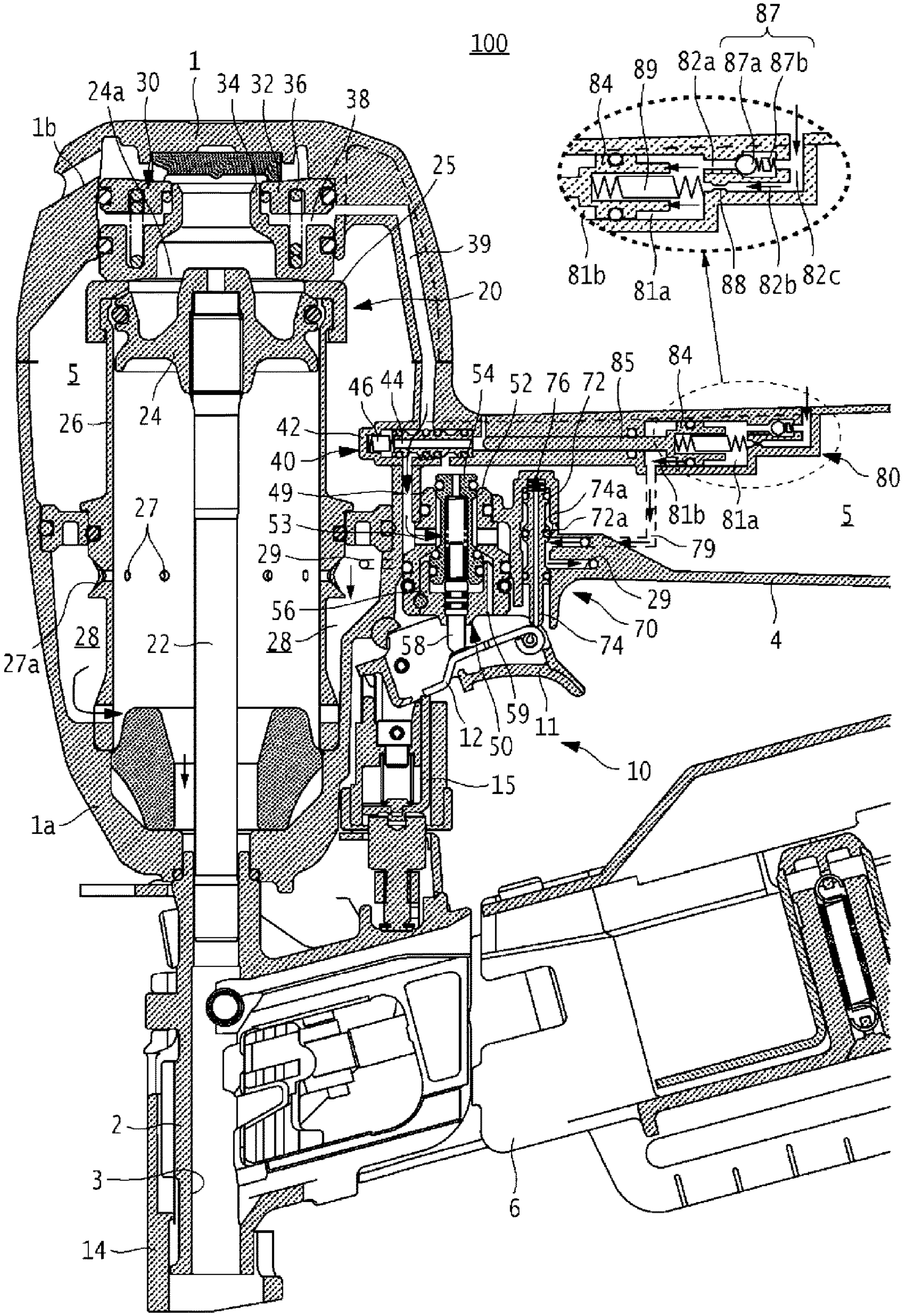
FIG. 6 is an operation view upon striking in the nailing machine according to the first embodiment.

As shown in FIG. 6, when the trigger lever 11 is pulled by an operator, the switch valve stem 74 of the switch valve 70 is pushed up by the contact lever 12, so that the switch valve 70 is actuated. By the push-up of the switch valve stem 74, the O-ring 74*a* (refer to FIG. 2) is also moved upward, so that while the communication state between the passage 72*a* of the switch valve 70 and the fourth connection passage 79 is shut off, the fourth connection passage 79 and the first connection passage 29 communicate with each other. Along with this, the compressed air in the second space 81*b* of the timer valve 80 is exhausted to the blow back chamber 28 at the atmospheric pressure via the fourth connection passage 79, the inside of the switch valve 70 and the first connection passage 29.

In addition, when the compressed air in the second space 81*b* in the cylinder 81 is exhausted, the urging force of the compression spring 89 acts on the timer piston 84. Along with this, the atmospheric air is caused to flow into the first space 81*a* of the timer valve 80 through the third passage 82*c*, the second passage 82*b* and the throttle portion 88. The flow rate of the atmospheric air that is supplied to the first space 81*a* is restricted to be constant by the throttle portion 88. The compression spring 89 gradually expands, according to the flow rate of the atmospheric air that is caused to flow into the first space 81*a*. Along with this, the timer piston 84 is slowly advanced from the initial position in the cylinder 81 and the timer (time measurement) of the timer valve 80 starts. Note that, since the first passage 82*a* is not closed by the ball 87*a*, the atmospheric air does not flow into the cylinder 81 via the first passage 82*a*.

Figure 7:
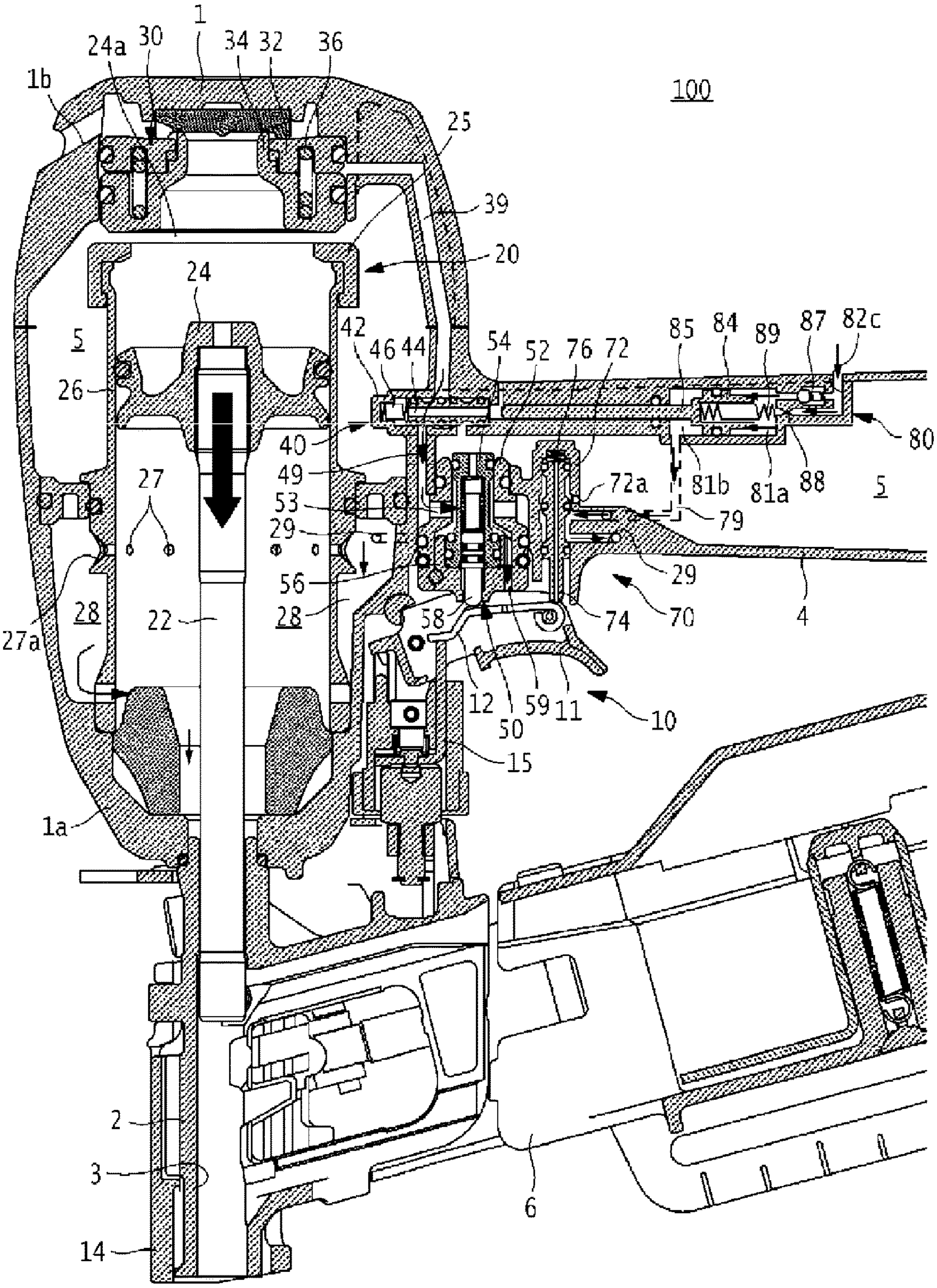
FIG. 7 is an operation view upon striking in the nailing machine according to the first embodiment.

As shown in FIG. 7, when the contact arm 14 is pressed against the to-be-struck member in a state where the trigger lever 11 is pulled and before timeout of the timer valve 80, the pressing member 15 is pushed up. Along with this, when the front end-side of the contact lever 12 is pushed up, the trigger valve stem 58 of the trigger valve 50 is pushed up, so that the trigger valve 50 is actuated. When the trigger valve stem 58 is pushed up, the O-rings 58*a* and 58*b* are also moved upward, as shown in FIG. 2, so that the compressed air in the empty chamber 55 is exhausted from the gap S3 between the cap 56 and the trigger valve stem 58 to the outside. The pilot valve 54 is pushed down against the elastic force of the compression spring 57 by the compressed air in the main chamber 5, so that the lower surface of the pilot valve 54 comes into contact with the upper surface of the cap 56. Thereby, the passage 53 and the air exhaust passage 59 communicate with each other, and the compressed air in the head valve chamber 38 is exhausted to the atmosphere (outside) via the second connection passage 39, the control valve 40, the third connection passage 49, the inside of the trigger valve 50 and the air exhaust passage 59.

When the compressed air in the head valve chamber 38 is exhausted, the movable part 34 of the head valve 30 is pushed up by the compressed air in the main chamber 5 and the movable part 34 and the locking part 25 are opened therebetween, so that the compressed air in the main chamber 5 is caused to flow into the piston upper chamber 24*a* and the piston 24 rapidly descends in the cylinder 26.

Figure 8:
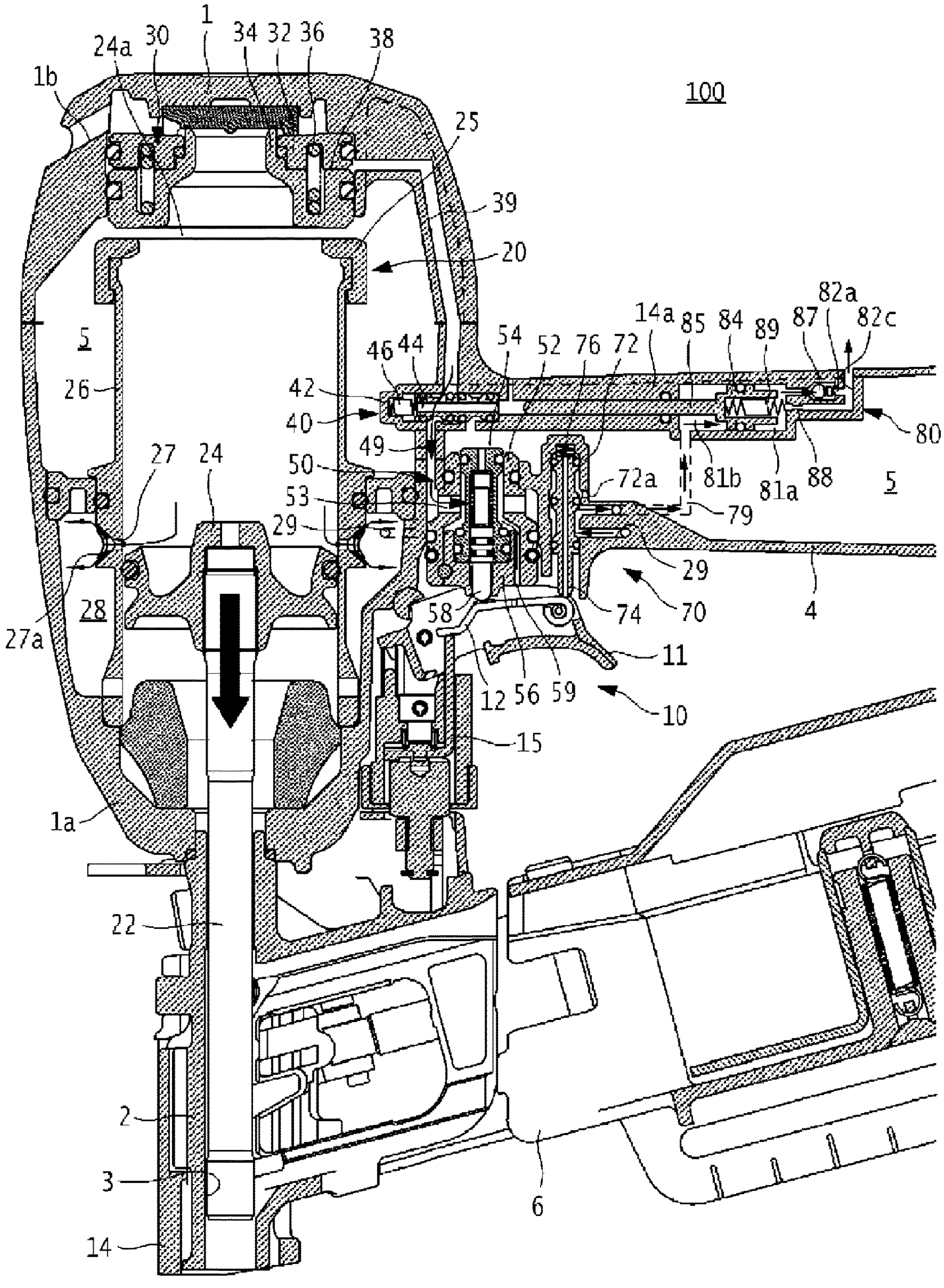
FIG. 8 is an operation view upon striking in the nailing machine according to the first embodiment.

As shown in FIG. 8, when the piston 24 further descends, the nail is struck into the to-be-struck member by the driver 22 connected to the piston 24. In addition, when the piston 24 descends to the lower part-side in the cylinder 26, the compressed air in the cylinder 26 is caused to flow into the blow back chamber 28 via the small holes 27. The inflow compressed air is supplied to the second space 81*b* of the timer valve 80 via the first connection passage 29, the inside of the switch valve 70 and the fourth connection passage 79. Thereby, the timer valve 80 is again retreated to the initial position in the cylinder 81, so that the timer valve 80 is reset. As the timer valve 80 is retreated, the atmospheric air in the first space 81*a* is exhausted to the outer side of the housing 1*a* via the first passage 82*a* and the third passage 82*c*.

Figure 9:
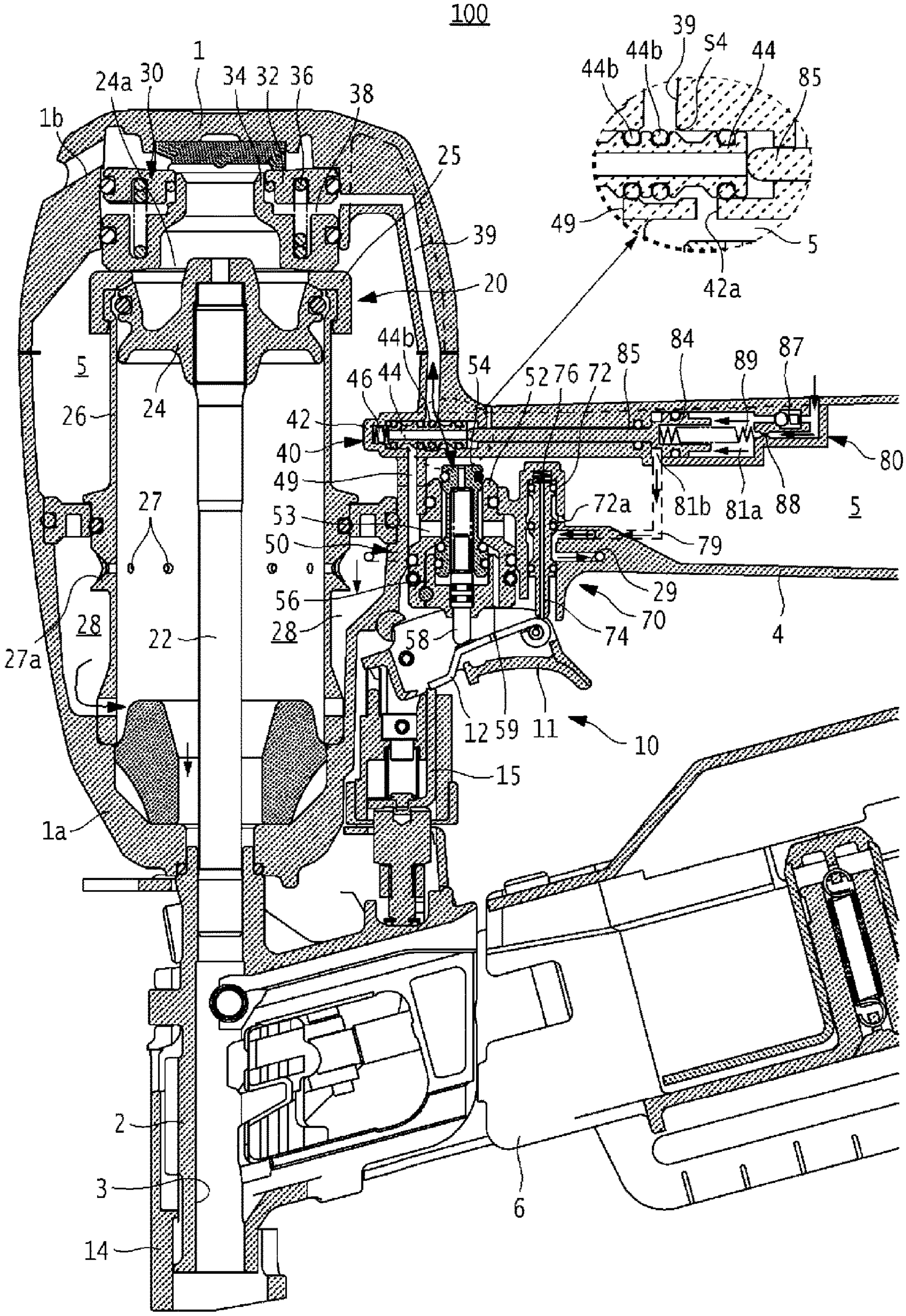
FIG. 9 is an operation view upon striking in the nailing machine according to the first embodiment.

As shown in FIG. 9, when the contact arm 14 is not pressed against the to-be-struck member, i.e., the striking operation is not executed within the prescribed time from the time point when the switch valve 70 shown in FIG. 6 is actuated, the timer valve 80 times out. Specifically, the timer valve 84 of the timer valve 80 is moved to the actuation position in which the control valve 40 on the front end-side in the cylinder 81 is pressed.

The control valve stem 44 of the control valve 40 is pushed by the piston shaft part 85 and is moved toward the front end-side of the cylinder 42. When the control valve stem 44 is advanced, the O-rings 44*a* and 44*b* are also advanced, so that while the path communicating the second connection passage 39 and the third connection passage 49 each other is shut off, a gap S4 is formed. Thereby, the head valve chamber 38 is switched from the communication state with the trigger valve 50 to the communication state with the main chamber 5 via the second connection passage 39, the gap S4 and the passage 42*a* of the control valve 40.

Figure 10:
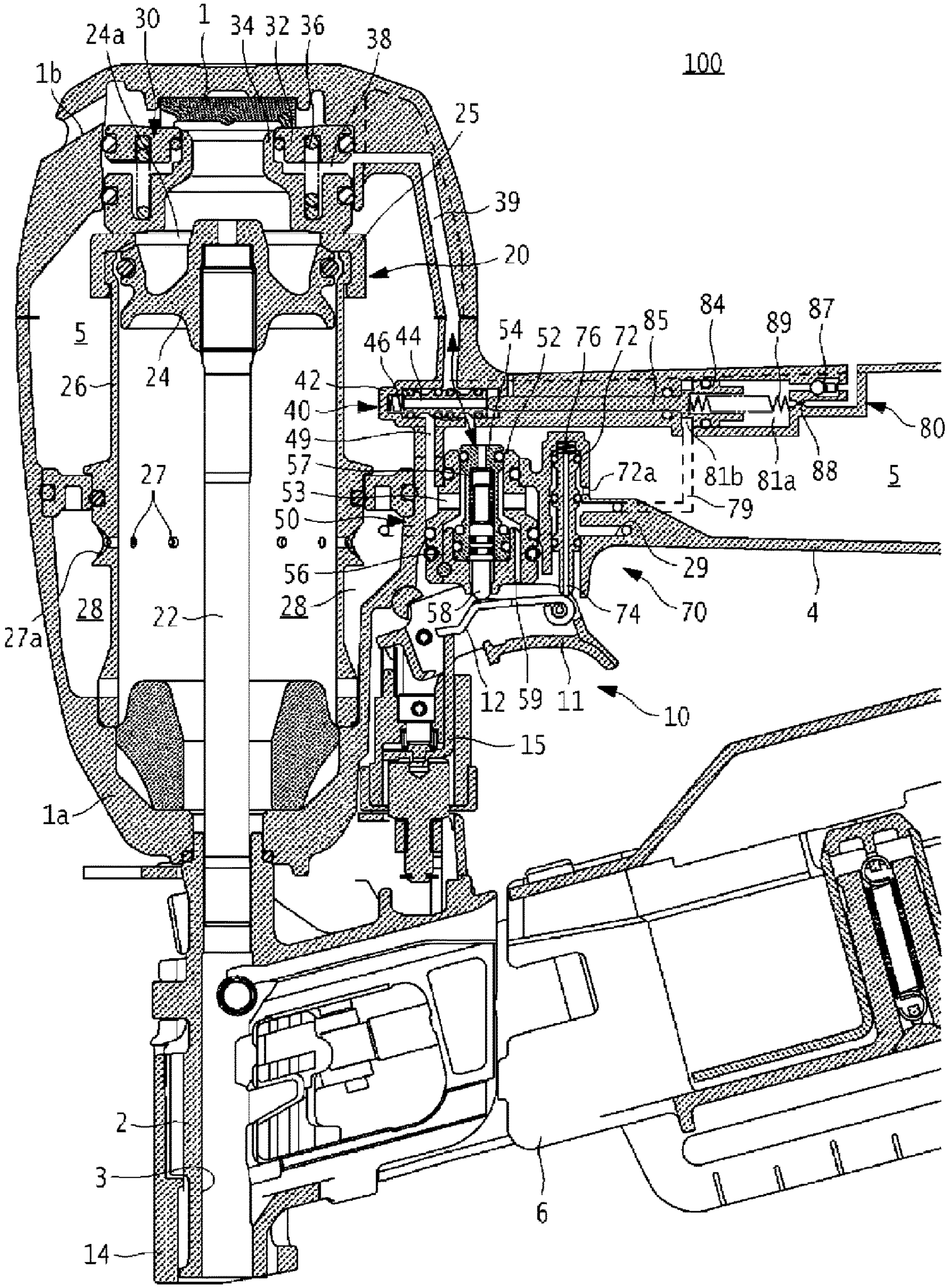
FIG. 10 is an operation view upon striking in the nailing machine according to the first embodiment.

As shown in FIG. 10, when the contact arm 14 is pressed against the to-be-struck member in a state of the switch valve 70 shown in FIG. 6 being actuated and after timeout of the timer valve 80, the pressing member 15 is accordingly pushed up. The front end-side of the contact lever 12 is pushed up by the pressing member 15, and the trigger valve stem 58 of the trigger valve 50 is pushed up by the pushed-up contact lever 12. Thereby, the trigger valve 50 is actuated. When the trigger valve stem 58 is pushed up, the O-rings 58*a* and 58*b* are moved upward, as shown in FIG. 2, so that the compressed air in the empty chamber 55 is exhausted from the gap S3 between the cap 56 and the trigger valve stem 58 to the outside. The pilot valve 54 is pushed down against the elastic force of the compression spring 57 by the compressed air in the main chamber 5, so that the lower surface of the pilot valve 54 comes into contact with the upper surface of the cap 56. Thereby, the passage 53 and the air exhaust passage 59 communicate with each other.

However, in a timeout state of the timer valve 80, while the path between the second connection passage 39 and the third connection passage 49 is shut off by the control valve 40 shown in FIG. 9, the second connection passage 39 and the main chamber 5 communicate with each other. For this reason, the compressed air in the head valve chamber 38 is left remaining in the head valve chamber 38 without being exhausted to the outside via the air exhaust passage 59 provided to the trigger valve 50. Thereby, when the timer valve 80 times out, the head valve 30 is not actuated even though the contact arm 14 is pressed against the to-be-struck member in a state where the operator pulls the trigger lever 11. Therefore, the striking operation is not executed after timeout of the timer valve 80.

As described above, according to the first embodiment, the atmospheric air with no variation in pressure outside the housing 1*a* is restricted to a constant flow rate by the throttle portion 88 and is caused to flow into the cylinder 81, and the timer piston 84 is advanced (actuated) using the atmospheric air and the compression spring 89. Thereby, since the moving speed of the timer valve 80 can be controlled without using the compressed air with variation in pressure, the variation in prescribed time until the control valve 40 is actuated can be prevented. Specifically, even when the pressure of the compressed air that is used in the nailing machine 100 varies, the time measurement of the timer valve 80 can be maintained constant. Thereby, the operation of the timer valve 80 can be stabilized. Note that, even though it is not configured so that the compressed air in the housing 1*a* does not completely act on the timer piston 84, it goes without saying that if it is configured so that the generated force of the compression spring sufficiently acts (dominates), the similar effects are obtained because it is less susceptible to the variation in pressure. In addition, in the first embodiment, when an operator's finger detaches from the trigger lever 11 after timeout of the timer valve 80, the timer valve 80 is reset by the compressed air in the main chamber 5, so that a follow-up striking operation can be performed. Further, after the usual striking operation, since the timer valve 80 is reset by the inflow compressed air from the blow back chamber 28, a follow-up striking operation can be performed by the pressing of the contact arm 14 in the state where the trigger lever 11 is pressed.

Further, according to the present embodiment, since the timer valve 80 is arranged in the grip part 4 so that the moving direction of the timer piston 84 of the timer valve 80 is orthogonal to the moving direction of the striking mechanism 20, it is possible to prevent the timer valve 80 from receiving a shock that is generated upon the striking operation of the striking mechanism 20. Thereby, it is possible to prevent an erroneous operation of the timer valve 80, so that it is possible to stabilize the operation of the timer valve 80.

Second Embodiment

In a timer valve 280 of a second embodiment, a mechanical configuration different from the timer valve 80 of the first embodiment is adopted. Note that, the other configuration, function and operation of a nailing machine 200 are common to the configuration and the like of the nailing machine 100 of the first embodiment. Therefore, the detailed descriptions thereof are omitted, and only the configuration and the like of the timer valve 280 of the second embodiment are described.

[Configuration Example of Nailing Machine 200]

Figure 11:
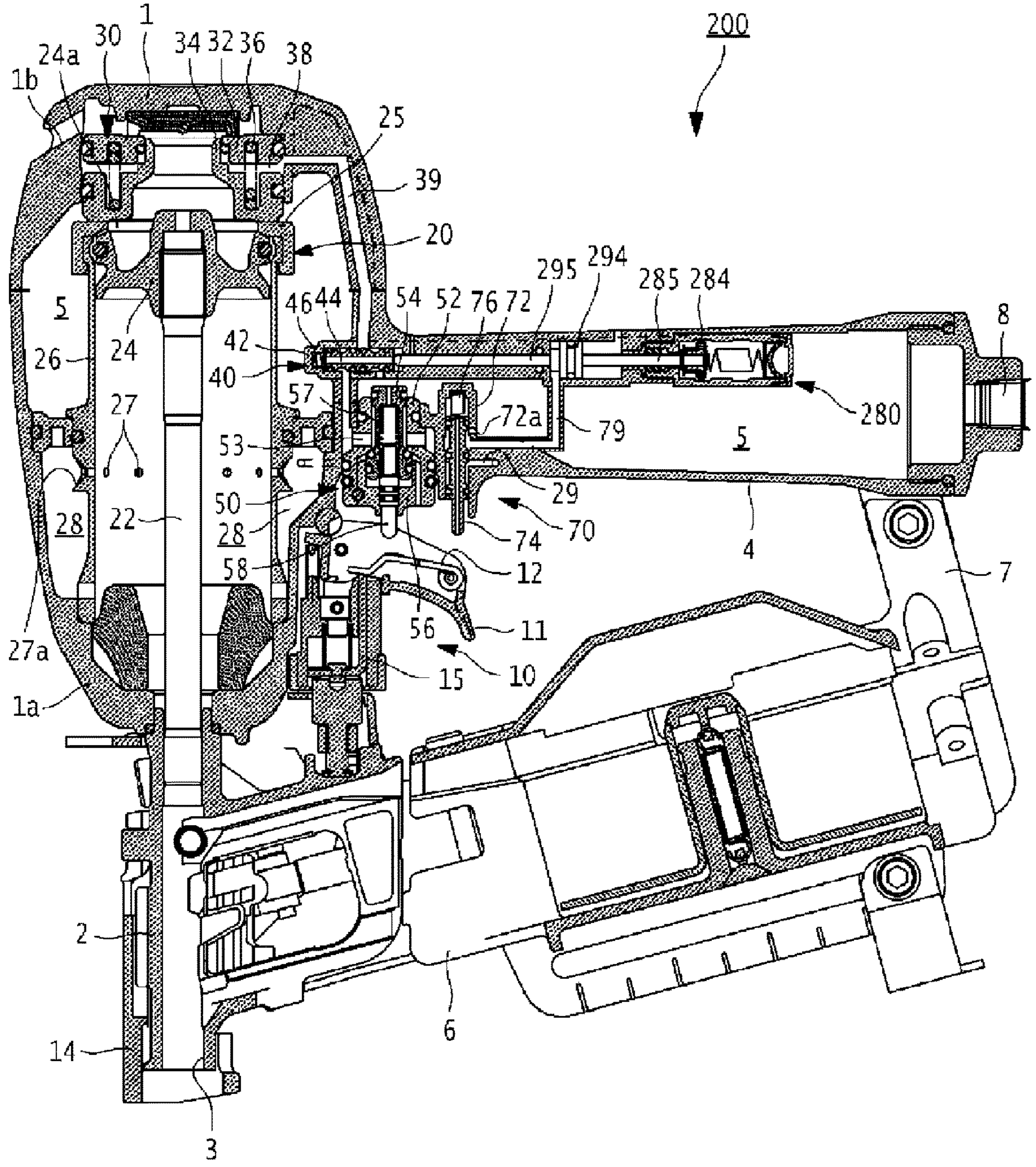
FIG. 11 is a side sectional view of a nailing machine according to a second embodiment.
Figure 12:
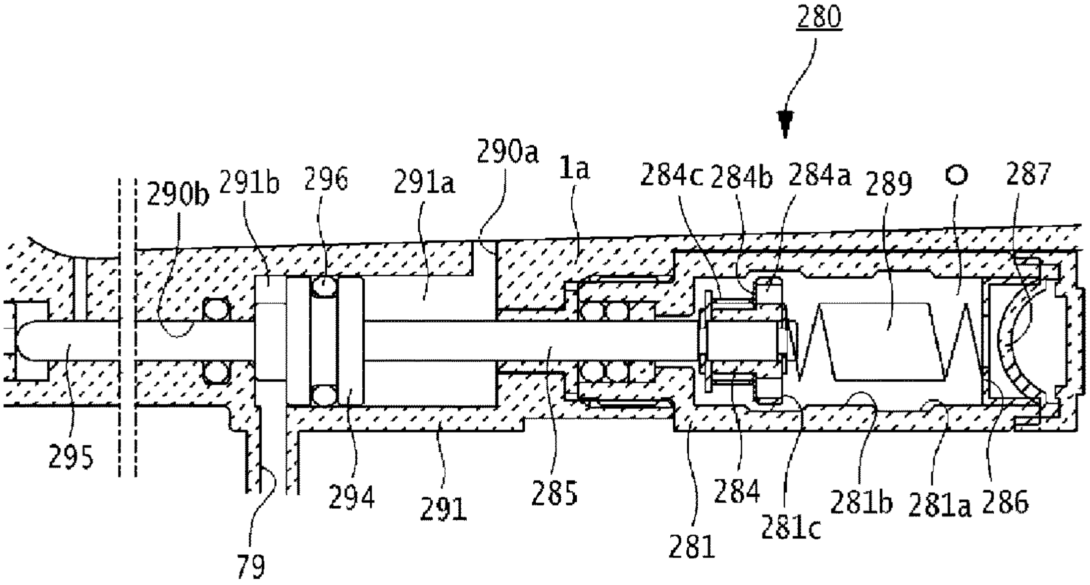
FIG. 12 is a side sectional view of a timer valve according to the second embodiment.

FIG. 11 is a side sectional view of a nailing machine 200 according to a second embodiment. FIG. 12 is a side sectional view of a timer valve 280 according to the second embodiment.

As shown in FIG. 11, the nailing machine 200 is an example of the pneumatic tool, and includes the piston 24 configured to be slidable in the cylinder 26, the striking mechanism 20 having the driver 22 attached to the piston 24 and configured to strike a nail into the to-be-struck member, the head valve 30 configured to drive the striking mechanism 20 by using the compressed air that is supplied from the main chamber 5, the trigger valve 50 configured to actuate the head valve 30, and the control valve 40 configured to disable actuation of the head valve 30 configured to be actuated in conjunction with actuation of the trigger valve 50.

The nailing machine 200 also includes a timer valve 280 configured to restrict a striking operation by actuating the control valve 40 to disable actuation of the head valve 30 when a predetermined time elapses in a state where the trigger lever 11 is pushed. The timer valve 280 has a first cylinder 281, a first timer piston 284, a first piston shaft part 285, a second cylinder 291, a second timer piston 294, and a second piston shaft part 295.

The first cylinder 281 is a hollow cylindrical body extending in the front and rear direction, and is configured to accommodate the first timer piston 284 so as to be slidable in the front and rear direction. In the first cylinder 281, oil O for attenuating a moving speed of the first timer piston 284 is filled. The first cylinder 281 and the oil O constitute an example of an oil-type damper mechanism. In the present embodiment, the first cylinder 281 is fitted to the second cylinder 291 that constitutes the housing 1*a*, and a front end-side thereof is configured to communicate with an inside of the second cylinder 291.

Note that, the damper mechanism is not limited to the oil-type damper mechanism. For example, well-known technologies such as a damper mechanism using a friction resistance between solid members and a damper mechanism using an attenuation force of a member such as rubber configured to be elastically deformed can be adopted as appropriate.

The first timer piston 284 is a cylindrical body having substantially the same diameter as an inner diameter of the first cylinder 281, and is configured to slide in the front and rear direction in the first cylinder 281. A moving speed of the first timer piston 284 in the front and rear direction is controlled by a resistance due to viscosity and the like of the oil O. A peripheral edge portion of the first timer piston 284 is formed with an annular through-hole 284*a* penetrating in a thickness direction (front and rear direction). A front surface of the through-hole 284*a* is provided with a check valve 284*b* configured to open/close an opening of the through-hole 284*a*. The check valve 284*b* is urged toward the first timer piston 284 (toward the rear side) by a compression spring 284*c*, and is configured to move toward or away from the first timer piston 284, according to a moving direction of the first timer piston 284.

The first timer piston 284 is urged toward the control valve 40 (toward the front side) by a compression spring 289. The compression spring 289 is interposed between a rear end face of the first timer piston 284 and a spring retainer plate 286 provided on a rear side of the inside of the first cylinder 281, and is adapted to expand and contract, according to a position of the first timer piston 284.

The first piston shaft part 285 is a rod-shaped columnar body, and a rear end portion thereof is attached to the first timer piston 284. The first piston shaft part 285 extends into the second cylinder 291 from the inside of the first cylinder 281, and a front end portion of the extending first piston shaft part 285 is attached to a rear end portion of the second tinier piston 294. Thereby, an operation of the first timer piston 284 can be transmitted to the second timer piston 294 via the first piston shaft part 285. When the time measurement of the timer valve 280 starts, the first piston shaft part 285 presses forward the second timer piston 294.

A rear part-side of the first cylinder 281 is formed with a first flow path 281*a* configured to reduce a resistance at the time when the first timer piston 284 moves in the first cylinder 281. The first flow path 281*a* is formed by cutting an inner wall of the first cylinder 281 in a concave surface shape in a circumferential direction around the initial position that is a start end of a moving range of the first timer piston 284. An inner diameter of the first cylinder 281 at which the first flow path 281*a* is located is made larger than an inner diameter of the first cylinder 281 at which a second flow path 281*b*, which will be described later, is located.

A second flow path 281*b* configured to increase a load at the time when the first timer piston 284 moves in the first cylinder 281 is formed between the first flow path 281*a* of the inner wall of the first cylinder 281 and a third flow path 281*c*, which will be described later. The second flow path 281*b* is formed to have a convex surface shape in the circumferential direction of the inner wall of the first cylinder 281. An inner diameter of the first cylinder 281 at which the second flow path 281*b* is located is made smaller than the inner diameter of the first cylinder 281 at which the first flow path 281*a* is located.

A front part-side of the first cylinder 281 is formed with a third flow path 281*c* configured to reduce a load at the time when the first tinier piston 284 moves in the first cylinder 281. The third flow path 281*c* is formed by cutting an inner wall of the first cylinder 281 in a concave surface shape in the circumferential direction around the operation position that is a terminal end of the moving range of the first timer piston 284. An inner diameter of the first cylinder 281 at which the third flow path 281*c* is located is made larger than the inner diameter of the first cylinder 281 at which the second flow path 281*b* is located.

A diaphragm 287 is arranged between the spring retainer plate 286 and a rear wall in the first cylinder 281. The diaphragm 287 is made of a resin material such as elastically deformable rubber, and is configured to be deformed according to a length of the first piston shaft part 285 arranged in the first cylinder 281. Thereby, even when a volume in the first cylinder 281 changes by a volume of the first piston shaft part 285 arranged in the first cylinder 281, the volume in the first cylinder 281 can be maintained constant.

The second cylinder 291 is a hollow cylindrical body extending in the front and rear direction, and is configured to accommodate the second timer piston 294 so as to be slidable in the front and rear direction. In the present embodiment, a part of the second cylinder 291 has a structure sharing a part of the housing 1*a*.

The second timer piston 294 is a cylindrical body having substantially the same diameter as an inner diameter of the second cylinder 291, and is configured to be advanced and retreated in the second cylinder 291, according to the pressing by the first piston shaft part 285. A peripheral edge portion of the second timer piston 294 is mounted with an O-ring 296 for sealing between the peripheral edge portion and an inner wall of the second cylinder 291. Thereby, the second cylinder 291 is further partitioned into a first space 291*a* on a rear side of the O-ring 296 and a second space 291*b* on a front side of the O-ring 296.

The first space 291*a* is formed with a passage 290*a* configured to communicate with an outside of the housing 1*a*. One end portion of the fourth connection passage 79 configured to communicate with the switch valve 70 is connected to the second space 291*b*, so that the compressed air can be supplied to the timer valve 280 or the compressed air can be exhausted from the timer valve 280 via the fourth connection passage 79.

The second piston shaft part 295 is a rod-shaped columnar body, and a rear end portion of the second piston shaft part 295 is attached to a front end portion of the second timer piston 294. The second piston shaft part 295 can move in the front and rear direction in a through-hole 290*b* formed between the second timer piston 294 and the control valve 40. A front end portion of the second piston shaft part 295 is provided to appear and disappear with respect to the inside of the cylinder 42 of the control valve 40, and is configured to actuate the control valve 40 by pressing the rear end face of the control valve stem 44 constituting the control valve 40.

As shown in FIGS. 11 and 12, the timer valve 280 is arranged in the grip part 4 so that a moving direction of the first timer piston 284 is different from, in the present embodiment, orthogonal to, the axial direction of the cylinder 26 (the moving direction of the driver 22). In addition, the timer valve 280 is arranged in the grip part 4 so that the moving direction of the first timer piston 284 is along the extension direction of the grip part 4, i.e., is parallel to the extension direction of the grip part 4.

[Operation Example of Nailing Machine 200]

Subsequently, an example of the striking operation of the nailing machine 200 is described with reference to FIGS. 11 and 12, and the like. In a case of performing a striking operation by using the nailing machine 100, when the air hose is connected to the air plug 8 shown in FIG. 11, the compressed air is supplied into the main chamber 5. The compressed air supplied into the main chamber 5 is supplied to the second space 291*b* of the timer valve 280 via the inside of the switch valve 70 and the fourth connection passage 79.

Along with this, the second timer piston 294 is urged backward by the compressed air, so that the first tinier piston 284 is retreated to the initial position in the first cylinder 281.

In this case, the oil O flows from the rear side toward the front side with respect to the first timer piston 284 that is retreated. For this reason, the oil O enters from the front side of the through-hole 284*a*, so that the check valve 284*b* is pressed forward by the entering oil O and the compression spring 284*c* is compressed. Along with this, the check valve 284*b* separates from the front surface of the first timer piston 284, so that the through-hole 284*a* opens. For this reason, the oil O can path through the through-hole 284*a* and the resistance by the oil O at the time when the first timer piston 284 moves is reduced, so that the first timer piston 284 is retreated to the initial position in the first cylinder 281 at relatively high speed.

Continuously, when the trigger lever 11 is pulled by the operator, the switch valve stem 74 of the switch valve 70 is pushed up by the contact lever 12, so that the switch valve 70 is actuated. Thereby, the compressed air in the timer valve 280 is exhausted to the blow back chamber 28 at the atmospheric pressure via the fourth connection passage 79, the inside of the switch valve 70 and the first connection passage 29.

When the compressed air in the second space 291*b* of the second cylinder 291 is exhausted, the first timer piston 284 is advanced against the resistance of the oil O and the like by the urging of the compression spring 289.

Specifically, when the first timer piston 284 is advanced, the oil O flows from the front side toward the rear side with respect to the first timer piston 284. At this time, since the oil O collides with the front surface of the check valve 284*b*, the through-hole 284*a* is closed by the check valve 284*b*. For this reason, when the first timer piston 284 is advanced, a collision area of the oil O with the first timer piston 284 increases, so that the resistance due to the oil O increases. Thereby, the first timer piston 284 is slowly advanced while receiving the resistance due to the oil O.

In addition, when the first timer piston 284 is located in the first flow path 281*a* inside the first cylinder 281, an interval between the inner peripheral surface of the first cylinder 281 and the outer peripheral surface of the first timer piston 284 becomes a wide first interval. For this reason, the resistance due to the oil O at the time of flowing in the first flow path 281*a* is reduced, and the load at the time when the first timer piston 284 is advanced is also reduced. In the below, in this case, the moving speed of the first timer piston 284 is referred to as 'first speed'.

Continuously, the first timer piston 284 is moved from the first flow path 281*a* to a position facing the second flow path 281*b* in the first cylinder 281. In this case, the interval between the inner peripheral surface of the first cylinder 281 and the outer peripheral surface of the first timer piston 284 becomes a second interval narrower than the first interval. For this reason, the resistance of the oil O at the time of flowing in the third flow path 281*c* is slightly increased, and the load at the time when the first timer piston 284 is advanced is also slightly increased. Thereby, the first timer piston 284 is moved at a second speed slightly slower than the first speed while receiving the resistance due to the oil O.

Continuously, the first timer piston 284 is moved from the second flow path 281*b* to a position facing the third flow path 281*c* in the first cylinder 281. The interval between the inner peripheral surface of the first cylinder 281 and the outer peripheral surface of the first timer piston 284 becomes the first interval wider than the second interval. For this reason, the resistance of the oil O at the time of flowing in the third flow path 281*c* is reduced, and the load at the time when the first timer piston 284 is advanced is also reduced. Thereby, the first timer piston 284 is slowly moved at the first speed slightly faster than the second speed while receiving the resistance due to the oil O.

In this way, the load at the time when the first timer piston 284 is moved is reduced immediately before actuation of the control valve 40, so that the moving speed of the first timer piston 284 and the like can be increased and the control valve stem 44 can be pushed with a strong force by the second piston shaft part 295. Thereby, the control valve 40 can be actuated securely and with high accuracy.

As described above, according to the second embodiment, since the moving speed of the first timer piston 284 is controlled by the damper mechanism using the oil O filled in the first cylinder 281, the variation in prescribed time until the control valve 40 is actuated can be prevented, so that the actuation of the timer valve 280 can be stabilized. Specifically, even when the pressure of the compressed air that is used for drive of the striking mechanism 20 of the nailing machine 200 varies, the time measurement of the timer valve 280 can be maintained constant. Thereby, the operation of the timer valve 280 can be stabilized.

Further, since the timer valve 280 is arranged in the grip part 4 so that the moving direction of the first timer piston 284 of the timer valve 280 is orthogonal to the moving direction of the striking mechanism 20, it is possible to prevent the timer valve 280 from receiving a shock that is generated upon the striking operation of the striking mechanism 20. Thereby, it is possible to prevent an erroneous operation of the timer valve 280, so that it is possible to stabilize the operation of the timer valve 80.

Note that, the technical scope of the present invention is not limited to the above-described embodiments, and the above-described embodiments can be variously changed without departing from the gist of the present invention. Specifically, in the above embodiments, the nailing machines 100 and 200 have been described as an example of the pneumatic tool. However, the present invention is not limited thereto. For example, as the pneumatic tool, the present invention can be applied to a screw fastening tool, a screw driving tool and the like.

In addition, in the first and second embodiments, the example where the control valve 40 is arranged between the head valve 30 and the trigger valve 50 has been described. However, the present invention is not limited thereto. For example, the control valve 40 may also be arranged in the trigger valve 50. In addition, in the first and second embodiments, the passage between the head valve 30 and the trigger valve 50 is shut off by the control valve 40. However, the present invention is not limited thereto. For example, a structure where the actuation of the head valve 30 is mechanically disabled by the control valve 40 and 240 can be adopted. Further, in the first and second embodiments, when the prescribed time by the timer valve 80 elapses, the control valve 40 is pressed and actuated by the timer valve 80, so that the passage between the head valve 30 and the timer valve 50 is completely shut off when the predetermined time elapses. However, the present invention is not limited thereto. For example, a configuration where the control valve 40 is actuated in a state of being pressed from a first stage by the timer valve 80 and the passage between the head valve 30 and the timer valve 50 is completely shut off when the predetermined time elapses may also be adopted. Further, in the first and second embodiment, the control valve 40 is actuated by being pressed. However, the present invention is not limited thereto. For example, the control valve 40 may also be actuated by being pulled.

Third Embodiment

[Configuration Example of Nailing Machine 1100]

Figure 13:
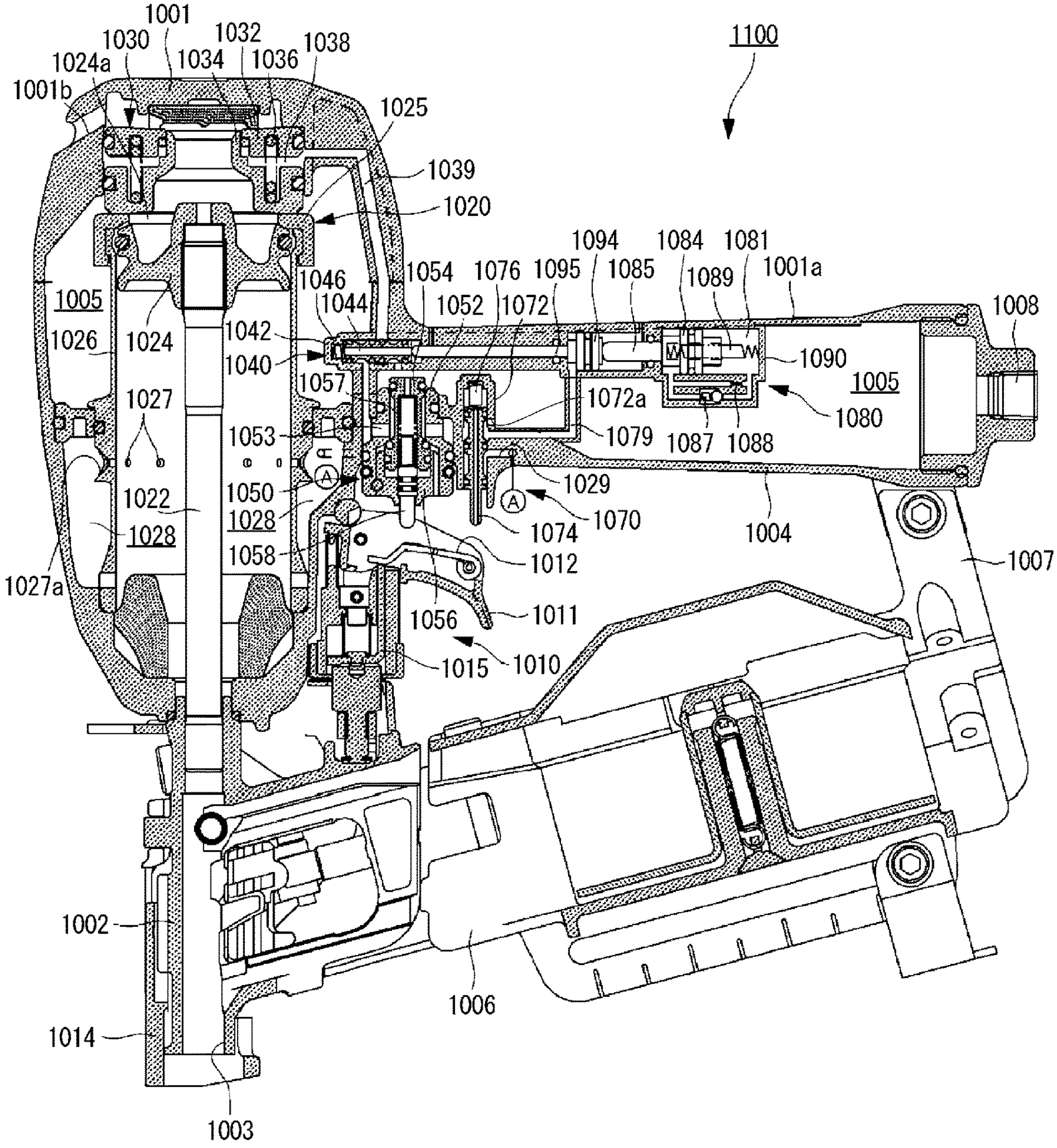
FIG. 13 is a side sectional view of a nailing machine according to a second embodiment.
Figure 14:
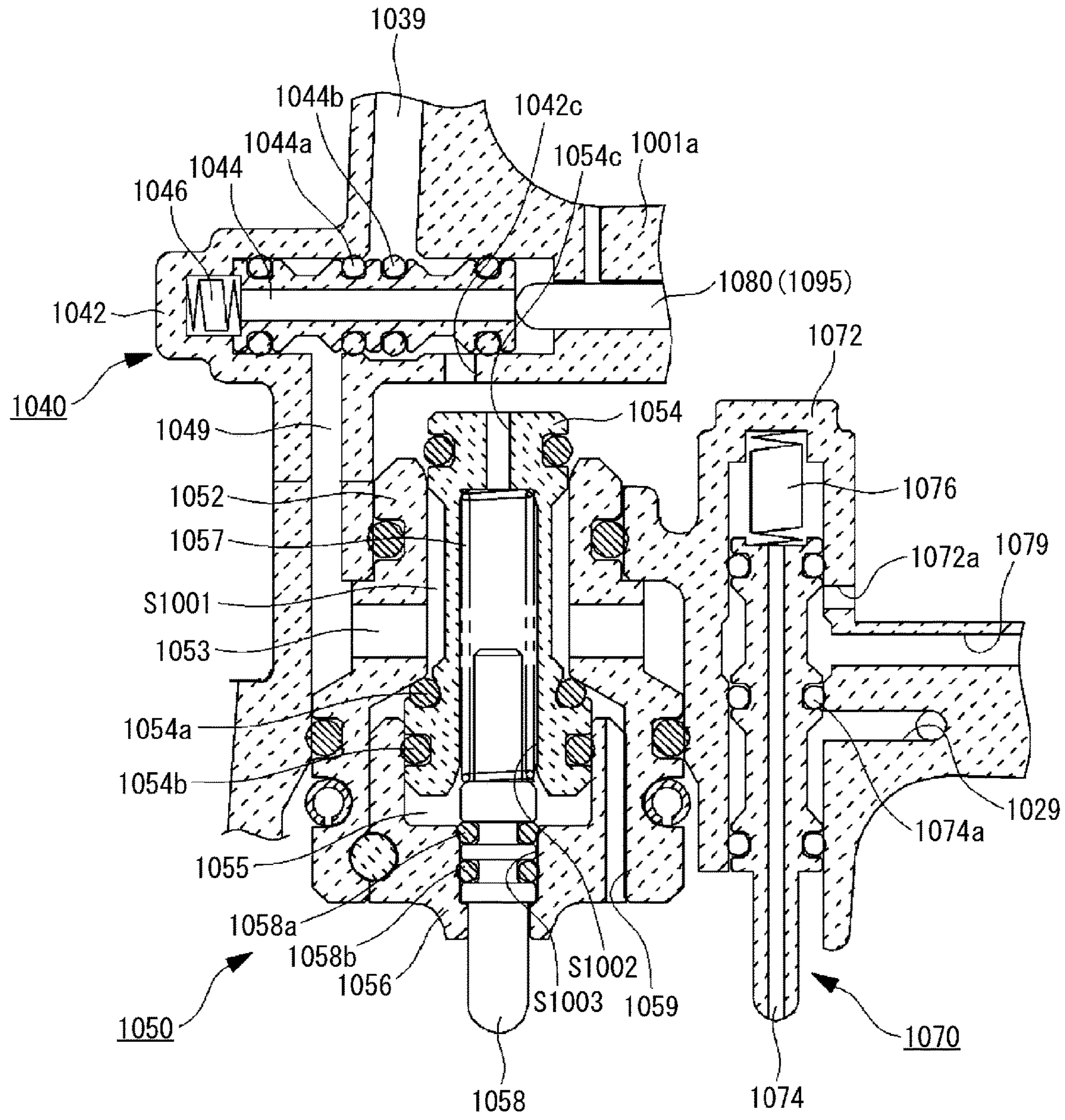
FIG. 14 is a side sectional view of a control valve, a trigger valve and a switch valve according to the third embodiment.
Figure 15:
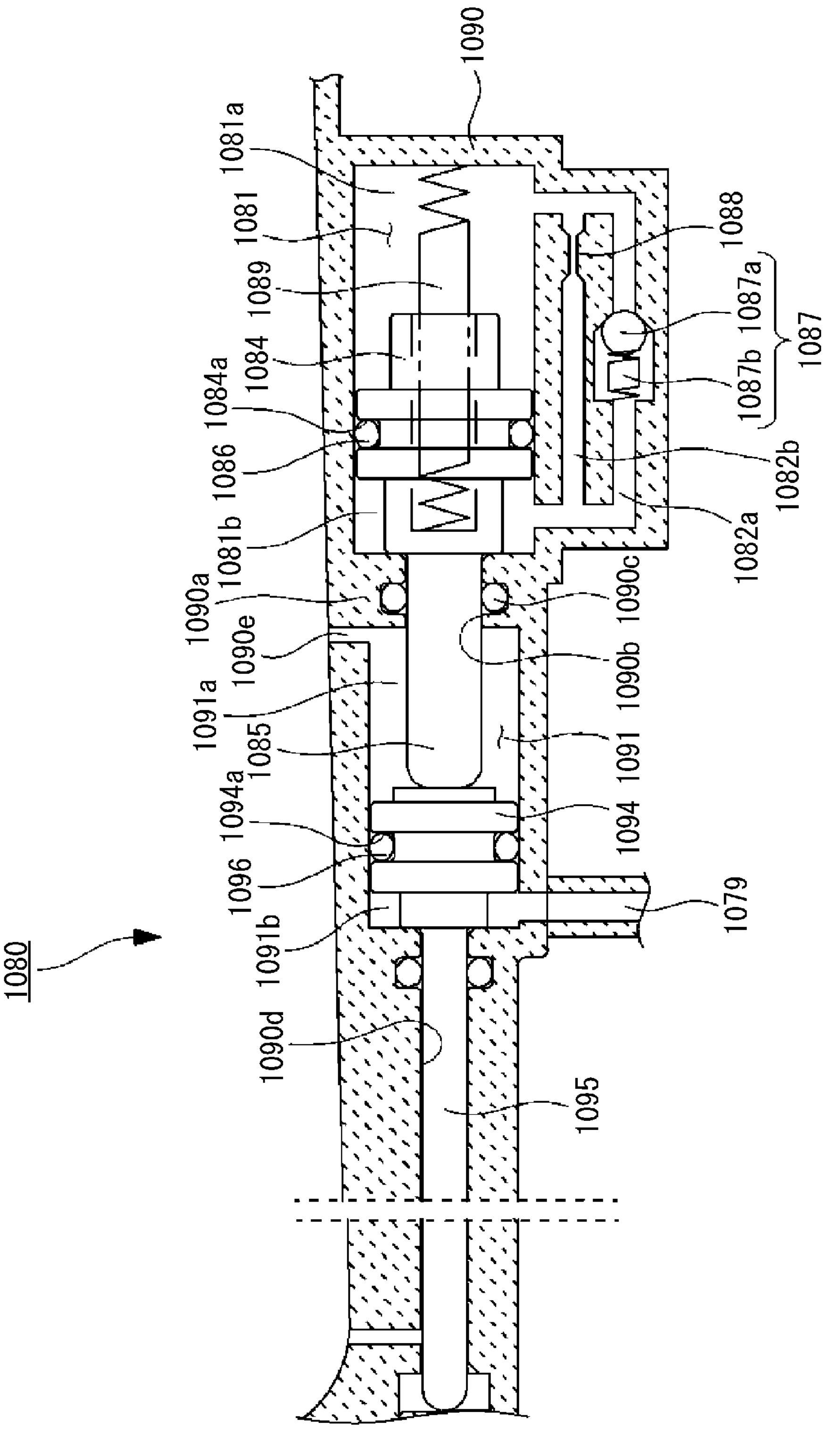
FIG. 15 is a side sectional view of a timer valve according to the third embodiment.

FIG. 13 is a side sectional view of a nailing machine 1100 according to a third embodiment. FIG. 14 is a side sectional view of a trigger valve 1050, a switch valve 1070 and a control valve 1040 according to the third embodiment. FIG. 15 is a side sectional view of a timer valve 1080 according to the third embodiment.

The nailing machine 1100 is an example of the pneumatic tool, and includes, as shown in IG. 13, a main body 1001 having a nose part 1002, a grip part 1004 that is gripped by an operator, and a magazine part 1006 in which nails to be struck into a to-be-struck member are loaded. Housings of the main body 1001 and the grip part 1004 are integrally formed by a housing 1001*a*, for example. The nailing machine 1100 also includes a head valve 1030, a trigger mechanism 1010, a trigger valve 1050, a switch valve 1070, a timer valve 1080 and a control valve 1040.

Note that, in the present embodiment, the nose part 1002-side of the nailing machine 1100 is referred to as a lower side of the nailing machine 1100, and an opposite side thereto is referred to as an upper side of the nailing machine 1100. Also, the main body 1001-side of the nailing machine 1100 is referred to as a front side of the nailing machine 1100, and the grip part 1004-side of the nailing machine 1100 is referred to as a rear side of the nailing machine 1100.

An inside of the main body 1001 is hollow, and a striking mechanism (drive mechanism) 1020 configured to drive by an air pressure of compressed air is arranged in the main body 1001. The striking mechanism 1020 has a driver 1022, a piston 1024, and a cylinder 1026. The driver 1022 is configured to reciprocally move in the upper and lower direction (axial direction) in the cylinder 1026, and to impact a head portion of a nail delivered from the magazine part 1006, thereby striking the nail into a to-be-struck member. The piston 1024 is connected to an upper end portion of the driver 1022, and is configured to reciprocally move in the cylinder 1026, in response to the compressed air flowing into a piston upper chamber 1024*a* provided on an upper side of the cylinder 1026. The cylinder 1026 is a cylindrical body, is arranged in the housing 1001*a* constituting the main body 1001, and is configured to accommodate the driver 1022 and the piston 1024 to be reciprocally movable in the upper and lower direction. An annular locking part 1025 configured to regulate upward movement of the piston 1024 is provided between the piston 1024 and the head valve 1030.

A lower end portion of the main body 1001 is provided with the nose part 1002. The nose part 1002 protrudes downward from the lower end portion of the main body 1001 by a predetermined length. The nose part 1002 is formed with an ejection port 1003 for striking out the nail delivered by the driver 1022 to an outside. The ejection port 1003 is arranged coaxially with the driver 1022 and the cylinder 1026.

A main chamber 1005 in which the compressed air is supplied and filled is provided between an inner wall on an upper side of the main body 1001 and an outer peripheral part on an upper side of the cylinder 1026 and in the grip part 1004. A blow back chamber 1028 for returning the piston 1024 to a top dead center is provided between an inner wall on a lower side of the main body 1001 and an outer peripheral part on a lower side of the cylinder 1026. One end portion of a first connection passage 1029 configured to communicate with the switch valve 1070 is configured to communicate with the blow back chamber 1028.

A plurality of small holes 1027 is formed at predetermined intervals in a substantially intermediate position in the axial direction of the cylinder 1026 and in a circumferential direction of the cylinder 1026. The plurality of small holes 1027 is formed to communicate with the blow back chamber 1028 via a check valve 1027*a* provided to the cylinder 1026. Note that, when the piston 1024 is located at a bottom dead center below the small holes 1027, the compressed air in the cylinder 1026 is caused to flow into the blow back chamber 1028 via the small holes 1027. In addition, when the piston 1024 is located at the top dead center, the compressed air in the blow back chamber 1028 is discharged to the atmosphere, so that the inside of the blow back chamber 1028 becomes an atmospheric pressure.

The head valve 1030 is configured to perform supply and shut-off of the compressed air to the cylinder 1026, and to drive the striking mechanism 1020 by using the compressed air supplied from the main chamber 1005. The head valve 1030 has a base part 1032 and a movable part 1034. The base part 1032 is arranged on an upper end-side in the main body 1001, and the movable part 1034 is arranged below the base part 1032. The movable part 1034 is urged toward the cylinder 1026 at a predetermined interval from the base part 1032 by an urging spring 1036 interposed between the base part 1032 and the movable part 1034. A lower surface of the movable part 1034 is in contact with an upper surface of the locking part 1025 in an urging state (a state where the head valve 1030 is off), so that the main chamber 1005 and the piston upper chamber 1024*a* are shut off therebetween.

The interval between the base part 1032 and the movable part 1034 is configured to function as a head valve chamber 1038 to which the compressed air in the main chamber 1005 is supplied. One end portion of a second connection passage 1039 is configured to communicate with the head valve chamber 1038, and the other end-side of the second connection passage 1039 is configured to communicate with the control valve 1040. The movable part 1034 is configured to slide along an inner wall of the housing 1001*a* constituting the main body 1001 and to open % close between the piston upper chamber 1024*a* and the main chamber 1005, according to a state of the compressed air in the head valve chamber 1038. The piston upper chamber 1024*a* is configured to communicate with an outside via an opening portion 1001*b* formed in the housing 1001*a*.

The grip part 1004 is attached to a side part on the rear side of the main body 1001 in a direction substantially orthogonal to an extension direction of the main body 1001 tan axial direction of the cylinder 1026). A rear end portion of the grip part 1004 is provided with an air plug 1008. One end portion of an air hose (not shown) is connected to the air plug 1008, and the other end portion of the air hose is connected to a compressor (not shown). The air compressor is configured to generate the compressed air for driving the striking mechanism 1020 and to supply the generated compressed air into the main chamber 1005 via the air hose and the air plug 1008.

The trigger mechanism 1010 has a trigger lever 1011, a contact lever 1012, a contact arm 1014 and a pressing member 1015. The trigger lever 1011 is a lever for turning on (actuating) the switch valve 1070, and is attached to a side surface on the rear side of the main body 1001 and a lower side of the grip part 1004 so as to be rotatable about a shah part as a fulcrum. The contact lever 1012 is arranged in the trigger lever 1011 and is configured to rotate about a front end-side as a fulcrum in conjunction with the trigger lever 1011. A front end portion of the contact lever 1012 is urged downward by, for example, a torsion spring provided on a rear end-side, and is in contact with an upper end face of the pressing member 1015. Note that, the contact lever 1012 may not be urged by the spring.

The contact arm 1014 is attached to an outer peripheral part of the nose part 1002 in a state of protruding downward from a lower end portion of the nose part 1002. The contact arm 1014 is urged downward by a spring (not shown), and is configured to reciprocally move in the upper and lower direction relative to the nose part 1002 in conjunction with a pressing operation against the to-be-struck member. The pressing member 1015 is connected to the contact arm 1014, and is configured to push up a front end-side of the contact lever 1012 in conjunction with upward movement of the contact arm 1014. When the trigger lever 1011 is pulled, a trigger valve stem 1058 of the trigger valve 1050 is pushed up, so that the trigger valve 1050 is actuated (turned on).

The magazine part 1006 is configured so that a series of connected connecting nails can be loaded therein, and is provided on a lower side of the grip part 1004. A front end-side of the magazine part 1006 is connected to the nose part 1002, and a rear end-side of the magazine part 1006 is connected to the grip part 1004 via an attaching arm part 1007. The connecting nails loaded in the magazine part 1006 are guided to the ejection port 1003 of the nose part 1002 by a feeding claw provided to be slidable with respect to the nose part 1002, and is impacted and struck into the to-be-struck member by the descending driver 1022.

As shown in FIGS. 13 and 14, the trigger valve 1050 is configured to actuate the head valve 1030 based on a pressing state of the contact arm 1014 against the to-be-struck member. The trigger valve 1050 is arranged near the switch valve 1070 on a front end-side of the grip part 1004. The trigger valve 1050 has a housing 1052, a pilot valve 1054, a cap 1056 and a trigger valve stem 1058.

The housing 1052 has a passage 1053 provided in a substantially intermediate portion in the upper and lower direction. The passage 1053 is configured to communicate with one end portion of a third connection passage 1049 configured to connect the control valve 1040 (head valve 1030) and the trigger valve 1050 each other. The passage 1053 is also configured to be able to communicate with an air exhaust passage 1059 upon turning-on of the trigger valve 1050.

The pilot valve 1054 is arranged at a gap S1001 on an inner side of the housing 1052. O-rings 1054*a* and 1054*b* are attached at a predetermined interval in the upper and lower direction to a peripheral edge portion on a lower side of the pilot valve 1054. The O-ring 1054*a* is configured to shut off a passage between the passage 1053 and the air exhaust passage 1059 to thus prevent the compressed air in the head valve chamber 1038 from being leaked from the passage 1053 to an outside, during non-actuation of the trigger valve 1050. In addition, the O-ring 1054*a* is pressed against an inner wall of the housing 1052 to regulate upward movement of the pilot valve 1054. The O-ring 1054*b* is configured to shut off between an empty chamber 1055, which will be described later, and the air exhaust passage 1059.

The cap 1056 is attached on an inner side of the housing 1052 with an empty chamber 1055 being interposed between the cap and the pilot valve 1054 on the upper side. The empty chamber 1055 is configured to communicate with the main chamber 1005 via a gap S1002 between the pilot valve 1054 and the trigger valve stem 1058 and a passage 1054*c* of the pilot valve 1054 and to function as a chamber in which the compressed air is filled, during non-actuation of the trigger valve 1050.

The trigger valve stem 1058 is arranged on inner sides of the pilot valve 1054 and the cap 1056, and is provided to be movable in the upper and lower direction from the cap 1056 as a point of origin. An upper end-side of the trigger valve stem 1058 is urged toward the contact lever 1012 (toward the lower side) by a compression spring 1057. The compression spring 1057 is interposed between the pilot valve 1054 and the trigger valve stem 1058, and is adapted to expand and contract, in response to pressing of the trigger valve stem 1058. A lower end portion of the trigger valve stem 1058 protrudes from a lower surface of the cap 1056 by a predetermined length, and can come into contact with the contact lever 1012 (refer to FIG. 13). O-rings 1058*a* and 1058*b* are attached at a predetermined interval in the upper and lower direction to a peripheral edge portion of a substantially intermediate position in the upper and lower direction of the trigger valve stem 1058. The O-rings 1058*a* and 10586 are configured to prevent the compressed air in the empty chamber 1055 from being leaked from a gap S1003 between the trigger valve stem 1058 and the cap 1056 to an outside, during non-actuation of the trigger valve 1050.

An air exhaust passage 1059 is provided between the housing 1052 and the cap 1056. When the empty chamber 1055 is closed due to push-up of the trigger valve stem 1058 during actuation of the trigger valve 1050, the air exhaust passage 1059 communicates with the passage 1053 to exhaust the compressed air in the head valve chamber 1038 to the atmosphere.

As shown in FIGS. 13 and 14, the switch valve 1070 is arranged in the vicinity of a rear side of the trigger valve 1050, and is configured to actuate the timer valve 1080 based on an operation on the trigger lever 1011. The switch valve 1070 has a cylinder 1072 and a switch valve stem 1074.

The cylinder 1072 is a hollow cylindrical body extending in the upper and lower direction, and is configured to accommodate the switch valve stem 1074 so as to be slidable in the upper and lower direction. An upper side of the cylinder 1072 is formed with a first passage 1072*a*. The first passage 1072*a* is configured to communicate with the main chamber 1005, and the compressed air in the main chamber 1005 is caused to flow into the cylinder 1072 via the first passage 1072*a*.

One end portion of a fourth connection passage 1079 is configured to communicate in a substantially intermediate position in the upper and lower direction of the cylinder 1072, and the other end portion of the fourth connection passage 1079 is configured to communicate with the timer valve 1080. The fourth connection passage 1079 is configured to connect the switch valve 1070 and the timer valve 1080 each other, and the compressed air can be supplied or exhausted with respect to the timer valve 1080 via the fourth connection passage 1079. One end portion of the first connection passage 1029 is configured to communicate on a further lower side than the fourth connection passage 1079 of the cylinder 1072, and the other end portion of the first connection passage 1029 is configured to communicate with the blow back chamber 1028. The first connection passage 1029 is configured to connect the switch valve 1070 and the blow back chamber 1028 therebetween, and the compressed air can be supplied to the switch valve 1070 or the compressed air can be exhausted from the switch valve 1070 via the first connection passage 1029.

The switch valve stem 1074 is accommodated in the cylinder 1072, and is urged toward the trigger lever 1011 (toward the lower side) by a compression spring 1076. The compression spring 1076 is interposed between an upper end face of the switch valve stem 1074 and a top surface in the cylinder 1072, and is adapted to expand and contract, in response to a pulling operation on the trigger lever 1011. A lower end portion of the switch valve stem 1074 protrudes downward from the lower surface of the cylinder 1072, and comes into contact with the contact lever 1012 at the time when the trigger lever 1011 (refer to FIG. 13) is pulled.

An O-ring 1074*a* for close contact with an inner wall of the cylinder 1072 is mounted to a peripheral edge portion of a substantially intermediate position in the upper and lower direction of the switch valve stem 1074. Upon non-pulling operation of the trigger lever 1011, the switch valve stem 1074 is configured to close a path between the fourth connection passage 1079 and the first connection passage 1029 by the O-ring 1074*a* and to communicate the first passage 1072*a* and the fourth connection passage 1079 each other. On the other hand, upon pulling operation of the trigger lever 1011, the switch valve stem 1074 is configured to be pushed up against the elastic force of the compression spring 1076 by the contact lever 1012 and to close a path between the first passage 1072*a* and the fourth connection passage 1079 by the O-ring 1074*a* and to communicate the fourth connection passage 1079 and the first connection passage 1029 each other.

As shown in FIGS. 13 and 15, in a state where the trigger lever 11 is pulled, after a preset prescribed time elapses, when the contact arm 1014 is pressed against the to-be-struck member, the timer valve 1080 actuates the control valve 1040 to disable the striking operation Specifically, the timer valve 1080 is configured to be actuated based on an operation on the trigger lever 1011 and to actuate the control valve 1040 at a predetermined timing, thereby disabling actuation of the head valve 1030.

The timer valve 1080 has a cylinder 1090, a first timer piston 1084, a first piston shaft part 1085, a second timer piston 1094, and a second piston shaft part 1095.

The cylinder 1090 is a hollow cylindrical body extending in the front and rear direction, and is configured to accommodate the first timer piston 1084 and the second timer piston 1094 so as to be slidable in the front and rear direction. An inside of the cylinder 1090 is partitioned into a first chamber 1081 and a second chamber 1091, which are an example of the accommodation part, via a partition portion 1090*a* The first chamber 1081 is constituted by a sealed closed space (closed circuit) and is isolated from the second chamber 1091, which is another space, the main chamber 1005 and the like. In addition, the first chamber 1081 is also isolated from an outside air. In the first chamber 1081, the atmospheric air (air) that is used when actuating the timer valve 1080 is filled in advance. Thereby, it is possible to prevent impurities such as trash and oil from flowing into the first chamber 1081 from other spaces.

The first timer piston 1084 is a cylindrical body having substantially the same diameter as an inner diameter of the cylinder 1090, and is arranged to be movable along the inner wall of the cylinder 1090 in the extension direction of the grip part 1004. The first timer piston 1084 is urged toward the control valve 1040 (toward the front side) by a compression spring 1089. The compression spring 1089 is interposed between a concave portion formed on a base end-side of the first timer piston 1084 and a rear wall in the first chamber 1081, and is adapted to expand and contract, according to advance or retreat of the first timer piston 1084.

A peripheral edge portion of the first timer piston 1084 is formed with a concave portion 1084*a* along a circumferential direction thereof. In the concave portion 1084*a*, an O-ring 1086 for sealing between the concave portion and the inner wall of the cylinder 1090 is mounted. Thereby, the first chamber 1081 is further partitioned into a first space 1081*a* on a rear side of the O-ring 1086 and a second space 1081*b* on a front side of the O-ring 1086. The first space 1081*a* and the second space 1081*b* are isolated from each other by the O-ring 1086.

On a lower side in the cylinder 1090, a first passage 1082*a* and a second passage 1082*b* extending in the front and rear direction are provided side by side in the upper and lower direction. A front end portion of the first passage 1082*a* is configured to communicate with the second space 1081*b*, and a rear end portion of the first passage 1082*a* is configured to communicate with the first space 1081*a*. A front end portion of the second passage 1082*b* is configured to communicate with the second space 1081*b*, and a rear end portion of the second passage 1082*b* is configured to communicate with the first space 1081*a*.

A check valve 1087 is provided in the middle of the path of the first passage 1082*a*. The check valve 1087 has a ball 1087*a* for opening closing the first passage 1082*a*, for example, and a spring 1087*b* for urging backward the ball 1087*a*. When the first timer piston 1084 is retreated in the first chamber 1081, the ball 1087*a* is moved forward against the elastic force of the spring 1087*b* by the atmospheric air flowing into the first passage 1082*a* from the first space 1081*a*, so that the first passage 1082*a* opens and the atmospheric air in the first space 1081*a* of the first chamber 1081 is caused to flow into the second space 1081*b*. When the first timer piston 1084 is advanced in the first chamber 1081, the atmospheric air flowing into the first passage 1082*a* from the second space 1081*b* and the spring 1087*b* act on the ball 1087*a* and the first passage 1082*a* is closed by the ball 1087*a*, so that the atmospheric air in the second space 1081*b* of the cylinder 1090 does not flow into (flow back to) the first space 1081*a* through the first passage 1082*a*.

A throttle portion 1088 is provided in the middle of the path of the second passage 1082*b*. The throttle portion 1088 is constituted by reducing a cross-sectional area (narrowing a width) of a path of a part of the second passage 1082*b*. The throttle portion 1088 is configured to restrict a flow rate per unit time of the atmospheric air, which is caused to flow into the second passage 1082*b* from the second space 1081*b*, to be constant, so that the moving speed of the first timer piston 1084 is regulated. Thereby, it is possible to control the moving speed until the second piston shaft part 1095 presses a control valve stem 1044 of the control valve 1040. In addition, a prescribed time at the time when the first timer piston 1084 moves from an initial position (bottom dead center) in the first chamber 1081 to an actuation position (top dead center) in which the control valve 1040 is actuated is determined by a flow rate of the air passing through the throttle portion 1088 of the timer valve 1080, a spring coefficient of the compression spring 1089, and the like. In the present embodiment, the prescribed time is, for example, 3 seconds to 10 seconds. However, the present invention is not limited thereto. In addition, in the present embodiment, a time for which the control valve 1040 moves from the actuation position to a position in which the passage between the head valve chamber 1038 and the trigger valve 1050 is shut off is set to a time considerably shorter than the prescribed time. For this reason, when the prescribed time elapses, the passage between the head valve 1030 and the trigger valve 1050 is immediately shut off by the control valve 1040.

The first piston shaft part 1085 is a rod-shaped columnar body, and a rear end portion of the first piston shaft part 1085 is attached to a front end portion of the first timer piston 1084. The first piston shaft part 1085 is inserted in a through-hole 1090*b* formed in the partition portion 1090*a*, and a front end-side thereof extends from the inside of the first chamber 1081 into the second chamber 1091. A front end portion of the first piston shaft part 1085 is attached to a rear end portion of the second timer piston 1094 and is configured to be able to transmit the pressing force of the first timer piston 1084 to the second timer piston 1094. An O-ring 1090*c* is attached to the partition portion 1090*a* to secure a sealed state of the first chamber 1081.

The second timer piston 1094 is a cylindrical body having substantially the same diameter as an inner diameter of the cylinder 1090, and is configured to be advanced and retreated in the second cylinder 1091, according to the pressing by the first piston shaft part 1085. A peripheral edge portion of the second timer piston 1094 is formed with a concave portion 1094*a* along a circumferential direction thereof. In the concave portion 1094*a*, an O-ring 1096 for sealing between the concave portion and the inner wall of the cylinder 1090 is mounted. Thereby, the second chamber 1091 is further partitioned into a first space 1091*a* on a rear side of the O-ring 1096 and a second space 1091*b* on a front side of the O-ring 1096.

The first space 1091*a* is formed with a passage 1090*e* configured to communicate with an outside of the housing 1001*a*. One end portion of the fourth connection passage 1079 configured to communicate with the switch valve 1070 is connected to the second space 1091*b*, so that the compressed air can be supplied to the timer valve 1080 or the compressed air can be exhausted from the timer valve 1080 via the fourth connection passage 1079.

The second piston shaft part 1095 is a rod-shaped columnar body, and a rear end portion of the second piston shaft part 1095 is attached to a front end portion of the second timer piston 1094. The second piston shaft part 1095 can move in the front and rear direction in a through-hole 1090*d* formed between the second timer piston 1094 and the control valve 1040. A front end portion of the second piston shaft part 1095 is provided to appear and disappear with respect to the inside of the cylinder 1042 of the control valve 1040, and is configured to actuate the control valve 1040 by pressing the rear end face of the control valve stem 1044 constituting the control valve 1040.

In the present embodiment, as shown in FIGS. 13 and 15, the timer valve 1080 is arranged in the grip part 1004 so that moving directions of the first timer piston 1084 and the second timer piston 1094 are different from, in the present embodiment, orthogonal to, the axial direction of the cylinder 1026 (the moving direction of the driver 1022). In addition, the timer valve 1080 is arranged in the grip part 1004 so that the moving directions of the first timer piston 1084 and the second timer piston 1094 are along the extension direction of the grip part 1004, i.e., are parallel to the extension direction of the grip part 1004.

As shown in FIGS. 13 and 14, the control valve 1040 is configured to disable actuation of the head valve 1030 that is actuated in conjunction with actuation of the trigger valve 1050. Specifically, the control valve 1040 is configured to switch the passage between the head valve chamber 1038 and the trigger valve 1050 from a communication state to a shut-off state by control of the timer valve 1080, thereby disabling actuation of the head valve 1030 by. The control valve 1040 is arranged in a position near the front side of the timer valve 1080, between the head valve chamber 1038 and the trigger valve 1050. The control valve 1040 has a cylinder 1042 and a control valve stem 1044. Note that, a part of the cylinder 1042 has a structure sharing a part of the housing 1001*a*.

The cylinder 1042 is a hollow cylindrical body extending in the front and rear direction, and is configured to accommodate the control valve stem 1044 so as to be slidable in the front and rear direction. An upper surface-side of the cylinder 1042 is configured to communicate with one end portion of the second connection passage 1039 configured to communicate with the head valve chamber 1038. A lower surface-side of the cylinder 1042 is configured to communicate with one end portion of the third connection passage 1049 configured to communicate with the trigger valve 1050, and is formed with a passage 1042*c* configured to communicate with the main chamber 1005.

The control valve stem 1044 is a columnar body extending in the front and rear direction and is arranged in the cylinder 1042. The control valve stem 1044 is urged toward the timer valve 1080 (toward the rear side) by a compression spring 1046. The compression spring 1046 is interposed between a front wall in the cylinder 1042 and a front end face of the control valve stem 1044, and is adapted to expand and contract, in response to pressing by the timer valve 1080. O-rings 1044*a* and 1044*b* for close contact with the inner wall of the cylinder 1042 are attached at a predetermined interval in the front and rear direction to a peripheral edge portion of a substantially intermediate position in the front and rear direction of the control valve stem 1044.

The control valve stem 1044 is located on a rear end-side in the cylinder 1042, and closes a path between the second connection passage 1039 and the passage 1042*c* by the O-ring 1044*b* and opens a path between the second connection passage 1039 and the third connection passage 1049, upon non-pressing of the timer valve 1080, i.e., before timeout. Thereby, the head valve chamber 1038 and the trigger valve 1050 are connected to each other. On the other hand, the control valve stem 1044 is moved to a front end-side in the cylinder 1042, and opens the path between the second connection passage 1039 and the passage 1042*c* and closes the path between the second connection passage 1039 and the third connection passage 1049 by the O-ring 1044*a*, upon pressing of the timer valve 1080, i.e., after timeout. Thereby, the head valve chamber 1038 and the trigger valve 1050 are shut off therebetween.

[Operation Example of Nailing Machine 1100]

Subsequently, an example of a striking operation of the nailing machine 1100 according to the third embodiment is described. FIGS. 16 to 22 show a striking operation in the nailing machine 1100 according to the third embodiment.

Figure 16:
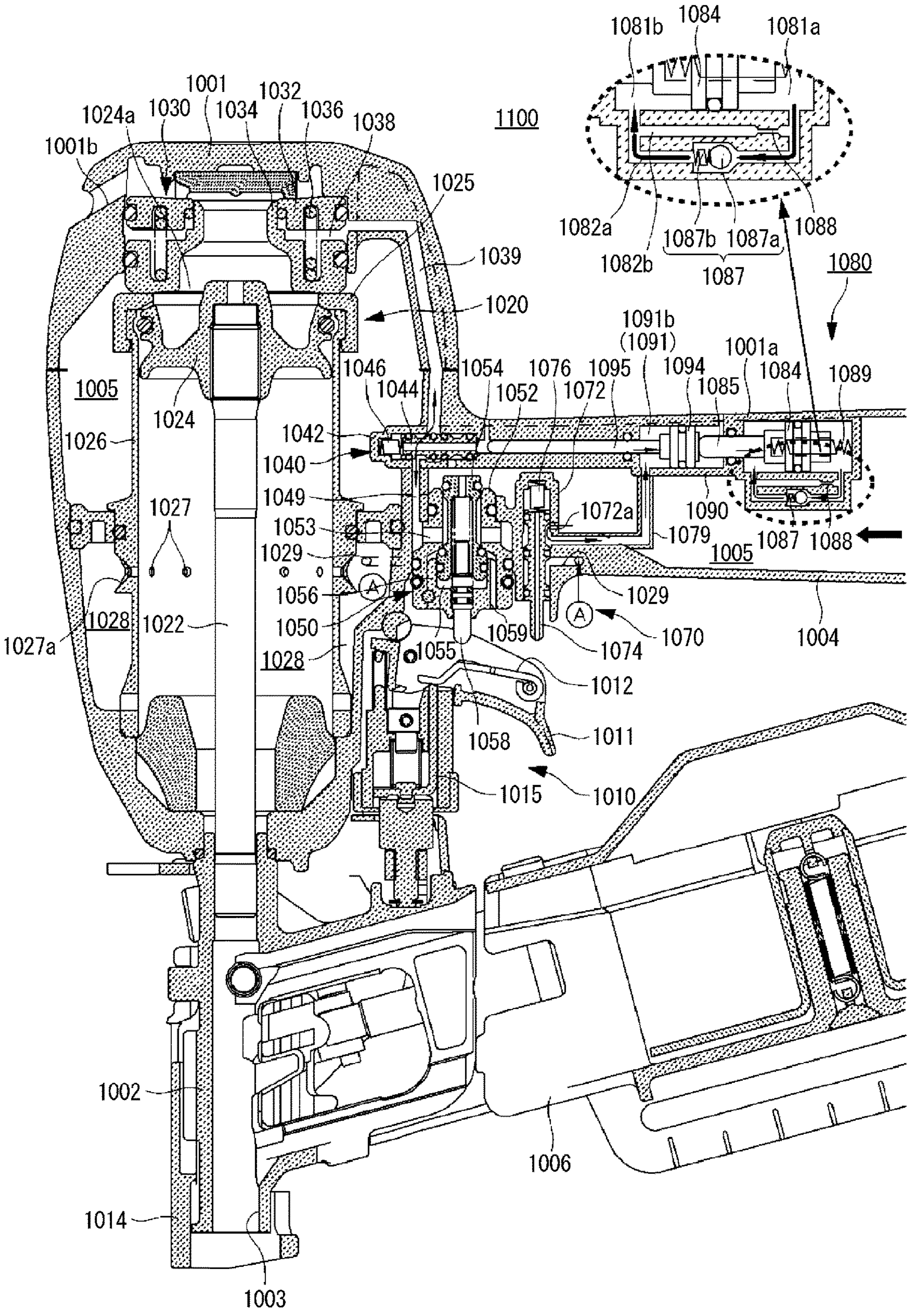
FIG. 16 is a view during a striking operation in the nailing machine according to the third embodiment.

When the air hose is connected to the air plug 1008 of the nailing machine 1100 shown in FIG. 13, the compressed air is supplied into the main chamber 1005. As shown in FIG. 16, the compressed air supplied into the main chamber 1005 is supplied into the second space 1091*b* of the second chamber 1091 of the timer valve 1080 via the first passage 1072*a* of the switch valve 1070, the inside of the switch valve 1070 and the fourth connection passage 1079.

Along with this, the front surface of the second timer piston 1094 is pushed backward by the compressed air, and the first timer piston 1084 and the first piston shaft part 1085 are retreated against the elastic force of the compression spring 1089. At this time, the atmospheric air in the first space 1081*a* is compressed and the compressed atmospheric air is caused to flow into the first passage 1082*a*. The ball 1087*a* of the check valve 1087 is moved forward against the elastic force of the spring 1087*b* by the inflow atmospheric air, thereby opening the first passage 1082*a*. Thereby, the air in the first space 1081*a* is caused to flow into the second space 1081*b* via the first passage 1082*a*. Note that, in the second passage 1082*b*, since the flow resistance of the throttle portion 1088 is high, the compressed air hardly passes through the second passage 1082*b*.

Figure 17:
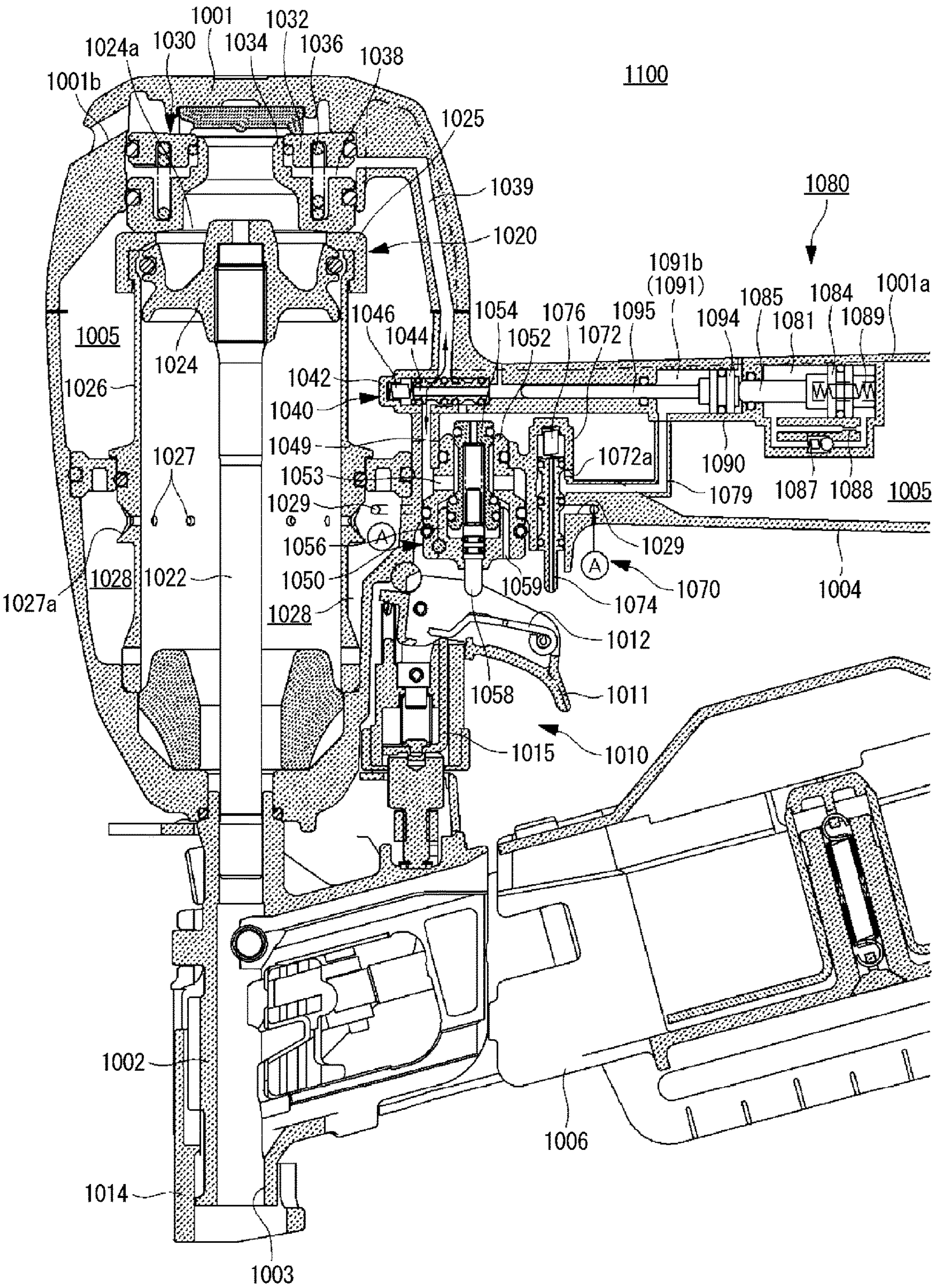
FIG. 17 is a view during the striking operation in the nailing machine according to the third embodiment.

As shown in FIG. 17, when the supply of the compressed air into the second chamber 1091 of the timer valve 1080 continues, the first timer piston 1084 reaches the initial position in the cylinder 1090, specifically, the base end portion of the first timer piston 1084 reaches the rear part of the first chamber 1081 by compression of the compression spring 1089. Thereby, the timer valve 1080 becomes in a standby state.

Figure 18:
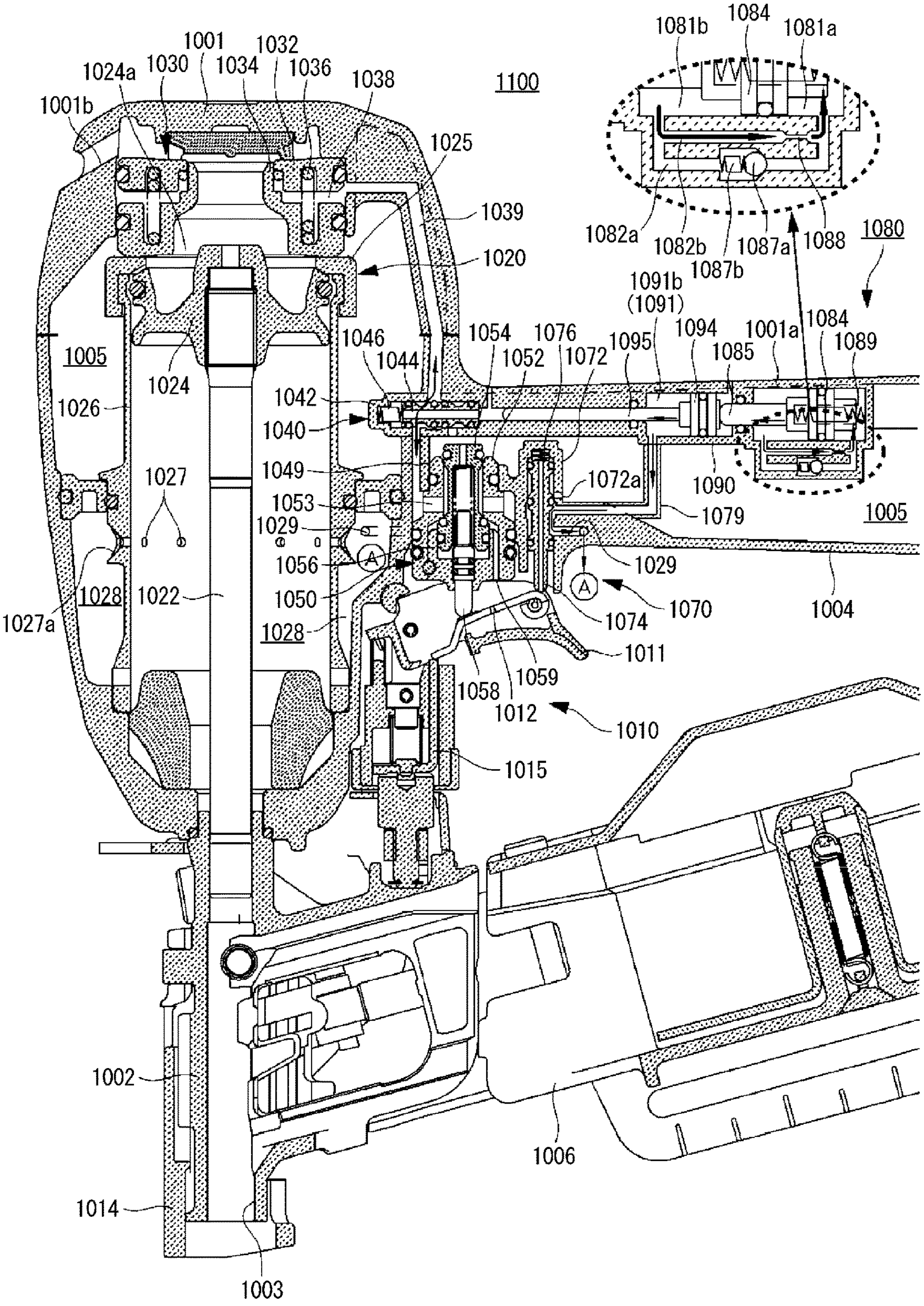
FIG. 18 is a view during the striking operation in the nailing machine according to the third embodiment.

As shown in FIG. 18, when the trigger lever 1011 is pulled by an operator, the switch valve stem 1074 of the switch valve 1070 is pushed up by the contact lever 1012, so that the switch valve 1070 is actuated. By the actuation of the switch valve 1070, the O-ring 1074*a* (refer to FIG. 14) is also moved upward, so that while the first passage 1072*a* of the switch valve 1070 and the fourth connection passage 1079 are isolated from each other, the fourth connection passage 1079 and the first connection passage 1029 communicate with each other. Along with this, the compressed air in the second space 1091*b* of the second chamber 1091 of the tinier valve 1080 is exhausted to the blow back chamber 1028 at the atmospheric pressure via the fourth connection passage 1079, the inside of the switch valve 1070 and the first connection passage 1029.

In addition, when the compressed air in the second space 1091*b* of the cylinder 1090 is exhausted, the first timer piston 1084 is advanced in the first chamber 1081 by the urging force of the compression spring 1089. Along with this, the atmospheric air in the second space 1081*b* of the first chamber 1081 is caused to flow into the first space 1081*a* through the second passage 1082*b* and the throttle portion 1088. The flow rate of the atmospheric air that is supplied to the first space 1081*a* is restricted to be constant by the throttle portion 1088. The compression spring 1089 expands, according to the flow rate of the atmospheric air that is caused to flow into the first space 1081*a*. Thereby, the first tinier piston 1084 is slowly advanced from the initial position in the first chamber 1081 and the time measurement (timer) of the timer valve 1080 starts. Note that, since the first passage 1082*a* is closed by the ball 1087*a*, the atmospheric air does not flow into (flow back to) the first space 1081*a* via the first passage 1082*a*.

Figure 19:
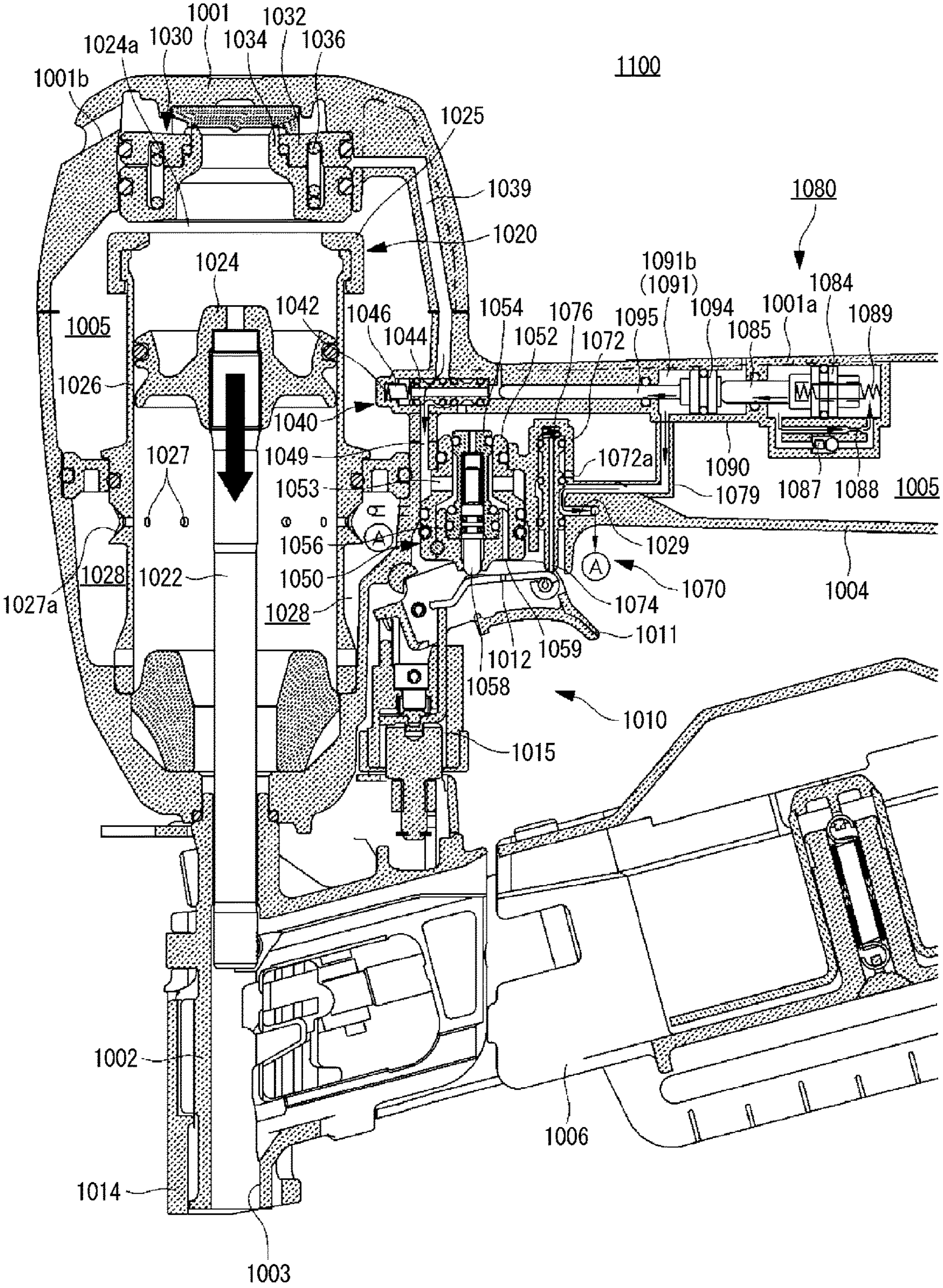
FIG. 19 is a view during the striking operation in the nailing machine according to the third embodiment.

As shown in FIG. 19, when the contact arm 1014 is pressed against the to-be-struck member in a state where the trigger lever 1011 is pulled and before the prescribed time of the timer valve 1080 elapses, the pressing member 1015 is pushed up. Along with this, the front end-side of the contact lever 1012 is pushed up and the trigger valve stem 1058 of the trigger valve 1050 is pushed up, so that the trigger valve 1050 is actuated. When the trigger valve 1050 is actuated, the O-rings 1058*a* and 1058*b* are also moved upward, as shown in FIG. 14, so that the compressed air in the empty chamber 1055 is exhausted from the gap S1003 between the cap 1056 and the trigger valve stem 1058 to the outside. The pilot valve 1054 is pushed down against the elastic force of the compression spring 1057 by the compressed air in the main chamber 1005, so that the lower surface of the pilot valve 1054 comes into contact with the upper surface of the cap 1056. Thereby, the passage 1053 and the air exhaust passage 1059 communicate with each other, and the compressed air in the head valve chamber 1038 is exhausted to the atmosphere (outside) via the second connection passage 1039, the inside of the control valve 1040, the third connection passage 1049, the inside of the trigger valve 1050 and the air exhaust passage 1059.

When the compressed air in the head valve chamber 1038 is exhausted, the movable part 1034 of the head valve 1030 is pushed up by the compressed air in the main chamber 1005 and the movable part 1034 and the locking part 1025 are opened therebetween, so that the compressed air in the main chamber 1005 is caused to flow into the piston upper chamber 1024*a* and the piston 1024 rapidly descends in the cylinder 1026.

Figure 20:
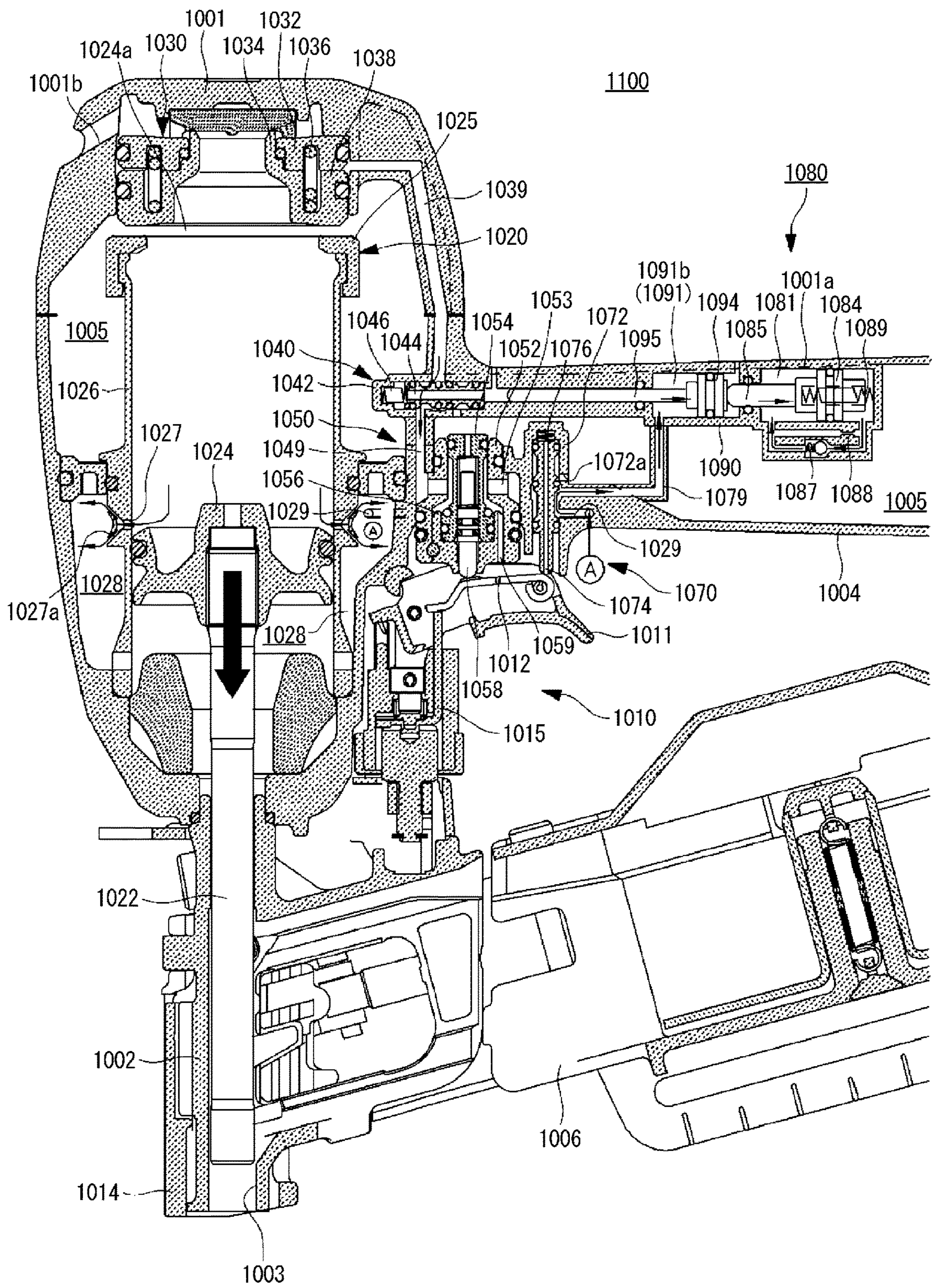
FIG. 20 is a view during the striking operation in the nailing machine according to the third embodiment.

As shown in FIG. 20, when the piston 1024 further descends, the nail is struck into the to-be-struck member by the driver 1022 connected to the piston 1024. In addition, when the piston 1024 descends to the lower part-side in the cylinder 1026, the compressed air in the cylinder 1026 is caused to flow into the blow back chamber 1028 via the small holes 1027. The inflow compressed air is caused to flow into the second 1091 of the timer valve 1080 via the first connection passage 1029, the inside of the switch valve 1070 and the fourth connection passage 1079. Thereby, the timer valve 1080 is again retreated to the initial position in the first chamber 1081, so that the timer valve 1080 is reset. As the timer valve 1080 is retreated, the atmospheric air in the first space 1081*a* is caused to flow into the second space 1081*b* via the second passage 1082*b* and the check valve 1087, as described in FIG. 16.

Figure 21:
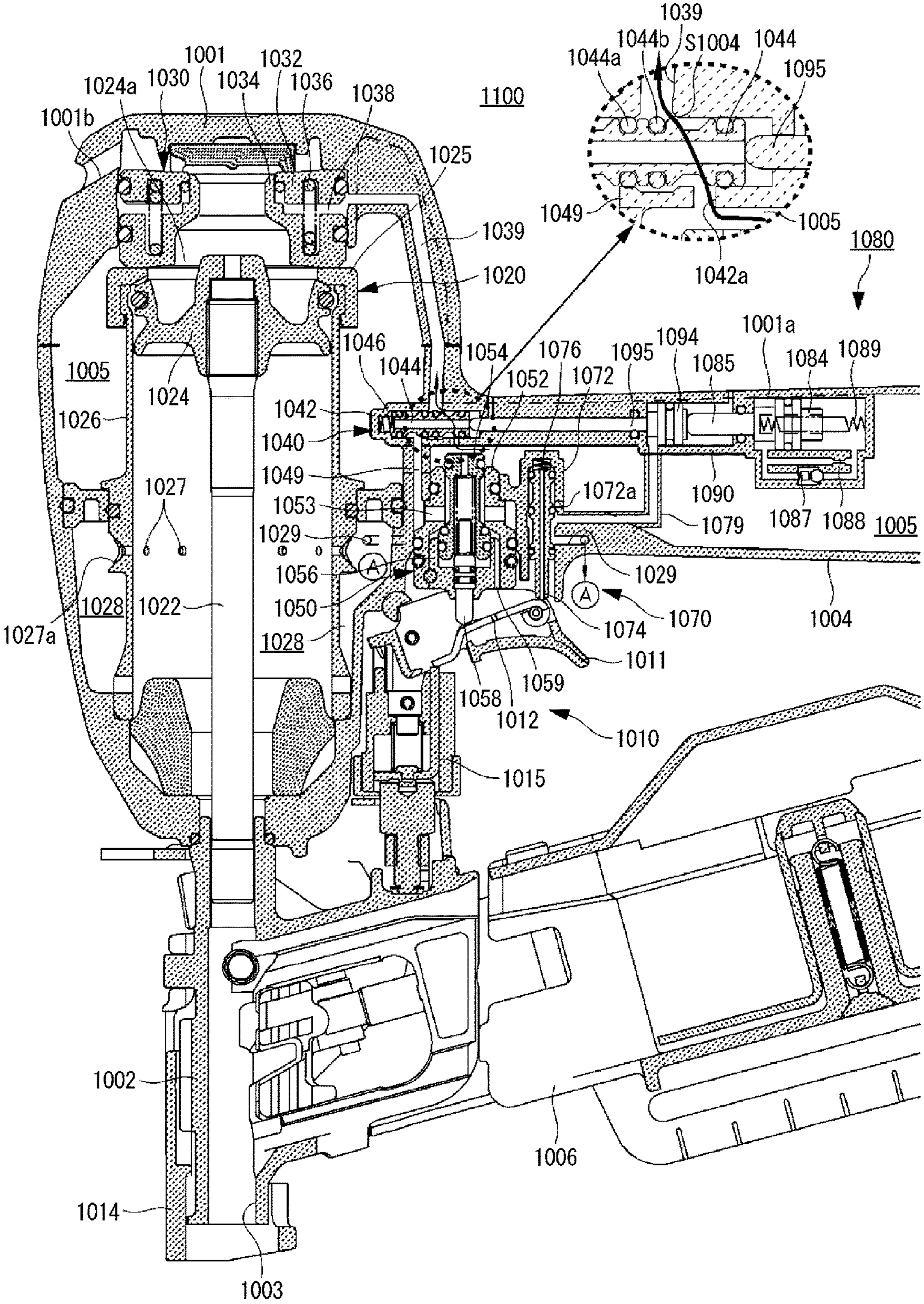
FIG. 21 is a view during the striking operation in the nailing machine according to the third embodiment.

On the other hand, as shown in FIG. 21, when the contact arm 1014 is not pressed against the to-be-struck member, i.e., the striking operation is not executed within the prescribed time set in advance from the time point when the switch lever 1011 shown in FIG. 18 is pulled by the operator. Specifically, the second piston shaft part 1095 of the timer valve 1080 is moved to the actuation position in which the control valve 1040 is pressed when the prescribed time elapses, the timer valve 1080 times out.

The control valve stem 1044 of the control valve 1040 is pushed forward by the second piston shaft part 1095 and is moved toward the front end-side of the cylinder 1042. When the control valve stem 1044 is advanced, the O-rings 1044*a* and 1044*b* are also advanced, so that while the path communicating the second connection passage 1039 and the third connection passage 1049 each other is shut off, a gap S1004 is formed. Thereby, the head valve chamber 1038 is switched from the communication state with the trigger valve 1050 to the communication state with the main chamber 1005 via the second connection passage 1039, the gap S1004 and the passage 1042*a* of the control valve 1040.

Figure 22:
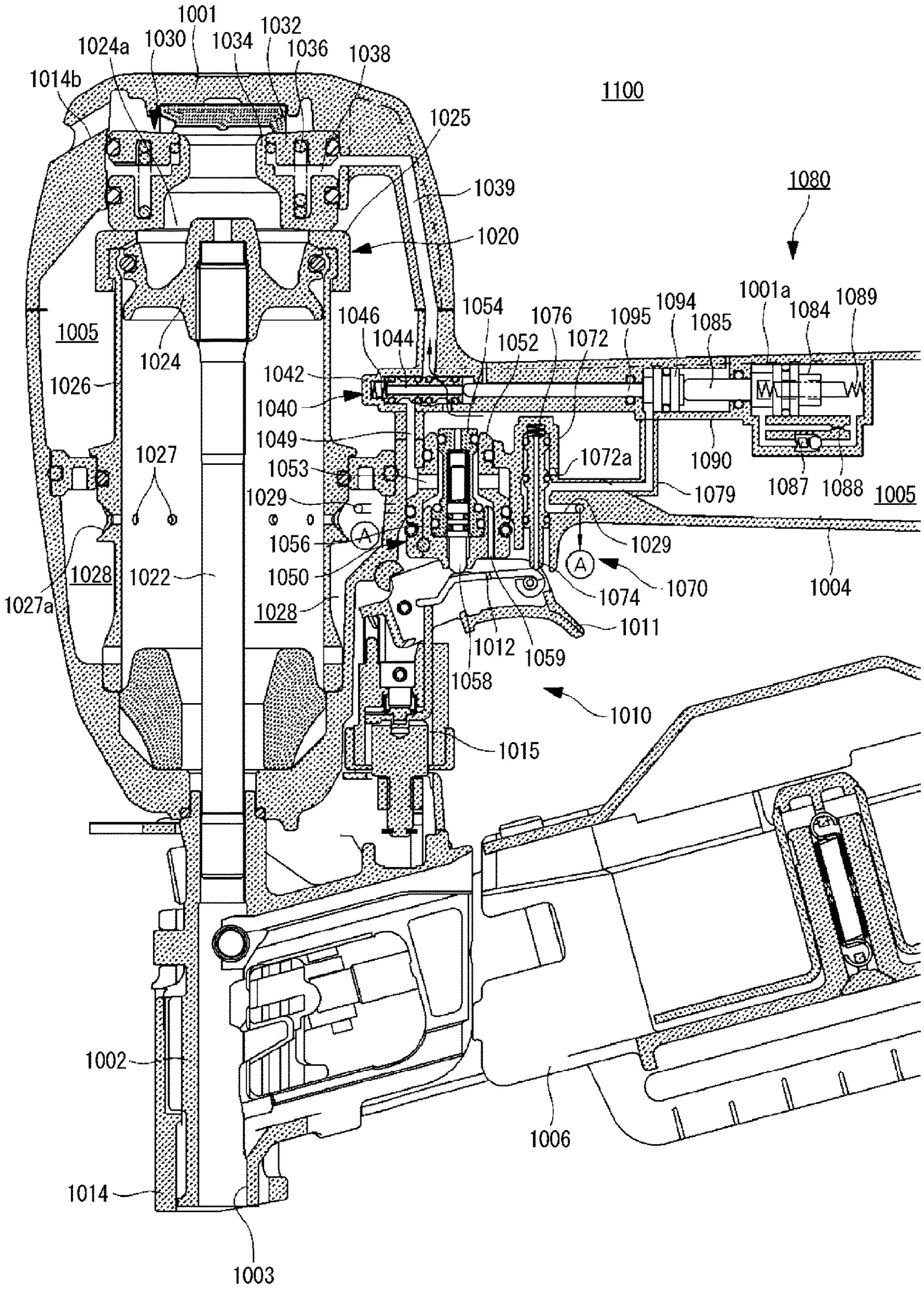
FIG. 22 is a view during the striking operation in the nailing machine according to the third embodiment.

As shown in FIG. 22, when the contact arm 1014 is pressed against the to-be-struck member after timeout of the timer valve 1080 in a state where the trigger lever 1011 shown in FIG. 18 is pulled by the operator, the pressing member 1015 is accordingly pushed up. Along with this, the front end-side of the contact lever 1012 is pushed up and the trigger valve stem 1058 of the trigger valve 1050 is pushed up by the push-up of the contact lever 1012, so that the trigger valve 1050 is actuated. When the trigger valve 1050 is actuated, the O-rings 1058*a* and 1058*b* are moved upward, as shown in FIG. 14, so that the compressed air in the empty chamber 1055 is exhausted from the gap S1003 between the cap 1056 and the trigger valve stem 1058 to the outside. The pilot valve 1054 is pushed down against the elastic force of the compression spring 1057 by the compressed air in the main chamber 1005, so that the lower surface of the pilot valve 1054 comes into contact with the upper surface of the cap 1056. Thereby, the passage 1053 and the air exhaust passage 1059 communicate with each other.

However, in a timeout state of the timer valve 1080, while the path between the second connection passage 1039 and the third connection passage 1049 is shut off by the control valve 1040 shown in FIG. 21, the second connection passage 1039 and the main chamber 1005 communicate with each other. For this reason, the compressed air in the head valve chamber 1038 is left remaining in the head valve chamber 1038 without being exhausted to the outside via the air exhaust passage 1059 provided to the trigger valve 1050. Thereby, when the timer valve 1080 times out, the head valve 1030 is not actuated even though the contact arm 1014 is pressed against the to-be-struck member in a state where the operator pulls the trigger lever 1011. Therefore, the striking operation is not executed after timeout of the timer valve 1080.

As described above, according to the third embodiment, the first chamber 1081 of the cylinder 1090 for reserving the atmospheric air for actuating the timer valve 1080 is constituted by the closed space that is isolated from the other spaces, and the atmospheric air that is used when actuating the timer valve 1080 is not supplied from the outside. Therefore, it is possible to prevent oil, trash and the like from entering the first chamber 1081 of the timer valve 1080. Thereby, it is possible to measure the prescribed time of the timer valve 1080 correctly and with high accuracy, and to prevent an erroneous operation of the tinier valve 1080 due to attaching of attachments such as oil and trash.

Fourth Embodiment

In a timer valve 1280 of a fourth embodiment, a configuration different from the timer valve 1080 of the third embodiment is adopted. Similarly, also for a control valve 1240 and the switch valve 1070 of the fourth embodiment, configurations different from the control valve 1040 and the switch valve 1070 of the third embodiment are adopted. Note that, since the other configuration, function and operation of a nailing machine 1200 are common to the configuration and the like of the nailing machine 1100 of the third embodiment, the detailed descriptions thereof are omitted.

[Configuration Example of Nailing Machine 1200]

Figure 23:
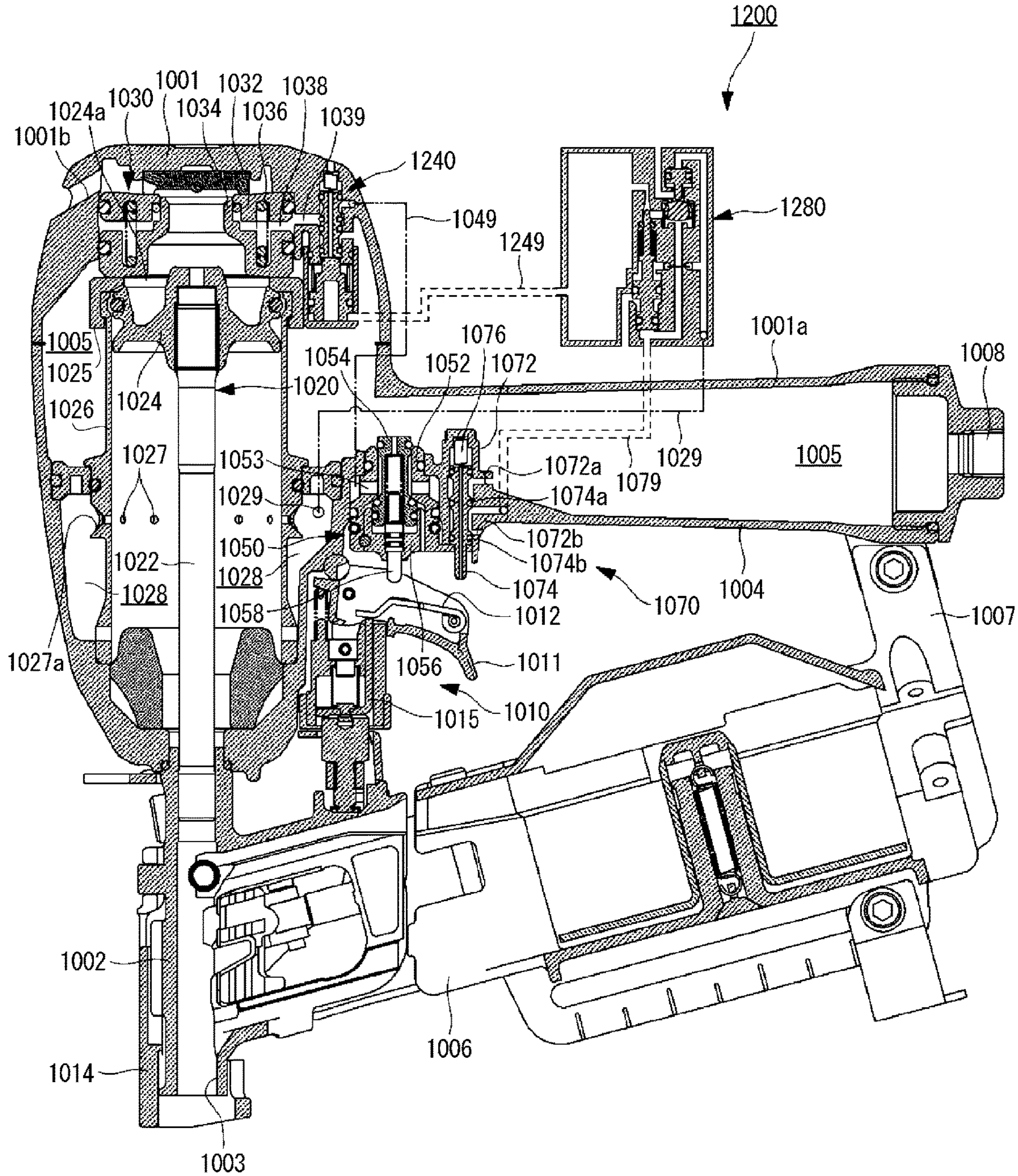
FIG. 23 is a side sectional view of a nailing machine according to a fourth embodiment.
Figure 24:
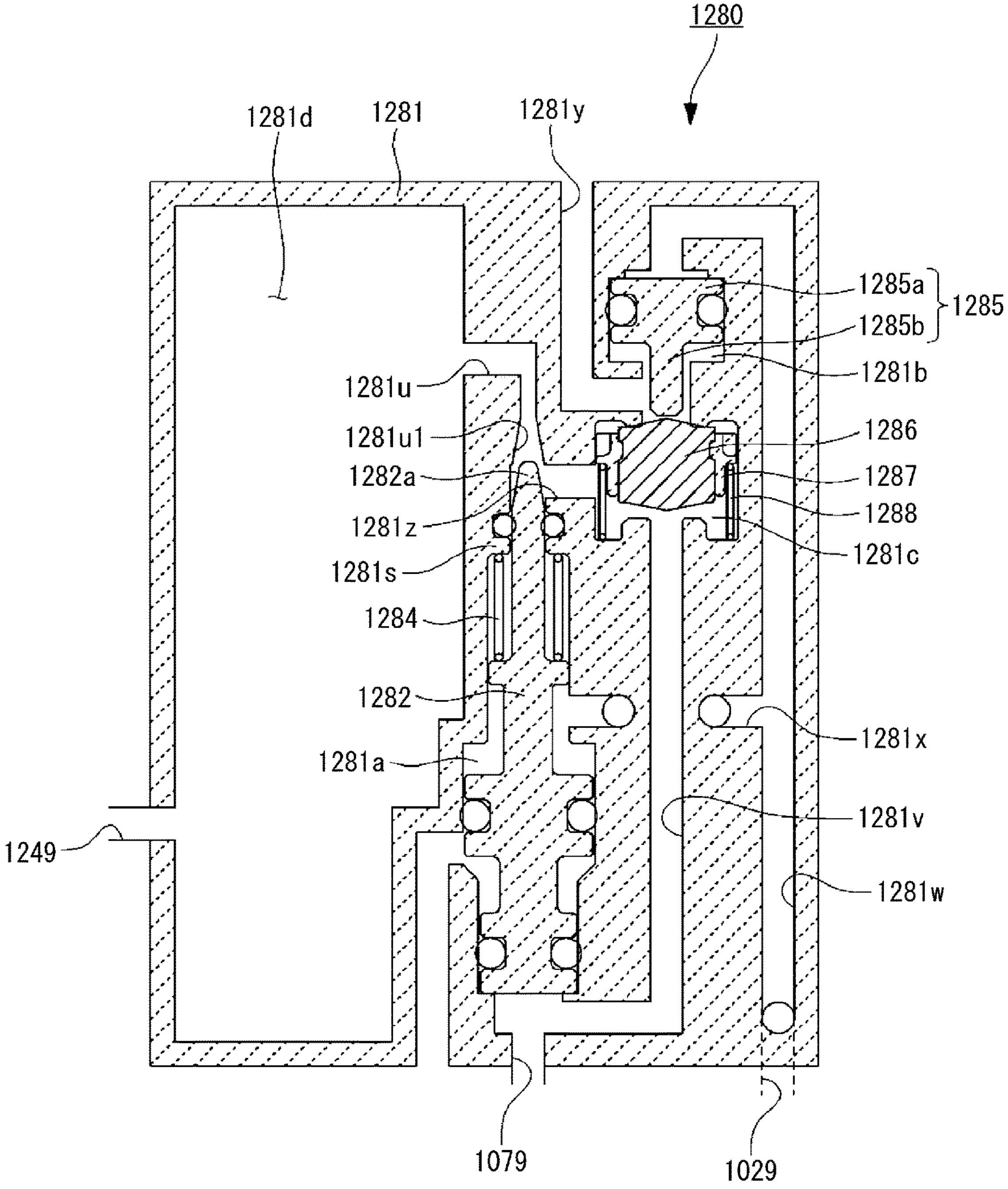
FIG. 24 is a side sectional view of a timer valve according to the fourth embodiment.
Figure 25:
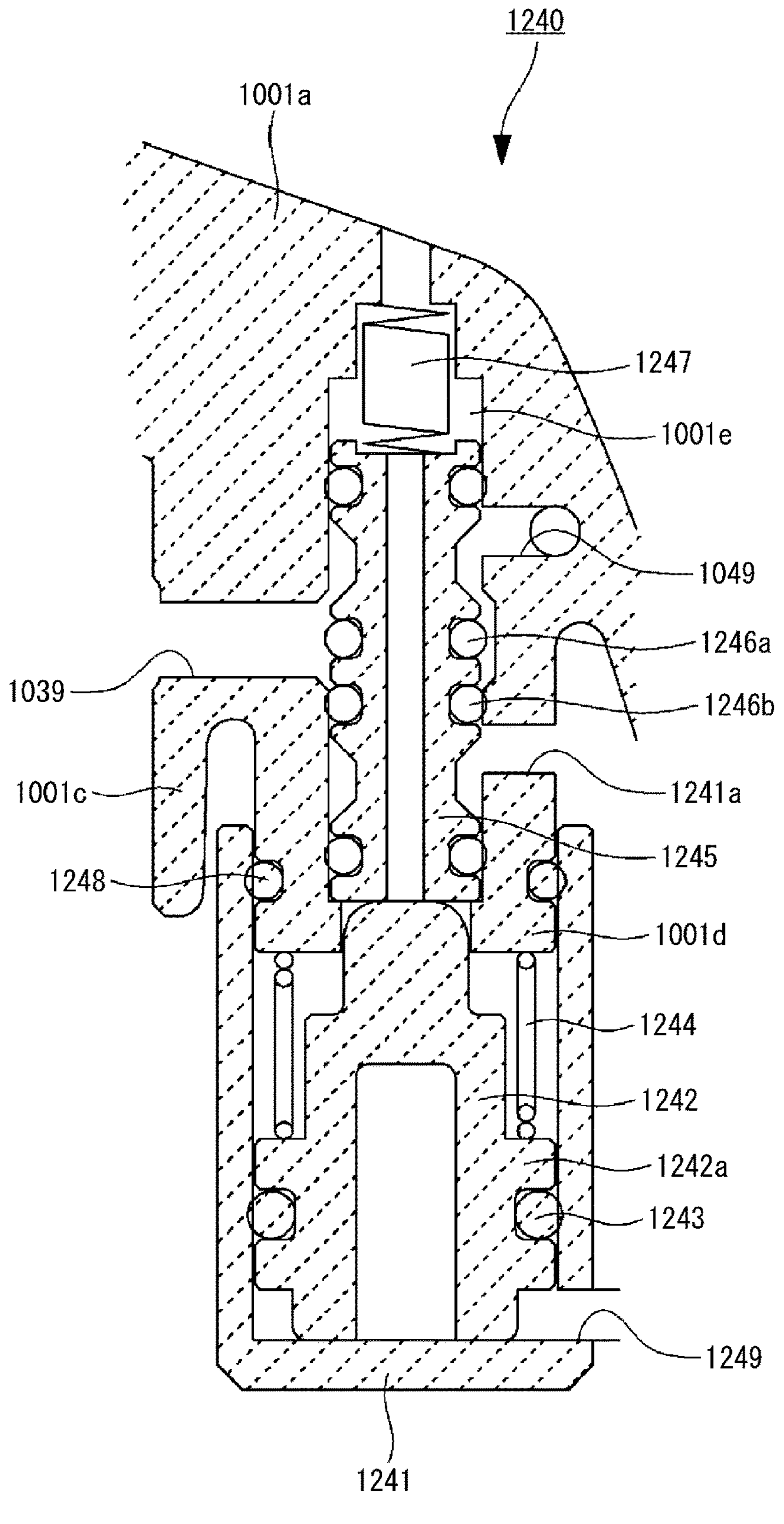
FIG. 25 is a side sectional view of a control valve according to the fourth embodiment.

FIG. 23 is a side sectional view of a nailing machine 1200 according to a fourth embodiment. FIG. 24 is a side sectional view of a tinier valve 1280 according to the fourth embodiment. FIG. 25 is a side sectional view of a control valve 1240 according to the fourth embodiment.

The nailing machine 1200 is an example of the pneumatic tool, and includes the piston 1024 configured to be slidable in the cylinder 1026, the striking mechanism 1020 having the driver 1022 attached to the piston 1024 and configured to strike a nail into a to-be-struck member, the main chamber 1005 to which the compressed air for driving the striking mechanism 1020 is supplied, the head valve 1030 configured to drive the striking mechanism 1020 by using the compressed air that is supplied to the main chamber 1005, and the trigger valve 1050 configured to actuate the head valve 1030. The nailing machine 1200 also includes a control valve 1240 configured to disable actuation of the head valve 1030 configured to be actuated in conjunction with actuation of the trigger valve 1050, a timer valve 1280 configured to disable actuation of the head valve 1030 by actuating the control valve 1240, and a switch valve 1070 configured to actuate the timer valve 1280 based on an operation on the trigger lever 1011.

As shown in FIG. 23, the switch valve 1070 is arranged in the vicinity of a rear side of the trigger valve 1050, and is configured to actuate the timer valve 1280 based on an operation on the trigger lever 1011. The switch valve 1070 has a cylinder 1072 and a switch valve stem 1074.

The cylinder 1072 is a hollow cylindrical body extending in the upper and lower direction, and is configured to accommodate the switch valve stem 1074 so as to be slidable in the upper and lower direction. An upper side of the cylinder 1072 is formed with a first passage 1072*a* configured to communicate with the main chamber 1005. One end portion of the fourth connection passage 1079 is configured to communicate in a substantially intermediate position of the cylinder 1072, and the other end portion of the fourth connection passage 1079 is configured to communicate with the timer valve 1280. A second passage 1072*b* configured to communicate with the outside of the housing 1001*a* at the atmospheric pressure is formed below the fourth connection passage 1079 of the cylinder 1072.

During a non-pulling operation of the trigger lever 1011, the switch valve stem 1074 is configured to communicate the fourth connection passage 1079 and the second passage 1972*b* each other, and to close a path between the first passage 1072*a* and the fourth connection passage 1079 by the O-ring 1074*a*. On the other hand, during a pulling operation of the trigger lever 1011, the switch valve stem 1074 is configured to be pushed up against the elastic force of the compression spring 1076 by the contact lever 1012, so that the first passage 1072*a* and the fourth connection passage 1079 communicate with each other and the path between the fourth connection passage 1079 and the second passage 1072*b* is closed by the O-ring 1074*b*.

As shown in FIGS. 23 and 24, the nailing machine 1200 includes the timer valve 1280 that disables the striking operation by actuating the control valve 1240 when the contact arm 1014 is pressed against the to-be-struck member in a state where the trigger lever 1011 is pulled and the prescribed time elapses.

The timer valve 1280 is provided outside the housing 1001*a*, is connected to the control valve 1240 via a connection passage 1249, which will be described later, is connected to the switch valve 1070 via the fourth connection passage 1079, and is connected to the blow back chamber 1028 via the first connection passage 1029.

As shown in FIG. 24, the timer valve 1280 has a housing 1281 for valve, a timer valve stem 1282, a piston 1285 and a seal member 1286. The housing 1281 for valve is provided with a first accommodation part 1281*a* configured to accommodate the timer valve stem 1282, a second accommodation part 1281*b* configured to accommodate the piston 1285, a third accommodation part 1281*c* configured to accommodate the seal member 1286, and a space part 1281*d* configured to reserve compressed air for measuring a prescribed time until the control valve 1240 is actuated.

A lower end-side of the first accommodation part 1281*a* is configured to communicate with one end portion of the fourth connection passage 1079, so that the compressed air in the main chamber 1005 can be supplied into the first accommodation part 1281*a* via the fourth connection passage 1079. An upper end-side of the first accommodation part 1281*a* is configured to communicate with one end portion of a first passage 1281*u*, and the other end portion of the first passage 1281*u* is configured to communicate with the space part 1281*d*.

An upper end-side of the second accommodation part 1281*b* is configured to communicate with one end portion of a third passage 1281*w* and the other end portion of the third passage 1281*w* is configured to communicate with one end portion of the first connection passage 1029, so that the compressed air in the blow back chamber 1028 can be supplied into the second accommodation part 1281 via the third passage 1281*w*.

A lower end-side of the third accommodation part 1281*c* is configured to communicate with one end portion of a second passage 1281*v* and the other end portion of the second passage 1281*v* is configured to communicate with one end portion of the fourth connection passage 1079, so that the compressed air in the main chamber 1005 can be supplied into the third accommodation part 1281*c* via the second passage 1281*v*.

A fifth passage 1281*y* configured to communicate with an outside of the housing 1281 for valve is provided between the second accommodation part 1281*b* and the third accommodation part 1281*c*. A sixth passage 1281*z* configured to communicate between the first accommodation part 1281*u* and the second accommodation part 1281*b* is provided therebetween. A fourth passage 1281*x* branching from a middle of the third passage 1281*w* is provided between the third passage 1281*w* and the first accommodation part 1281*a*.

The timer valve stem 1282 is a substantially columnar body extending in the upper and lower direction, and is arranged to be slidable in the upper and lower direction along an inner wall of the first accommodation part 1281*a*. The timer valve stem 1282 is urged downward by a compression spring 1284. The compression spring 1284 is interposed between a support portion 1281*s* provided to the housing 1281 for valve and an upper side of the timer valve stem 1282, and is adapted to expand and contract, in response to the compressed air that is supplied from the main chamber 1005.

The timer valve stem 1282 has a throttle portion 1282*a* configured to control a flow rate of the compressed air that is used when actuating the control valve 1240. The throttle portion 1282*a* is formed continuously to an upper end portion of the timer valve stem 1282 having a columnar shape, and is constituted by a tapered columnar body whose outer diameter gradually decreases toward the upper side. The throttle portion 1282*a* is configured to ascend in the first accommodation part 1281*a* by the compressed air entering in response to a pulling operation on the trigger lever 1011, thereby fitting (engaging) to a to-be-throttled portion 1281*u*1 provided on a lower end-side of the first passage 1281*u* to close the first passage 1281*u*. That is, a gap between the throttle portion 1282*a* and the to-be-throttled portion 1281*u*1 is closed. The to-be-throttled portion 1281*u*1 is configured so that a passage diameter increases from an upper end-side toward a lower end-side, and has such a shape that the throttle portion 1282*a* can be fitted therein. At this time, a circumferential surface of the throttle portion 1282*a* comes into close contact with a wall surface of the to-be-throttled portion 1281*u*1. However, in the present embodiment, the throttle portion 1282*a* and the to-be-throttled portion 1281*u*1 are configured to form a slight gap between the throttle portion 1282*a* and the to-be-throttled portion 1281*u*1 so that the compressed air supplied from the main chamber 1005 can pass therethrough. Thereby, it is possible to regulate a flow rate of the compressed air, which is caused to flow into the space part 1281*d*, to be constant by adjusting an area of the gap between the throttle portion 1282*a* and the to-be-throttled portion 1281*u*1.

The space part 1281*d* of the housing 1281 for valve is constituted by a space having a volume capable of reserving a predetermined amount of compressed air, and has a rear wall with which one end portion of the first passage 1281*u* communicates and a front wall with which one end portion of the connection passage 1249 communicates. The volume of the space part 1281*d* is designed based on the prescribed time (timeout) for which the control valve 1240 is actuated by the timer valve 1280. Therefore, in the present embodiment, the prescribed time by the timer valve 1280 is determined based on the volume of the space part 1281*d* and the area of the slight gap formed between the throttle portion 1282*a* and the to-be-throttled portion 1281*u*1. Note that, for the volume of the space part 1281*d*, volumes of the connection passage 1249, the first passage 1281*u* and the like may also be considered.

The piston 1285 has a columnar body 1285*a* having substantially the same diameter as an inner diameter of the second accommodation part 1281*b*, and a pressing portion 1285*b* smaller than the diameter of the columnar body 1285*a* and protruding downward from the second accommodation part 1281*b*. The columnar body 1285*a* of the piston 1285 is configured to descend in the second accommodation part 1281*b*, in response to the compressed air that is supplied from the blow back chamber 1028, during the striking operation by the striking mechanism 1020. The pressing portion 1285*b* is configured to press the seal member 1286 arranged on the lower side, as the columnar body 1285*a* descends.

The seal member 1286 is made of a resin material such as rubber, and is arranged in the third accommodation part 1281*c* below the second accommodation part 1281*b*. The seal member 1286 is integrally attached to an attachment member 1287, and is urged upward by a compression spring 1288. The compression spring 1288 is interposed between the attachment member 1287 and a bottom surface in the third accommodation part 1281*c*, and is adapted to expand and contract, in response to the pressing of the piston 1285.

During the pressing by the piston 1285, the seal member 1286 is configured to communicate a sixth passage 1281*z* configured to communicate with the space part 1281*d* and a fifth passage 1281*y* configured to communicate with the outside, thereby exhausting the compressed air in the space part 1281*d* to the outside. On the other hand, during the non-pressing of the piston 1285, the seal member 1286 is configured to communicate the second passage 1281*v* configured to communicate with the main chamber 1005 and the sixth passage 1281*z* configured to communicate with the space part 1281*d*, there causing the compressed air in the main chamber 1005 to flow into the space part 1281*d*.

As shown in FIGS. 23 and 25, the nailing machine 1200 includes the control valve 1240 configured to disable actuation of the trigger valve 1050 after the prescribed time of the timer valve 1280 elapses. The control valve 1240 has a cylinder 1241, a control valve piston 1242 and a control valve stem 1245.

The cylinder 1241 is a cylindrical body opening on an upper side and having a bottom surface on a lower side, and an upper end portion thereof is attached to a support portion 1*c* via an O-ring 1248. A lower portion of a rear wall of the cylinder 1241 is configured to communicate with one end portion of a connection passage 1249 configured to communicate with the timer valve 1280.

The control valve piston 1242 is arranged in the cylinder 1241, and is configured to slide in the upper and lower direction along an inner wall of the cylinder 1241. An O-ring 1243 for close contact with the inner wall of the cylinder 1241 is mounted to an attaching portion 1242*a* provided on a lower side of the control valve piston 1242. The control valve piston 1242 is urged downward by a compression spring 1244. The compression spring 1244 is interposed between the attaching portion 1242*a* and a support portion 1001*d* constituting the housing 1001*a*, and is adapted to expand and contract, in response to the compressed air that is supplied from the timer valve 1280. When the compressed air is supplied between the lower surface of the control valve piston 1242 and the bottom surface in the cylinder 1241 via the connection passage 1249, the control valve piston 1242 ascends from the bottom surface in the cylinder 1241. On the other hand, when the compressed air between the lower surface of the control valve piston 1242 and the bottom surface in the cylinder 1241 is exhausted via the connection passage 1249, the control valve piston 1242 descends from an ascending position in the cylinder 1241 and comes into contact with the bottom surface.

The control valve stem 1245 is arranged in an accommodation part 1001*e* formed in the housing 1001*a* on an upper side of the control valve piston 1242. The control valve stem 1245 is urged downward by a compression spring 1247, and a lower surface of the control valve stem 1245 is in contact with an upper surface of the control valve piston 1242. The compression spring 1247 is interposed between a top surface in the accommodation part 1001*e* and an upper surface of the control valve stem 1245, and is adapted to expand and contract, in response to the ascending or descending of the control valve piston 1242.

Two O-rings 1246*a* and 1246*b* are mounted in substantially intermediate positions in the upper and lower direction of the control valve stein 1245 along a circumferential direction thereof. The O-ring 1246*a* is configured to open/close a path between the second connection passage 1039 and the third connection passage 1049, thereby communicating or shutting off the second connection passage 1039 and the third connection passage 1049. The O-ring 1246*b* is configured to open/close a path between the second connection passage 1039 and a passage 1241*a*, thereby communicating or shutting off the second connection passage 1039 and the passage 1241*a*.

[Operation Example of Nailing Machine 1200]

Subsequently, an example of a striking operation of the nailing machine 1200 according to the fourth embodiment is described. FIGS. 26 to 31 show a striking operation in the nailing machine 1200 according to the fourth embodiment.

Figure 26:
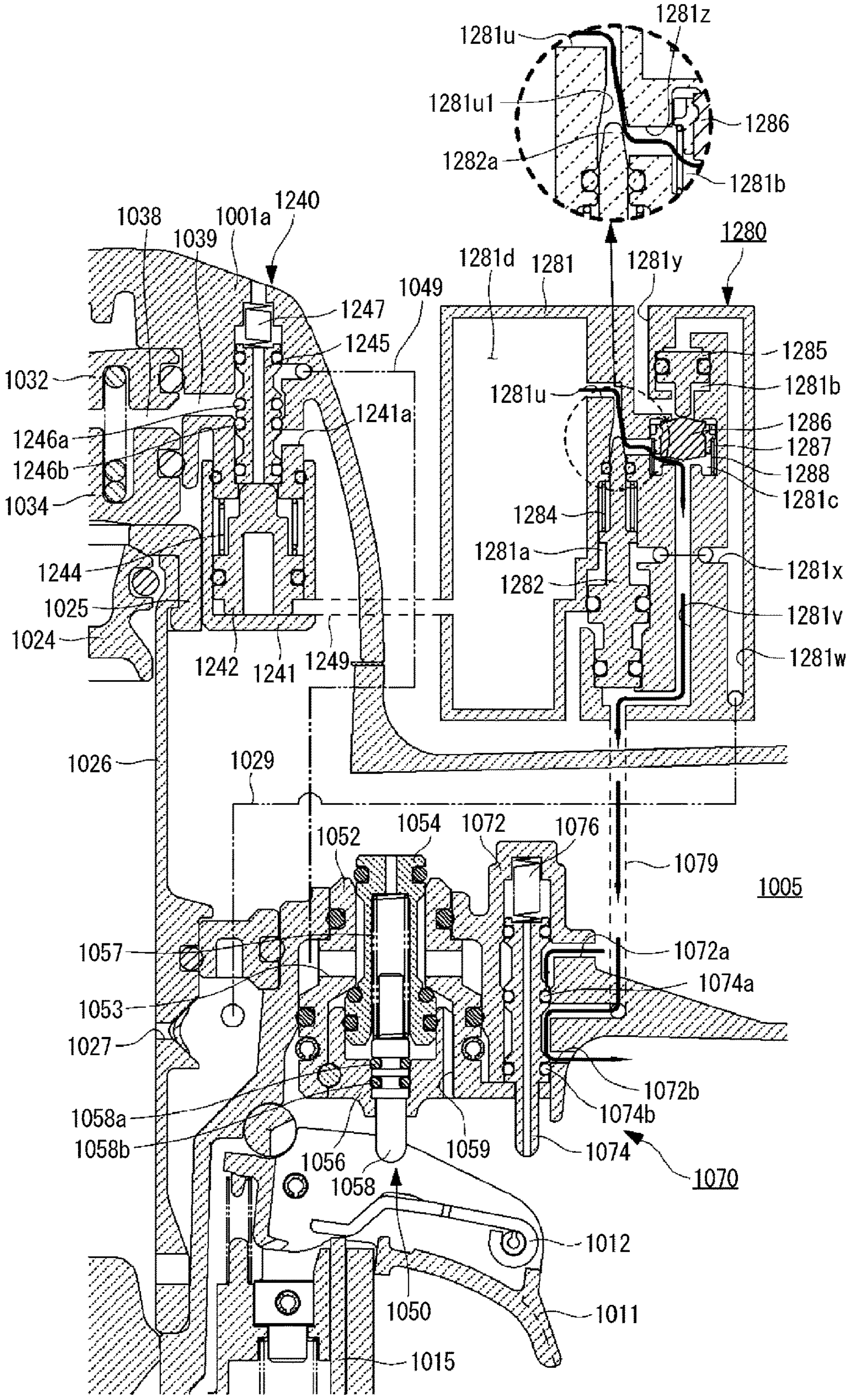
FIG. 26 is a view during a striking operation in the nailing machine according to the fourth embodiment.

When the air hose is connected to the air plug 1008 of the nailing machine 1200 shown in FIG. 23, the compressed air is supplied into the main chamber 1005. As shown in FIG. 26, in the initial state until the switch valve 1070 is actuated, the first passage 1072*a* and the fourth connection passage 1079 are shut off by the O-ring 1074*a*, so that the compressed air in the main chamber 1005 is not supplied to the timer valve 1280 at this stage. On the other hand, the space part 1281*d* of the timer valve 1280 communicates with the outside at the atmospheric pressure via the fourth connection passage 1079 and the second passage 1072*b* of the switch valve 1070.

Figure 27:
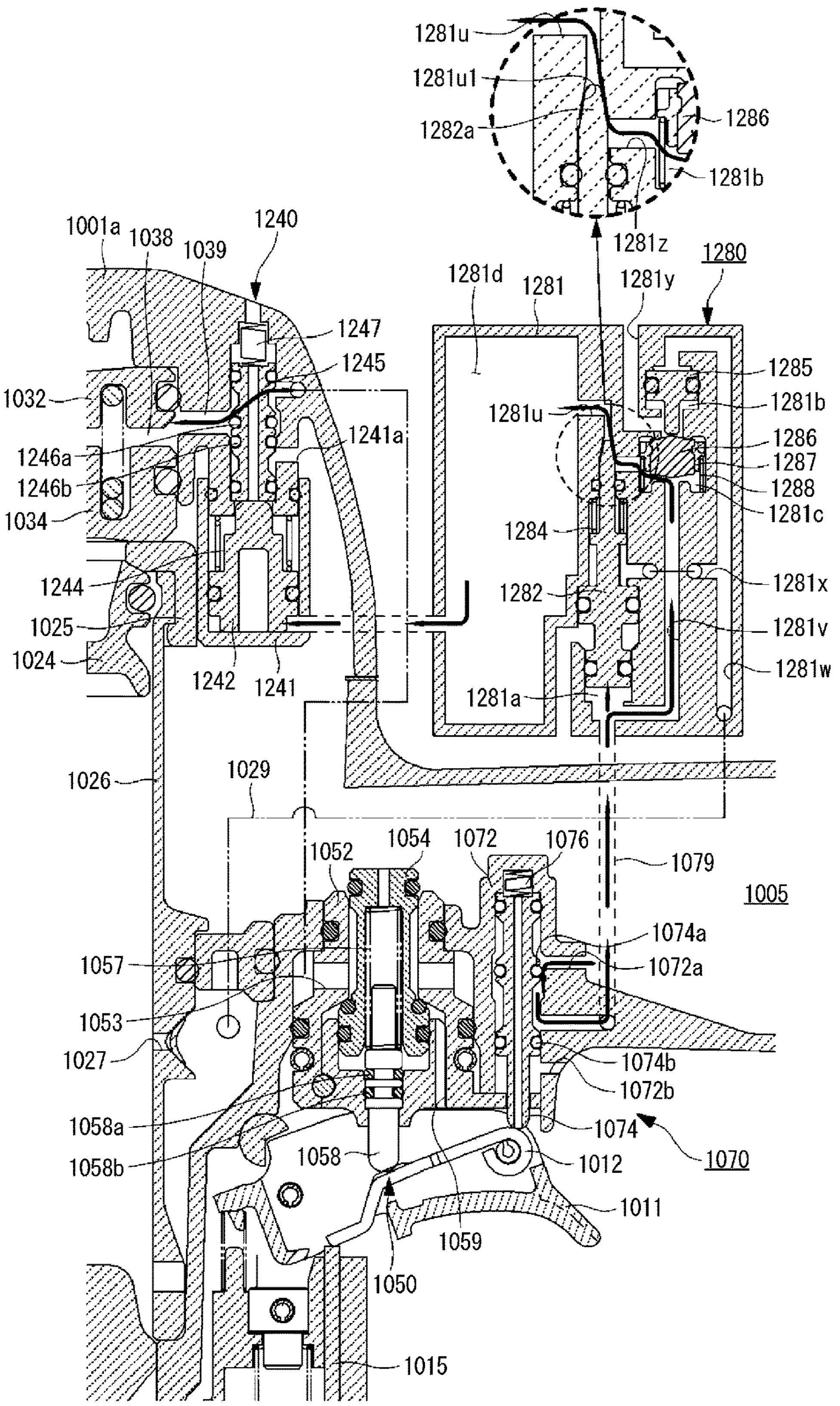
FIG. 27 is a view during the striking operation in the nailing machine according to the fourth embodiment.

As shown in FIG. 27, when the trigger lever 1011 is pulled by an operator, the switch valve stem 1074 of the switch valve 1070 is pushed up by the contact lever 1012, so that the switch valve 1070 is actuated. When the switch valve 1070 is actuated, the O-ring 1074*a* is also moved upward, so that the first passage 1072*a* of the switch valve 1070 and the fourth passage 1079 communicate with each other. Along with this, the compressed air in the main chamber 1005 is supplied to each of the first accommodation part 1281*a* and the second passage 1281*v* of the timer valve 1280 via the first passage 1072*a*, the inside of the switch valve 1070 and the fourth connection passage 1079.

When the timer valve stem 1282 is pressed upward by the compressed air flowing into the first accommodation part 1281*a*, the timer valve stem 1282 ascends at a stretch in the first accommodation part 1281*a* and reaches the top dead center. Thereby, the throttle portion 1282*a* is fitted to the to-be-throttled portion 1281*u*1 of the first passage 1281*u*. At this time, a slight gap through which a fluid can pass is formed between the circumferential surface of the throttle portion 1282*a* and the wall surface of the to-be-throttled portion 1281*u*1.

In addition, the compressed air flowing into the second passage 1281*v* passes through the third accommodation part 1281*c*, the sixth passage 1281*z*, the gap between the throttle portion 1282*a* and the to-be-throttled portion 1281*u*1 and the first passage 1281*u* and flows into the space part 1281*d*. In the space part 1281*d*, the compressed air is gradually accumulated, so that the internal pressure of the space part 1281*d* rises. Thereby, the time measurement of the prescribed time until the control valve 1240 is actuated starts.

Figure 28:
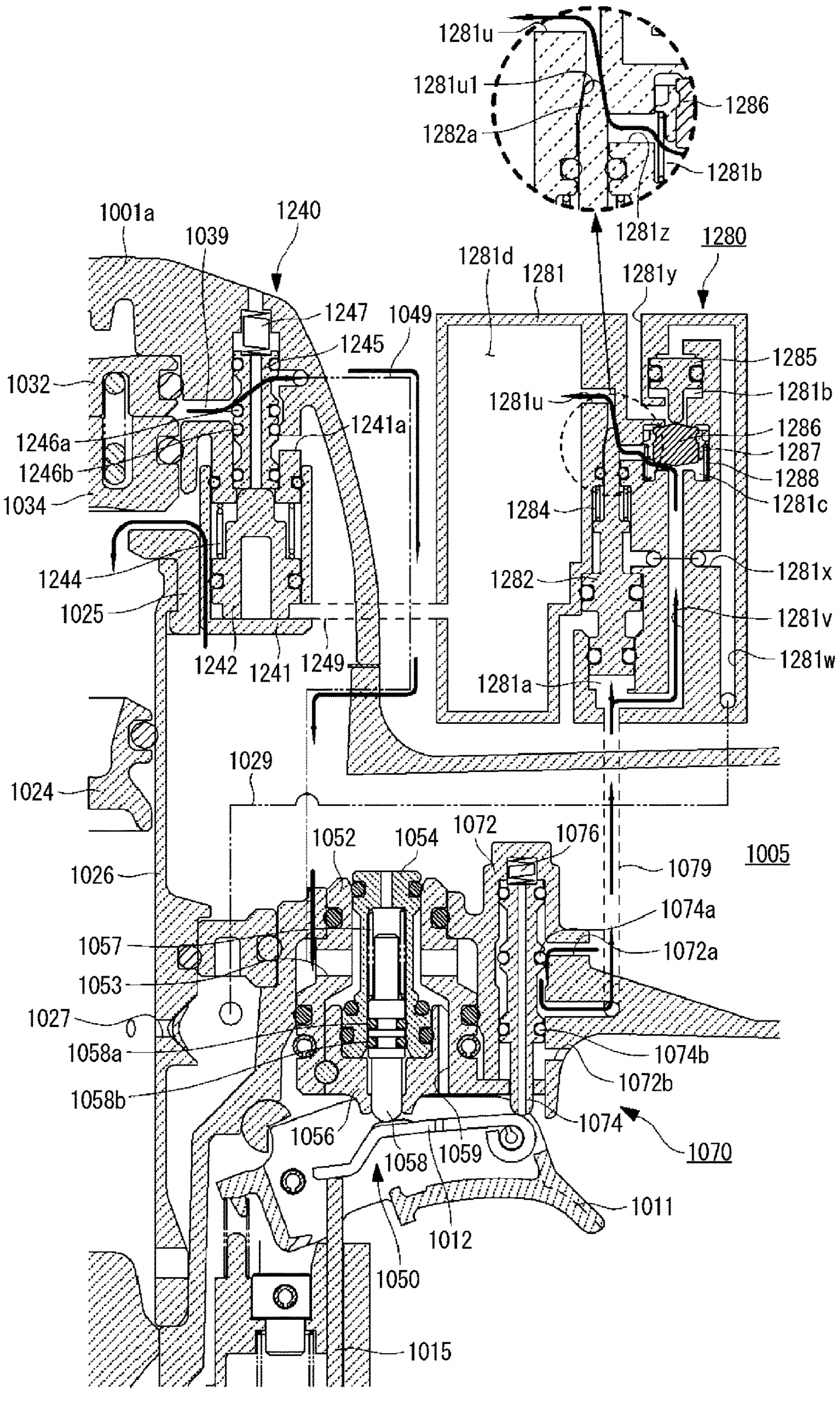
FIG. 28 is a view during the striking operation in the nailing machine according to the fourth embodiment.

As shown in FIG. 28, when the contact arm 1014 is pressed against the to-be-struck member in a state where the trigger lever 1011 is pulled and before timeout of the timer valve 1280, the pressing member 1015 is pushed up. Along with this, the front end-side of the contact lever 1012 is pushed up and the trigger valve stem 1058 of the trigger valve 1050 is pushed up by the push-up of the contact lever 1012, so that the trigger valve 1050 is actuated.

When the trigger valve 1050 is actuated, the O-rings 1058*a* and 1058*b* are also moved upward, as shown in FIG. 14, so that the compressed air in the empty chamber 1055 is exhausted from the gap S1003 between the cap 1056 and the trigger valve stem 1058 to the outside. The pilot valve 1054 is pushed down against the elastic force of the compression spring 1057 by the compressed air in the main chamber 1005, so that the lower surface of the pilot valve 1054 comes into contact with the upper surface of the cap 1056. Thereby, the passage 1053 and the air exhaust passage 1059 communicate with each other, so that the compressed air in the head valve chamber 1038 is exhausted to the atmosphere (outside) via the second connection passage 1039, the control valve 1240, the third connection passage 1049, the trigger valve 1050 and the air exhaust passage 1059.

When the compressed air in the head valve chamber 1038 is exhausted, as shown in FIG. 28, the movable part 1034 of the head valve 1030 is pushed up by the compressed air in the main chamber 1005 and the movable part 1034 and the locking part 1025 are opened therebetween, so that the compressed air in the main chamber 1005 is caused to flow into the piston upper chamber 1024*a* and the piston 1024 rapidly descends in the cylinder 1026.

Figure 29:
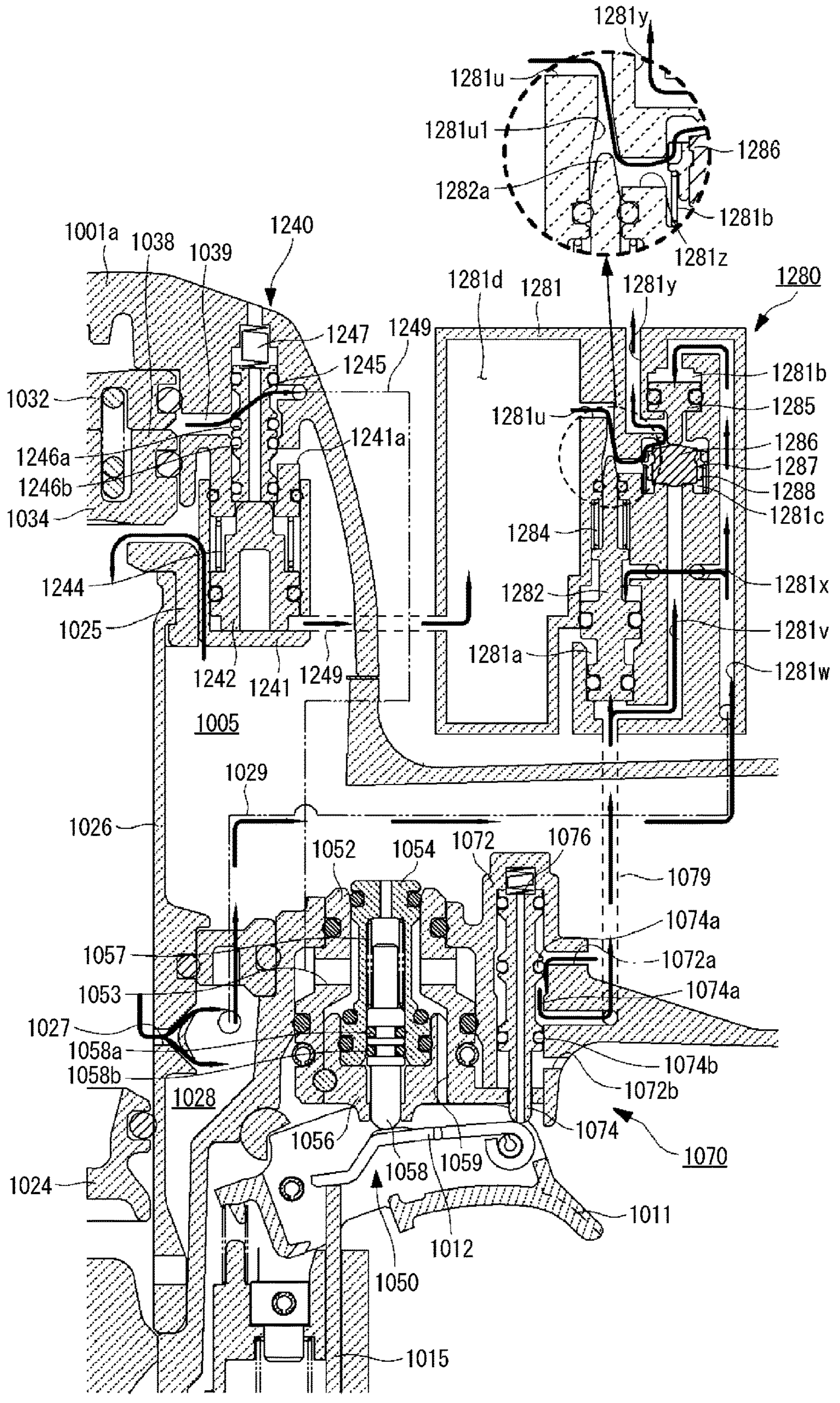
FIG. 29 is a view during the striking operation in the nailing machine according to the fourth embodiment.

As shown in FIG. 29, when the piston 1024 further descends, the nail is struck into the to-be-struck member by the driver 1022 (refer to FIG. 23) connected to the piston 1024. In addition, when the piston 1024 descends to the lower part-side in the cylinder 1026, the compressed air in the cylinder 1026 is caused to flow into the blow back chamber 1028 via the small holes 1027. The inflow compressed air is caused to flow into the second accommodation part 1281*b* via the first connection passage 1029 and the third passage 1281*w* of the timer valve 1280.

The piston 1285 is urged downward by the inflow compressed air and descends in the second accommodation part 1281*b*, thereby pushing down the seal member 1286. The seal member 1286 is pushed down against the elastic force of the compression spring 1288. Thereby, the fifth passage 1281*y* configured to communicate with the atmosphere and the control valve 1240 communicate with each other via the sixth passage 1281*z*, the first passage 1281*u*, the space part 1281*d* and the connection passage 1249.

The compressed air flowing into the third passage 1281*w* also is caused to flow into the first accommodation part 1281*a* via the fourth passage 1281*x*. The timer valve stem 1282 descends to the initial position (bottom dead center) of the first accommodation part 1281*a* by the inflow air and the urging force of the compression spring 1284. In the present embodiment, a pressure receiving area of the compressed air at a portion of the position of the timer valve stem 1282 in which the fourth passage 1281*x* is provided is set greater than a pressure receiving area of the compressed air on the lower end-side of the timer valve stem 1282. For this reason, the timer valve stem 1282 descends with receiving the compressed air entering from the blow back chamber 1028 via the fourth passage 1281*x*. Thereby, the gap between the throttle portion 1282*a* and the to-be-throttled portion 1281*u*1 provided on the upper end-side of the timer valve stem 1282 is expanded.

In this state, the compressed air in the space part 1281*d* and the compressed air on the lower part-side of the control valve 1240 flow back and are exhausted to the outside via the fifth passage 1281*y*. At this time, in the present embodiment, the compressed air flowing from the control valve 1240 and the space part 1281*d* vigorously passes through the gap between the throttle portion 1282*a* and the to-be-throttled portion 1281*u*1 while colliding with the circumferential surface of the throttle portion 1282*a* and the wall surface of the to-be-throttled portion 1281*u*1. Thereby, impurities such as trash and oil attached to the circumferential surface of the throttle portion 1282*a*, and the like are removed.

Figure 30:
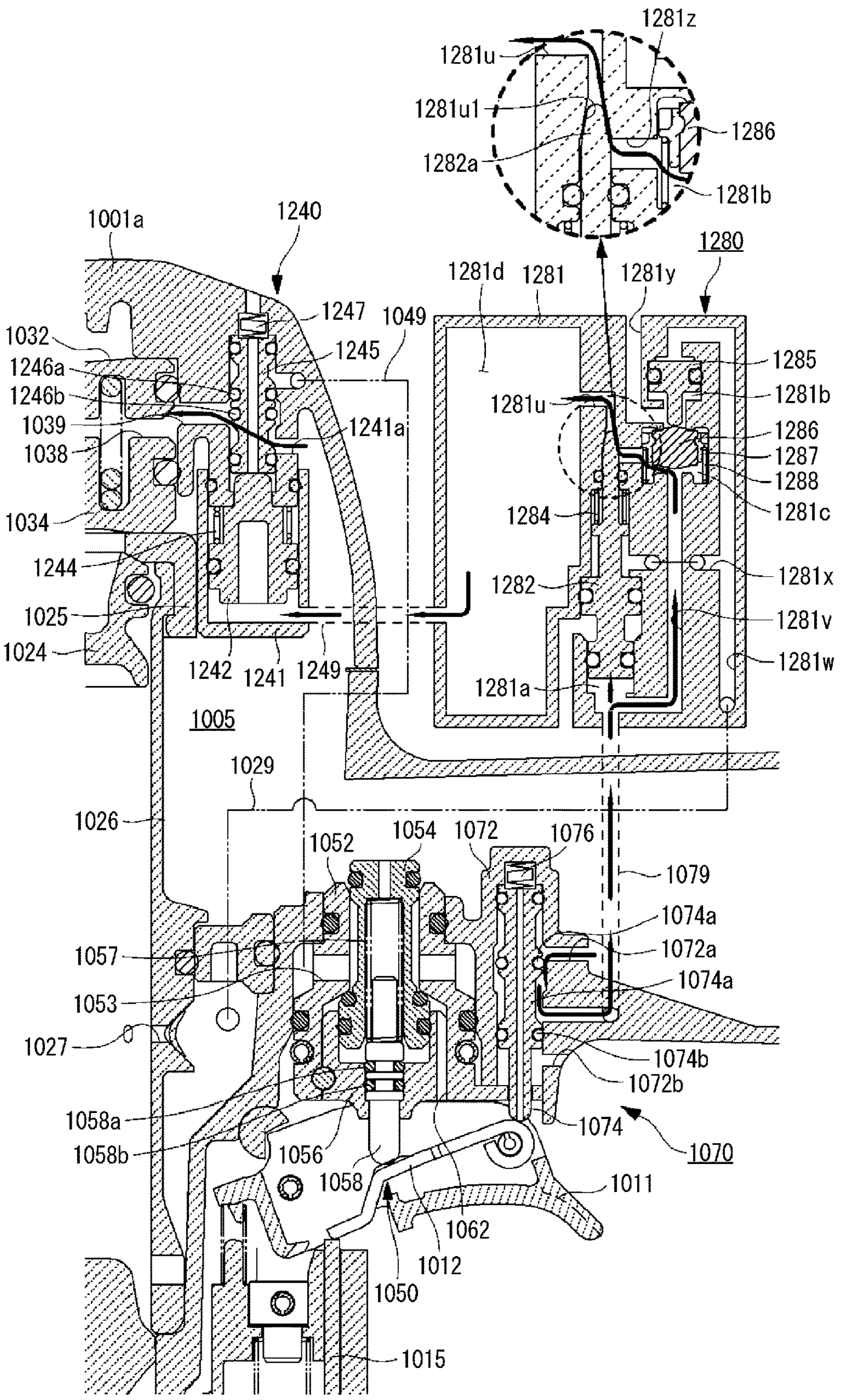
FIG. 30 is a view during the striking operation in the nailing machine according to the fourth embodiment.

As shown in FIG. 30, when the contact arm 1014 is not pressed against the to-be-struck member, i.e., the striking operation is not executed within the prescribed time from actuation of the timer valve 1280 shown in FIG. 27, the control valve 1240 is actuated by timeout of the timer valve 1280.

Specifically, when the compressed air in the space part 1281*d* of the timer valve 1280 reaches a prescribed pressure value, a part of the compressed air is caused to flow between the lower surface of the control valve piston 1242 and the bottom surface in the cylinder 1241. Along with this, the control valve piston 1242 ascends from the bottom surface in the cylinder 1241, so that the control valve stem 1245 is also pushed up. By the push-up of the control valve stem 1245, the O-rings 1246*a* and 1246*b* are also moved upward, so that while the second connection passage 1039 and the passage 1241*a* communicate with each other, the second connection passage 1039 and the third connection passage 1049 are isolated from each other. Thereby, the head valve chamber 1038 is switched from the communication state with the trigger valve 1050 to the communication state with the main chamber 1005.

Figure 31:
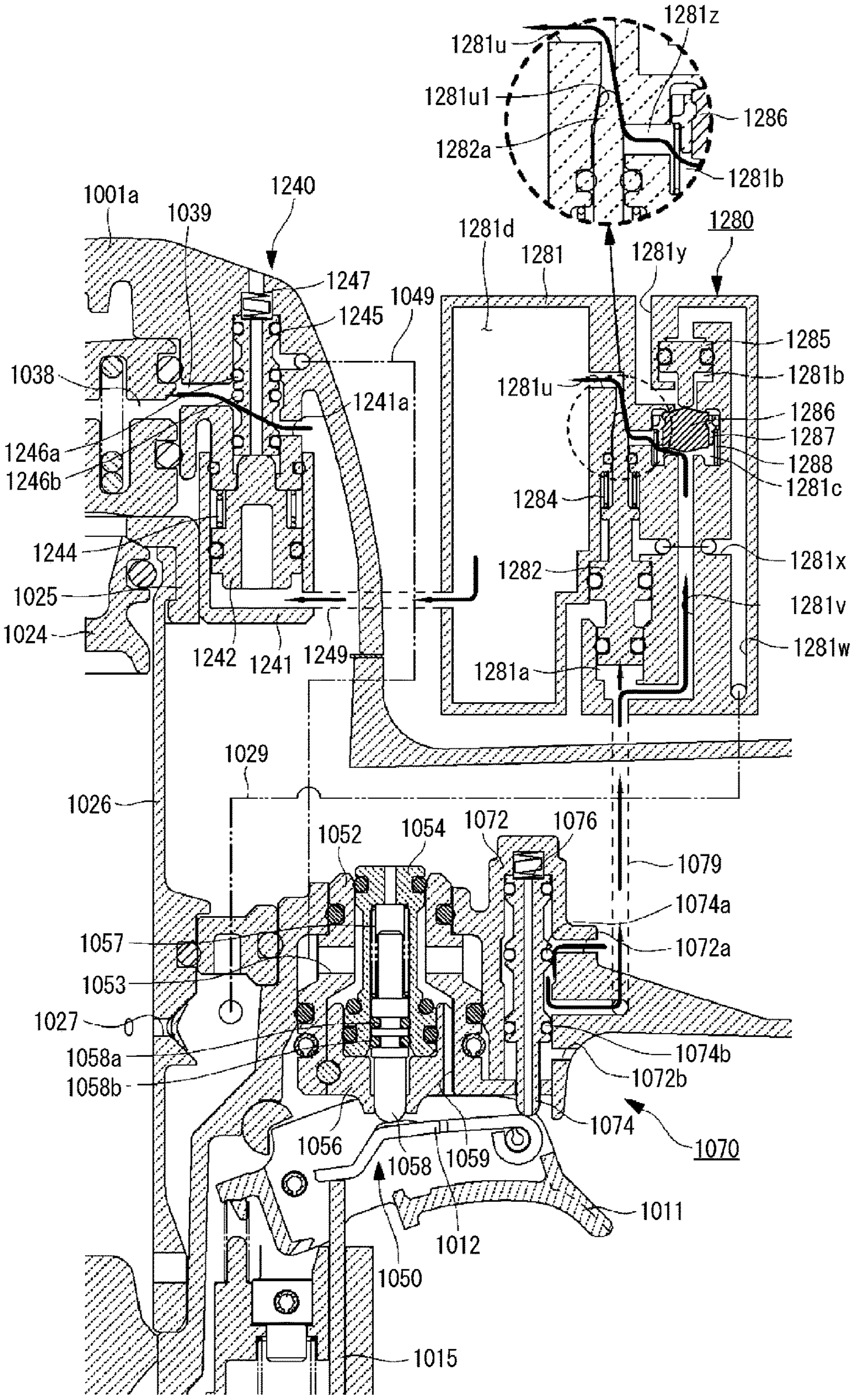
FIG. 31 is a view during the striking operation in the nailing machine according to the fourth embodiment.

As shown in FIG. 31, when the contact arm 1014 is pressed against the to-be-struck member after timeout of the timer valve 1280 in a state where the trigger lever 1011 is pulled by the operator, the pressing member 1015 is accordingly pushed up. When the front end-side of the contact lever 1012 is pushed up by the push-up of the pressing member 1015, the trigger valve stem 1058 of the trigger valve 1050 is pushed up, so that the trigger valve 1050 is actuated. When the trigger valve 1050 is actuated, the O-rings 1058*a* and 1058*b* are moved upward, as shown in FIG. 14 and the like, so that the compressed air in the empty chamber 1055 is exhausted from the gap S1003 between the cap 1056 and the trigger valve stem 1058 to the outside. The pilot valve 1054 is pushed down against the elastic force of the compression spring 1057 by the compressed air in the main chamber 1005, so that the lower surface of the pilot valve 1054 comes into contact with the upper surface of the cap 1056. Thereby, the passage 1053 and the air exhaust passage 1059 communicate with each other.

However, in a timeout state of the timer valve 1280, while the second connection passage 1039 and the third connection passage 1049 are isolated from each other by the control valve 1240, the second connection passage 1039 and the main chamber 1005 communicate with each other. For this reason, the compressed air in the head valve chamber 1038 is left remaining in the head valve chamber 1038 without being exhausted to the outside via the air exhaust passage 1059 provided to the trigger valve 1050. Thereby, when the timer valve 1280 times out, the head valve 1030 is not actuated even though the contact arm 1014 is pressed against the to-be-struck member in a state where the operator pulls the trigger lever 1011. Therefore, the striking operation is not executed after timeout of the timer valve 1280.

As described above, according to the fourth embodiment, every striking operation by the striking mechanism 1020 of the nailing machine 1200, the compressed air that is used when actuating the control valve 1240 is caused to flow back to the gap between the throttle portion 1282*a* and the to-be-throttled portion 1281*u*1 from the space part 1281*d*. Therefore, the impurities such as trash and oil attached to the throttle portion 1282*a* and the like can be securely removed. Thereby, it is possible to measure the prescribed time of the timer valve 1280 correctly and with high accuracy, and to prevent an erroneous operation of the timer valve 1280 due to attaching of attachments such as oil and trash.

In addition, in the fourth embodiment, the compressed air from the blow back chamber 1028 is supplied to the timer valve stem 1282 to move the timer valve stem 1282 toward the lower side of the first accommodation part 1281*a*, in conjunction with the striking operation by the striking mechanism 1020, thereby spacing the throttle portion 1282*a* from the to-be-throttled portion 1281*u*1. Therefore, it is possible to increase an area of the gap between the throttle portion 1282*a* and the to-be-throttled portion 1281*u*1. Thereby, when causing the compressed air in the space part 1281*d* to flow to the throttle portion 1282*a*, an area of the compressed air that collides with the circumferential surface of the throttle portion 1282*a* and the wall surface of the to-be-throttled portion 1281*u*1 can be increased, so that it is possible to easily remove the impurities attached to the throttle portion 1282*a* and the like.

Note that, the technical scope of the present invention is not limited to the above-described embodiments, and the above-described embodiments can be variously changed without departing from the gist of the present invention. Specifically, in the above-described embodiments, the nailing machines 1100 and 1200 have been described as an example of the pneumatic tool. However, the present invention is not limited thereto. For example, as the pneumatic tool, the present invention can be applied to a screw fastening tool, a screw driving tool and the like.

In addition, in the third and fourth embodiments, the example where the control valve 1040, 1240 is arranged between the head valve 1030 and the trigger valve 1050 has been described. However, the present invention is not limited thereto. For example, the control valve 1040, 1240 may also be arranged in the trigger valve 1050. Further, in the third and fourth embodiments, the passage between the head valve 1030 and the trigger valve 1050 is shut off by the control valve 1040, 1240. However, the present invention is not limited thereto. For example, a structure where the actuation of the head valve 1030 is mechanically disabled by the control valve 1040; 1240 can be adopted. Further, in the third embodiment, when the prescribed time by the timer valve 1080 elapses, the control valve 1040 is pressed and actuated by the timer valve 1080, so that the passage between the head valve 1030 and the trigger valve 1050 is completely shut off when the predetermined time elapses. However, the present invention is not limited thereto. For example, a configuration where the control valve 1040 is actuated in a state of being pressed from a first stage by the timer valve 1080 and the passage between the head valve 1030 and the timer valve 1050 is completely shut off when the predetermined time elapses may also be adopted. Further, in the third and fourth embodiments, the control valve 1040, 1240 is actuated by being pressed. However, the present invention is not limited thereto. For example, the control valve 1040, 1240 may also be actuated by being pulled.

Additional Statement

The present technology can also take following aspects.

(1)

A pneumatic tool including:

a drive mechanism configured to drive by an air pressure of compressed air, a chamber to which the compressed air for driving the drive mechanism is supplied;

a head valve configured to control supply of the compressed air supplied to the chamber to the drive mechanism;

a trigger valve configured to actuate the head valve;

a control valve configured to disable actuation of the trigger valve or the head valve; and a timer valve configured to be actuated based on an operation on a trigger and to disable actuation of the trigger valve or the head valve by actuating the control valve at a predetermined timing, wherein the timer valve has an accommodation part configured to reserve air for actuating the timer valve, and wherein the chamber and the accommodation part are constituted by spaces isolated from each other.

(2)

The pneumatic tool according to the above (1), wherein the control valve is configured to disable actuation of the head valve configured to be actuated in conjunction with the actuation of the trigger valve.

(3)

The pneumatic tool according to the above (1), wherein the accommodation part is isolated from an outside air.

(4)

The pneumatic tool according to any one of the above (1) to (3), wherein the timer valve includes:

a valve body configured to move in the accommodation part and to act on the control valve, and a throttle portion configured to regulate flow of air generated by movement of the valve body.

(5)

The pneumatic tool according to any one of the above (1) to (3), further including:

a main body having the drive mechanism provided thereto, and a grip part attached to a side part of the main body and extending in a direction intersecting with a moving direction of the piston of the drive mechanism, wherein the timer valve is arranged in the grip part.

(6)

The pneumatic tool according to the above (4), wherein the valve body is arranged to be movable along an extension direction of the grip part.

(7)

A pneumatic tool including:

a drive mechanism configured to drive by an air pressure of compressed air;

a first chamber to which the compressed air for driving the drive mechanism is supplied;

a head valve configured to control supply of the compressed air supplied to the first chamber to the drive mechanism;

a trigger valve configured to actuate the head valve;

a control valve configured to disable actuation of the trigger valve or the head valve; and a timer valve configured to be actuated based on an operation on a trigger and to disable actuation of the trigger valve or the head valve by actuating the control valve at a predetermined timing, wherein the timer valve has a throttle portion configured to regulate flow of the compressed air for actuating the control valve, and is configured to cause the compressed air to flow to the throttle portion at a predetermined timing interlocking with a striking operation by the drive mechanism.

(8)

The pneumatic tool according to the above (7), wherein the throttle portion is configured to regulate the flow of the compressed air by displacing an area of a gap between the throttle portion and a to-be-throttled portion, and to increase the area of the gap at the time when the compressed air is supplied in conjunction with the striking operation.

(9)

The pneumatic tool according to the above (8), further including a second chamber configured to accommodate compressed air for returning the drive mechanism to an initial position after the striking operation, wherein the throttle portion is configured to move relative to the to-be-throttled portion by the compressed air supplied from the second chamber, thereby increasing the area of the gap.

The nailing machine of the related art disclosed in PTL 1 has following problems. The timing valve uses the compressed air from the main chamber and the like. For this reason, oil, drain, minute trash and the like contained in the compressed air supplied to the nailing machine are attached to the flow path (throttle portion), so that the flow rate of the compressed air may vary. As a result, the time measurement of the timer mechanism varies, so that the actuation of the tinier mechanism is not stabilized.

In order to solve the above problems, the aspect of the above (1) provides the pneumatic tool capable of stabilizing the actuation of the timer mechanism by excluding an influence of oil, drain, minute trash and the like contained in the compressed air supplied to the nailing machine.

According to one aspect of the present disclosure, the timer valve is actuated using the air in the accommodation part isolated from the chamber, without using the compressed air that is used for driving of the drive mechanism. Therefore, it is possible to prevent trash, oil and the like from entering the timer valve.

In addition, according to one aspect of the present disclosure, the compressed air is caused to flow to the throttle portion in conjunction with the striking operation. Therefore, it is possible to remove impurities such as trash and oil attached to the throttle portion by the compressed air. Thereby, the time of the timer valve until the control valve is actuated can be stabilized.

The present application is based on Japanese Patent Application Nos. 2019-086669 filed on Apr. 26, 2019, and 2019-086670 filed on Apr. 26, 2019, the contents of which are incorporated herein by reference.

REFERENCE SIGNS LIST

1: main body

4: grip part

11: trigger lever (trigger)
20: striking mechanism (drive mechanism)
22: driver
24: piston
26: cylinder
30: head valve
40: control valve
50: trigger valve
80: timer valve
84: timer piston (valve body)
85: piston shaft part (valve body)
88: throttle portion
89: compression spring
100, 200: nailing machine (pneumatic tool)
280: timer valve
281: first cylinder (damper mechanism)
284: first timer piston (valve body)
285: first piston shaft part (valve body)
294: second timer piston (valve body)
295: second piston shaft part (valve body) 0: oil (damper mechanism)
1001: main body
1004: grip part
1005: main chamber (first chamber)
1011: trigger lever (trigger)
1020: striking mechanism (drive mechanism)
1022: driver
1024: piston
1026: cylinder
1028: blow back chamber (second chamber)
1030: head valve
1040: control valve
1050: trigger valve
1080: timer valve
1081: first chamber (accommodation part)
1084: first timer piston (valve body)
1085: first piston shaft part (valve body)
1088: throttle portion
1089: compression spring
1100, 1200: nailing machine (pneumatic tool)
1282: timer valve stem
**1281*u*1**: to-be-throttled portion
**1282*a***: throttle portion

The invention claimed is:

1. A pneumatic tool comprising:

a drive mechanism configured to drive by an air pressure of compressed air;

a head valve configured to control supply of the compressed air to the drive mechanism;

a trigger valve configured to actuate the head valve;

a control valve configured to disable actuation of the trigger valve or the head valve; and a timer valve configured to be actuated based on an operation on a trigger and to disable actuation of the trigger valve or the head valve by actuating the control valve at a predetermined timing, wherein the timer valve has a valve body configured to act on the control valve and is provided with a throttle portion configured to regulate a flow rate of ambient air flowing in or flowing out via the throttle portion in conjunction with movement of the valve body, wherein the timer valve further includes:

a cylinder with respect to which air can flow in or flow out; and a spring provided in the cylinder for urging the valve body toward the control valve, and wherein a moving speed of the valve body in the cylinder is regulated by the air flowing in or flowing out via the throttle portion and the spring, so that a time after a start of movement by the operation on the trigger until the control valve acted by the valve body moves to an actuation position is controlled.

2. The pneumatic tool according to claim 1, wherein the control valve is configured to disable actuation of the head valve configured to be actuated in conjunction with the actuation of the trigger valve.

3. The pneumatic tool according to claim 1, wherein the valve body of the timer valve is configured to start movement from an initial position in which the spring in the cylinder is compressed, by the operation on the trigger.

4. The pneumatic tool according to claim 1, wherein the valve body of the timer valve is configured to move to an initial position in the cylinder by the compressed air used for a striking operation of the drive mechanism after the striking operation.

5. The pneumatic tool according to claim 1, wherein one end portion of the throttle portion is configured to communicate with an inside of the cylinder and the other end portion of the throttle portion is configured to communicate with an outside of the main body.

6. The pneumatic tool according to claim 1, further comprising:

a main body configured to accommodate the cylinder, and a grip part attached to a side part of the main body and extending in a direction intersecting with a moving direction of the drive mechanism of the main body, wherein the timer valve is arranged in the grip part.

7. The pneumatic tool according to claim 6, wherein timer valve is arranged in the grip part so that a moving direction of the valve body is different from the moving direction of the drive mechanism.

8. The pneumatic tool according to claim 6, wherein the timer valve is arranged so that a moving direction of the valve body follows an extension direction of the grip part.

9. The pneumatic tool according to claim 1, wherein the timer valve is configured to cause the valve body to act on the control valve after a predetermined time elapses from the operation on the trigger, thereby shutting off between the head valve and the trigger valve.

10. The pneumatic tool according to claim 1, wherein the control valve is provided between the head valve and the trigger valve and is configured to communicate or shut off a passage between the head valve and the trigger valve.

11. A pneumatic tool comprising:

a drive mechanism configured to drive by an air pressure of compressed air;

a head valve configured to control supply of the compressed air to the drive mechanism;

a trigger valve configured to actuate the head valve;

a control valve configured to disable actuation of the trigger valve or the head valve; and a timer valve configured to be actuated based on an operation on a trigger and to disable actuation of the trigger valve or the head valve by actuating the control valve at a predetermined timing, wherein the timer valve has:

a valve body configured to act on the control valve, and a damper mechanism configured to regulate a moving speed of the valve body, and wherein the valve body is configured to act on the control valve after a predetermined time elapses from start of movement by the operation on the trigger.

12. The pneumatic tool according to claim 11, further comprising:

a main body configured to accommodate the drive mechanism, and a grip part attached to a side part of the main body and extending in a direction intersecting with a moving direction of the drive mechanism of the main body, wherein the timer valve is arranged in the grip part.

13. The pneumatic tool according to claim 12, wherein the timer valve is arranged in the grip part so that a moving direction of the valve body is different from the moving direction of the drive mechanism.

14. The pneumatic tool according to claim 12, wherein the timer valve is arranged so that a moving direction of the valve body follows an extension direction of the grip part.

15. The pneumatic tool according to claim 11, wherein the timer valve is constituted by an oil damper.

* * * * *